(12) United States Patent
Goto et al.

(10) Patent No.: US 12,526,016 B2
(45) Date of Patent: Jan. 13, 2026

(54) WIRELESS COMMUNICATION SYSTEM, WIRELESS COMMUNICATION APPARATUS, AND WIRELESS COMMUNICATION METHOD

(71) Applicants: Nippon Telegraph and Telephone Corporation, Tokyo (JP); Japan Aerospace Exploration Agency, Tokyo (JP)

(72) Inventors: Daisuke Goto, Musashino (JP); Fumihiro Yamashita, Musashino (JP); Kiyohiko Itokawa, Musashino (JP); Yasuyoshi Kojima, Musashino (JP); Chihaya Kato, Chofu (JP); Mitsuhiro Nakadai, Chofu (JP)

(73) Assignees: NTT, Inc., Tokyo (JP); Japan Aerospace Exploration Agency, Tokyo (JP)

( * ) Notice: Subject to any disclaimer, the term of this patent is extended or adjusted under 35 U.S.C. 154(b) by 437 days.

(21) Appl. No.: 18/008,732

(22) PCT Filed: Jun. 8, 2021

(86) PCT No.: PCT/JP2021/021742
§ 371 (c)(1),
(2) Date: Dec. 7, 2022

(87) PCT Pub. No.: WO2021/251379
PCT Pub. Date: Dec. 16, 2021

(65) Prior Publication Data
US 2023/0216559 A1    Jul. 6, 2023

Related U.S. Application Data

(63) Continuation of application No. PCT/JP2020/022650, filed on Jun. 9, 2020.

(30) Foreign Application Priority Data

Jun. 9, 2020  (WO) .................. PCT/JP2020/022650

(51) Int. Cl.
*H04B 7/06*    (2006.01)
*H04B 7/08*    (2006.01)
(Continued)

(52) U.S. Cl.
CPC ......... *H04B 7/0608* (2013.01); *H04B 7/0802* (2013.01); *H04B 7/18513* (2013.01); *H04B 7/0413* (2013.01)

(58) Field of Classification Search
CPC  H04B 7/0608; H04B 7/0802; H04B 7/18513; H04B 7/0413; H04B 7/0691;
(Continued)

(56) References Cited

U.S. PATENT DOCUMENTS

| | | |
|---|---|---|
| 6,775,251 B1 | 8/2004 | Wiedeman et al. |
| 2011/0188586 A1 | 8/2011 | Bidigare et al. |

(Continued)

FOREIGN PATENT DOCUMENTS

| | | |
|---|---|---|
| JP | 2000115049 | 4/2000 |
| JP | 2013187867 | 9/2013 |

(Continued)

OTHER PUBLICATIONS

Gorokhov et al., "Receive Antenna Selection for MIMO Spatial Multiplexing: Theory and Algorithms," IEEE Transactions on Signal Processing, Nov. 2003, 51(11):2796-2807.
(Continued)

*Primary Examiner* — Fred A Casca
(74) *Attorney, Agent, or Firm* — Fish & Richardson P.C.

(57) ABSTRACT

First wireless communication apparatus wirelessly communicates with second wireless communication apparatus
(Continued)

using one or more first antennas. Second wireless communication apparatus wirelessly communicates with the first wireless communication apparatus using one or more second antennas. A controller included in the wireless communication system performs control to change one or both of first antennas wirelessly communicating with the second wireless communication apparatus among the one or more first antennas of a plurality of first wireless communication apparatuses or second antennas wirelessly communicating with the first wireless communication apparatus among a plurality of second antennas of the second wireless communication apparatus for maximizing communication quality on the basis of the communication quality for each time between first antenna and second antenna calculated using a position of the one or more second antennas and movement schedule information representing a position of first wireless communication apparatus for each time.

15 Claims, 30 Drawing Sheets

(51) Int. Cl.
    *H04B 7/185*     (2006.01)
    *H04B 7/0413*     (2017.01)

(58) Field of Classification Search
    CPC .... H04B 7/0874; H04B 7/024; H04B 7/0617; H04B 7/0628; H04B 7/06956; H04B 7/088; H04W 16/28; H01Q 1/246; H01Q 21/065; H01Q 3/40; H01Q 25/00; H01Q 21/061

See application file for complete search history.

(56) References Cited

U.S. PATENT DOCUMENTS

| | | | |
|---|---|---|---|
| 2012/0208541 A1* | 8/2012 | Luo | H04B 7/022 |
| | | | 455/437 |
| 2015/0237569 A1 | 8/2015 | Jalali | |
| 2021/0281294 A1 | 9/2021 | Takano | |
| 2023/0224134 A1* | 7/2023 | Li | H04L 5/0048 |
| | | | 370/329 |

FOREIGN PATENT DOCUMENTS

| | | |
|---|---|---|
| JP | 2019121967 | 7/2019 |
| WO | WO 2020031762 | 2/2020 |

OTHER PUBLICATIONS

Kato et al., "Channel Capacity Analysis of Satellite MIMO System Depending on the Orbital Altitude," 37th AIAA International Communication Satelite Conference (ICSSC 2019), Oct. 2019, 8 pages.
Sanayei et al., "Antenna Selection in MIMO Systems," IEEE Communications Magazine, Oct. 2004, 42(10):68-73.

* cited by examiner

WIRELESS COMMUNICATION SYSTEM, WIRELESS COMMUNICATION APPARATUS, AND WIRELESS COMMUNICATION METHOD

CROSS-REFERENCE TO RELATED APPLICATIONS

This application is a National Stage application under 35 U.S.C. § 371 of International Application No. PCT/JP2021/021742, having an International Filing Date of Jun. 8, 2021, which claims priority to PCT/JP2020/022650, having an International Filing Date of Jun. 9, 2020.

The disclosure of the prior applications are considered part of the disclosure of this application, and are incorporated by reference in their entirety into this application.

TECHNICAL FIELD

The present invention relates to a wireless communication system, a wireless communication apparatus, and a wireless communication method.

Priority is claimed on International Patent Application No. PCT/JP2020/022650, filed Jun. 9, 2020, the content of which is incorporated herein by reference.

BACKGROUND ART

MIMO communication is one of communication schemes performing high-speed and high-reliability wireless communication using a plurality of antennas. In this MIMO communication, there is a technology for selecting a subset of reception antennas on the basis of channel state information (CSI) such that a channel capacity is maximized (for example, see Non Patent Document 1). In accordance with this, a transmission capacity that is close to an optimal value is established at a low cost. In addition, there is a technology for selecting a subset of antennas, which are used for wireless communication, among a plurality of antennas using CSI that has been fed back (for example, see Non Patent Document 2).

CITATION LIST

Non Patent Document

[Non Patent Document 1]
Alexei Gorokhov, Dhananjay A. Gore, and Arogyaswami J. Paulraj, "Receive Antenna Selection for MIMO Spatial Multiplexing: Theory and Algorithms", IEEE Transactions on Signal Processing, Vol. 51, No. 11, 2003, p. 2796-2807
[Non Patent Document 2]
Shahab Sanayei and Aria Nosratinia, "Antenna Selection in MIMO Systems", IEEE Communications magazine, Vol. 42, No. 10, 2004, p. 68-73
[Non Patent Document 3]
C. Kato, M. Nakadai, D. Goto, H. Shibayama and F. Yamashita, "Channel Capacity Analysis of Satellite MIMO System Depending on the Orbital Altitude," in 37th AIAA International Communication Satellite Systems Conference (ICSSC 2019), October 2019.

SUMMARY OF INVENTION

Technical Problem

In a case in which a wireless communication apparatus is mounted on a moving body, CSI changes in accordance with movement of the wireless communication apparatus. In the technologies disclosed in Non Patent Document 1 and 2, in order to select a subset of antennas such that a moving wireless communication apparatus constantly performs communication using a transmission capacity that is an optimal value or is close to the optimal value, it is necessary to estimate and acquire CSI with a high frequency. There is a likelihood that this may not only increase a load of the wireless communication apparatus but cause a decrease in communication efficiency in a case in which a feedback of CSI is necessary. In addition, although a technology disclosed in Non Patent Document 3 shows that MIMO can be applied to satellites by building a communication channel model with orbit conditions of a satellite that is a moving body and it is analytically derived that a communication channel capacity can be controlled in accordance with a distance between transmission antennas or reception antennas, there is periodicity in changes of the channel capacity over time in a satellite communication channel, and a time frame in which signals completely interfere with each other in accordance with an influence of the periodicity occurs, whereby there are problems in that the communication capacity decreases, and the stability of the communication channel deteriorates.

In consideration of the situations described above, an object of the present invention is to provide a wireless communication system, a wireless communication apparatus, and a wireless communication method capable of performing wireless communication with high communication quality while a load is reduced even in a case in which the wireless communication apparatus is moving.

Solution to Problem

According to one aspect of the present invention, there is provided a wireless communication system including: a first wireless communication apparatus; and a second wireless communication apparatus, in which the first wireless communication apparatus includes: one or more first antennas; and a first communicator configured to wirelessly communicate with the second wireless communication apparatus using the one or more first antennas, the second wireless communication apparatus includes: one or more second antennas; and a second communicator configured to wirelessly communicate with the first wireless communication apparatus using the one or more second antennas, the wireless communication system further including: a controller configured to perform control to change one or both of first antennas wirelessly communicating with the second wireless communication apparatus among the one or more first antennas of a plurality of first wireless communication apparatuses or second antennas wirelessly communicating with the first wireless communication apparatus among a plurality of second antennas of the second wireless communication apparatus for maximizing communication quality on the basis of the communication quality for each time between first antenna and second antenna calculated using a position of the one or more second antennas and movement schedule information representing a position of the first wireless communication apparatus for each time.

According to one aspect of the present invention, there is provided a wireless communication apparatus including: one or more antennas; a communicator configured to wirelessly communicate with a communication destination apparatus using the one or more antennas; and a controller configured to perform control to change one or both of antennas wirelessly communicating with the wireless communication apparatus among antennas of a plurality of the communication destination apparatuses or antennas wirelessly communicating with the communication destination apparatus among a plurality of the antennas of the wireless communication apparatus for maximizing communication quality on the basis of the communication quality for each time between the one or more antennas and the antennas of a plurality of the communication destination apparatuses calculated using a position of the one or more antennas and movement schedule information representing a position of the communication destination apparatus for each time.

According to one aspect of the present invention, there is provided a wireless communication apparatus in a wireless communication system including a plurality of the wireless communication apparatuses, the wireless communication apparatus including: one or more antennas; a communicator configured to wirelessly communicate with a communication destination apparatus using the one or more antennas; and a controller configured to perform control of the communicator to transmit a wireless signal to the communication destination apparatus at a time at which the one or more antennas of wireless communication apparatus are selected as a communication destination of the communication destination apparatus for maximizing communication quality on the basis of communication quality for each time between antenna of each of the plurality of the wireless communication apparatuses and antennas of the communication destination apparatus calculated using a position of antennas of the communication destination apparatus and movement schedule information representing a position of each of the plurality of the wireless communication apparatuses for each time.

According to one aspect of the present invention, there is provided a wireless communication method executed by a wireless communication system including a first wireless communication apparatus and a second wireless communication apparatus, the wireless communication method including: wirelessly communicating with the second wireless communication apparatus using one or more first antennas by the first wireless communication apparatus; wirelessly communicating with the first wireless communication apparatus using one or more second antennas by the second wireless communication apparatus; and performing control to change one or both of first antennas wirelessly communicating with the second wireless communication apparatus among the one or more first antennas of a plurality of first wireless communication apparatuses or second antennas wirelessly communicating with the first wireless communication apparatus among a plurality of second antennas of the second wireless communication apparatus for maximizing communication quality on the basis of the communication quality for each time between first antenna and second antenna calculated using a position of the one or more second antennas and movement schedule information representing a position of the first wireless communication apparatus for each time by a controller.

According to one aspect of the present invention, there is provided a wireless communication method executed by a wireless communication apparatus, the wireless communication method including: wirelessly communicating with a communication destination apparatus using one or more antennas; and performing control to change one or both of antennas wirelessly communicating with the wireless communication apparatus among antennas of a plurality of the communication destination apparatuses or antennas wirelessly communicating with the communication destination apparatus among a plurality of the antennas of the wireless communication apparatus for maximizing communication quality on the basis of the communication quality for each time between the one or more antennas and the antennas of a plurality of the communication destination apparatuses calculated using a position of the one or more antennas and movement schedule information representing a position of the communication destination apparatus for each time.

According to one aspect of the present invention, there is provided a wireless communication method executed by a wireless communication apparatus in a wireless communication system including a plurality of wireless communication apparatuses, the wireless communication method including: wirelessly communicating with a communication destination apparatus using one or more antennas; a performing control to perform control of the communicator to transmit a wireless signal to the communication destination apparatus at a time at which the one or more antennas of wireless communication apparatus are selected as a communication destination of the communication destination apparatus for maximizing communication quality on the basis of communication quality for each time between antenna of each of the plurality of the wireless communication apparatuses and antennas of the communication destination apparatus calculated using a position of antennas of the communication destination apparatus and movement schedule information representing a position of each of the plurality of the wireless communication apparatuses for each time.

Advantageous Effects of Invention

According to the present invention, wireless communication can be performed with high communication quality while suppressing a load even in a case in which a wireless communication apparatus moves.

DESCRIPTION OF EMBODIMENTS

Hereinafter, embodiments of the present invention will be described in detail with reference to the drawings.

First Embodiment

Figure 1:
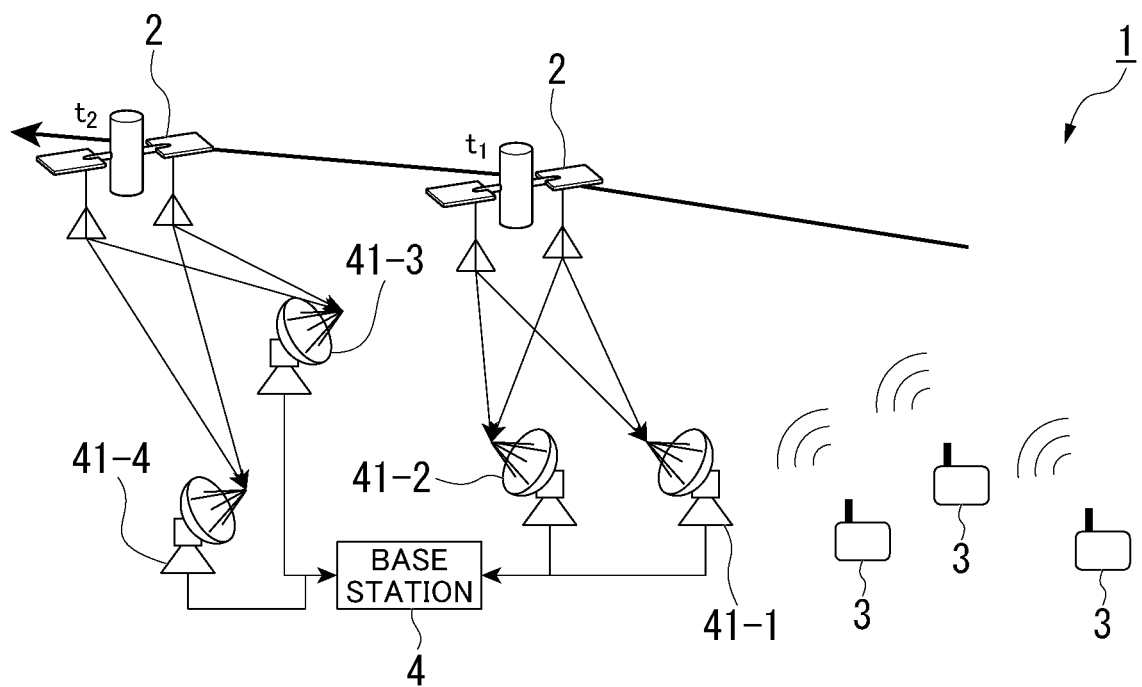
FIG. 1 is a diagram illustrating an overview of a wireless communication system according to a first embodiment of the present invention.

FIG. 1 is a diagram illustrating an overview of a wireless communication system 1 according to a first embodiment. The wireless communication system 1 includes a mobile relay station 2, a terminal station 3, and a base station 4. The number of each of the mobile relay stations 2, the terminal stations 3, and the base stations 4 included in the wireless communication system 1 is arbitrary, but it is assumed that there are a large number of terminal stations 3.

The mobile relay station 2 is an example of a wireless communication apparatus which is mounted on a moving body, and an area in which the mobile relay station 2 can perform communication moves with the passage of time. The mobile relay station 2 is provided in, for example, a low Earth orbit (LEO) satellite. The terminal station 3 and the base station 4 are installed on the Earth such as on the ground or the sea. The terminal station 3 is, for example, an IoT terminal. The terminal station 3 collects data such as environmental data detected by a sensor and wirelessly transmits the data to the mobile relay station 2. The mobile relay station 2 receives data transmitted from each of the plurality of terminal stations 3 through wireless signals and wirelessly transmits the received data to the base station 4 while moving over the Earth. The base station 4 receives the data collected by the terminal station 3 from the mobile relay station 2.

It is conceivable to use a relay apparatus mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow. Furthermore, drones require batteries and HAPS require solar panels. In the present embodiment, the mobile relay station 2 is mounted on a LEO satellite. Therefore, in addition to keeping the link budget within a limit, the LEO satellite has no air resistance and consumes less fuel because it orbits outside the atmosphere. In addition, the footprint is also large as compared to the case where a relay station is mounted on a drone or a HAPS.

However, the mobile relay station 2 mounted on the LEO performs communication while moving at a high speed, and thus the relay station mounted on the LEO has a link budget smaller than that of a case in which a relay station is mounted on a drone or a HAPS. Thus, the base station 4 according to the present embodiment receives a wireless signal from the mobile relay station 2 using a plurality of antenna stations 41. In FIG. 1, four antenna stations 41 included in the base station 4 are denoted as antenna stations 41-1, 41-2, 41-3, and 41-4. In accordance with a diversity effect of communication and a beam forming effect according to use of the plurality of antenna stations 41, the communication quality is improved, and the transmission capacity can be raised.

The plurality of antenna stations 41 included in the base station 4 are disposed at positions separated from each other such that an arrival angle difference between signals from the plurality of antennas of the mobile relay station 2 is large. By disposing the antenna stations 41 at positions separated from each other, phase differences occur in wireless signals received from the mobile relay station 2 by the antenna stations 41. In this way, since the antenna stations 41 are installed at positions geographically separated from each other, channel states between the mobile relay station 2 and the antenna stations 41 are different from each other, and the mobile relay station 2 move at high speed, and thus the channel states change over time.

Also, when a channel state changes in accordance with movement of the mobile relay station 2, in order to cause the mobile relay station 2 and the base station 4 to perform communication using as high a transmission capacity as possible, a transmission capacity of each antenna of the mobile relay station 2 and each antenna station 41 of the base station 4 at each time is calculated in advance in the present embodiment. This transmission capacity at each time is calculated on the basis of movement schedule information of the mobile relay station 2, information of a position of each antenna station 41, and a frequency of wireless communication. The movement schedule information is information that represents a position, a speed, and a movement direction of the mobile relay station 2 at each time. In the present embodiment, as the movement schedule information, orbit information of a LEO satellite mounted on the mobile relay station 2 is used. The orbit information is information from which a position, a speed, a movement direction, and the like of a LEO satellite at an arbitrary time can be acquired. A slant range that is a distance between antennas is acquired from the position of the antenna of the mobile relay station 2 and the position of the antenna station 41 of the base station 4. The position of the antenna of the mobile relay station 2 may be a position of the LEO satellite acquired from orbit information or a position deviating from the position of the LEO satellite by a predetermined distance and a predetermined direction. In addition, a Doppler shift amount is acquired using a frequency and a speed of the LEO satellite. For a channel between the LEO satellite and the antenna station 41 of the base station 4, an open environment is assumed. For this reason, an influence of multi-path fading occurring from reflected waves according to an obstacle can be ignored, and the channel becomes a channel in which a direct wave is dominant. In accordance with this, CSI such as a damping coefficient and a phase difference can be assumed to be uniquely determined on the basis of slant range information between the LEO satellite and the antenna station 41 of the base station 4. As above, a channel capacity between transmission/reception antennas is calculated using Shannon's theorem from an SNR calculated on the basis of a slant range and a Doppler shift amount and a channel matrix acquired on the basis of a slant range between the antenna of the mobile relay station 2 and the antenna station 41.

Then, the base station 4 is caused to store a transmission capacity of each antenna station 41 at each time. A transmission capacity is a channel capacity of a downlink calculated in advance as described above. The base station 4 uses a data series of wireless signals received by antenna stations 41 of a predetermined number having large transmission capacities from the mobile relay station 2 at each time for a reception process. For example, the base station 4 performs a reception process using wireless signals received by antenna stations 41-1 and 41-2 at a time t1 and performs a reception process using wireless signals received by antenna stations 41-3 and 41-4 at a time t2.

Figure 2:
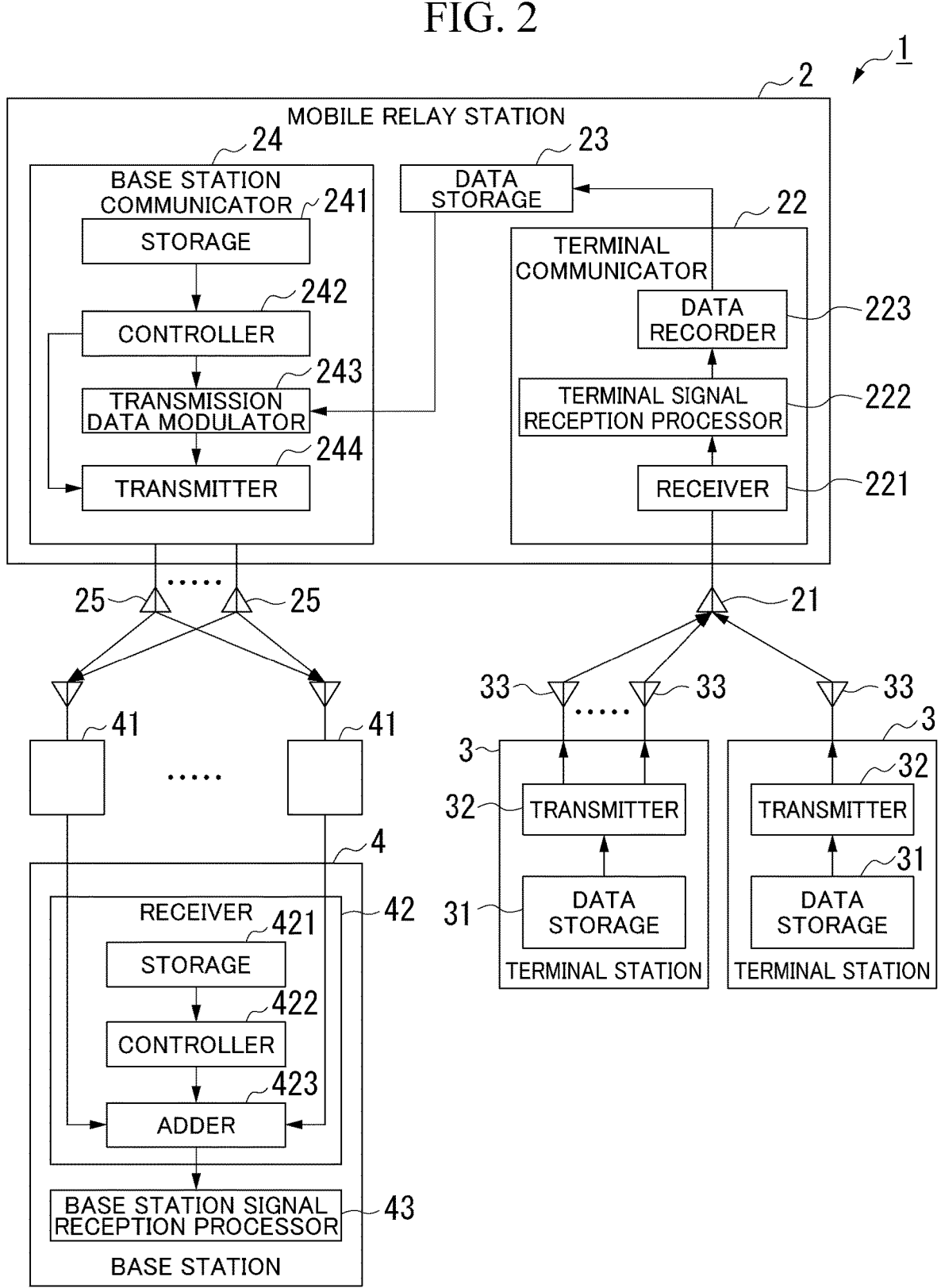
FIG. 2 is a functional block diagram of the wireless communication system according to this embodiment.

A configuration of each apparatus will be described. FIG. 2 is a functional block diagram of a wireless communication system 1 according to a first embodiment.

The mobile relay station 2 includes one or more antennas 21, a terminal communicator 22, a data storage 23, a base station communicator 24, and one or more antennas 25. In the present embodiment, an example of a case where the mobile relay station 2 includes a plurality of antennas 25 and wirelessly communicates with the base station 4 using Multiple Input Multiple Output (MIMO) will be described.

The terminal communicator 22 includes a receiver 221, a terminal signal reception processor 222, and a data recorder 223. The receiver 221 receives a terminal uplink signal transmitted from each terminal station 3 using the one or more antennas 21. The terminal signal reception processor 222 performs a process of receiving a terminal uplink signal. In the reception process, the terminal uplink signal received by the receiver 221 is demodulated and decoded, and terminal transmission data transmitted by the terminal station 3 is acquired. The data recorder 223 writes the terminal transmission data acquired using the reception process into the data storage 23.

The base station communicator 24 transmits terminal transmission data to the base station 4. The base station communicator 24 includes a storage 241, a controller 242, a transmission data modulator 243, and a transmitter 244.

The storage 241 stores in advance a transmission weight for each transmission time of a base station downlink signal transmitted from each antenna 25. The transmission weight for each transmission time is calculated on the basis of orbit information of the LEO satellite and the position of each antenna station 41. A constant transmission weight may be used regardless of the transmission time.

The controller 242 instructs the transmission data modulator 243 to transmit terminal transmission data. In addition, the controller 242 instructs the transmitter 244 to a transmission weight each transmission time read from the storage 241. The transmission data modulator 243 receives an instruction from the controller 242 and reads terminal transmission data from the data storage 23 as transmission data. The transmission data modulator 243 converts the read transmission data into parallel signals and then modulates the parallel signals. The transmitter 244 performs weighting of the modulated parallel signals using a transmission weight instructed from the controller 242 and generates a base station downlink signal transmitted from each of the antennas 25. The transmitter 244 transmits the generated base station downlink signals from the antennas 25 using MIMO.

The terminal station 3 includes a data storage 31, a transmitter 32, and one or a plurality of antennas 33. The data storage 31 stores sensor data and the like. The transmitter 32 reads sensor data from the data storage 31 as terminal transmission data and wirelessly transmits a terminal uplink signal in which the read terminal transmission data has been set through the antennas 33. The transmission unit 32 transmits a signal according to, for example, Low Power Wide Area (LPWA). Further, the transmitter 32, as well as other terminal stations 3, may perform transmission according to time division multiplexing, Orthogonal Frequency Division Multiplexing (OFDM), MIMO, or the like.

The base station 4 includes a plurality of antenna stations 41, a receiver 42, and a base station signal reception processor 43. Antenna station 41 converts base station downlink signal received from the mobile relay station 2 into an electric signal and outputs the electric signal to the receiver 42. The receiver 42 aggregates base station downlink signals received from the plurality of antenna stations 41. The receiver 42 includes a storage 421, a controller 422, and an adder 423.

The storage 421 stores a reception weight for each reception time and transmission capacity information in advance. The transmission capacity information represents a transmission capacity of a downlink of each antenna station 41 for each reception time. A reception weight for each reception time is calculated on the basis of orbit information of the LEO satellite and a position of each antenna station 41.

The controller 422 selects antenna stations 41 of a predetermined number in order of largest to smallest transmission capacity at each reception time by referring to the transmission capacity information stored in the storage 421. The number of antenna stations 41 that are selected is smaller than a total number of antenna stations 41 included in the base station 4. The controller 422 instructs the adder 423 to add reception signals of the selected antenna stations 41. In addition, the controller 422 reads a reception weight of each reception signal for each reception time from the storage 421 and instructs the read reception weight to the adder 423.

The adder 423 multiplies a reception signal of each of antenna stations 41 instructed to be added from the controller 422 by a reception weight instructed from the controller 422 and adds and synthesizes reception signals multiplied by reception weights. The same reception weight may be used regardless of the reception time.

The base station signal reception processor 43 demodulates and decodes a reception signal acquired by adding and synthesizing the reception signals using the adder 423, thereby acquiring terminal transmission data.

An operation of the wireless communication system 1 will be described. The mobile relay station 2 accumulates terminal transmission data received from each terminal station 3 in the data storage 23. More specifically, each terminal station 3 acquires data detected by a sensor, which is not illustrated, provided outside or inside as required and writes the acquired data in the data storage 31. The transmitter 32 reads sensor data from the data storage 31 as terminal transmission data and wirelessly transmits a terminal uplink signal in which the read terminal transmission data is set from the antenna 33. The receiver 221 of the mobile relay station 2 receives a terminal uplink signal transmitted from each terminal station 3, and the terminal signal reception processor 222 demodulates and decodes the terminal uplink signal received by the receiver 221, thereby acquiring terminal transmission data. The data recorder 223 writes the terminal transmission data in the data storage 23.

Figure 3:
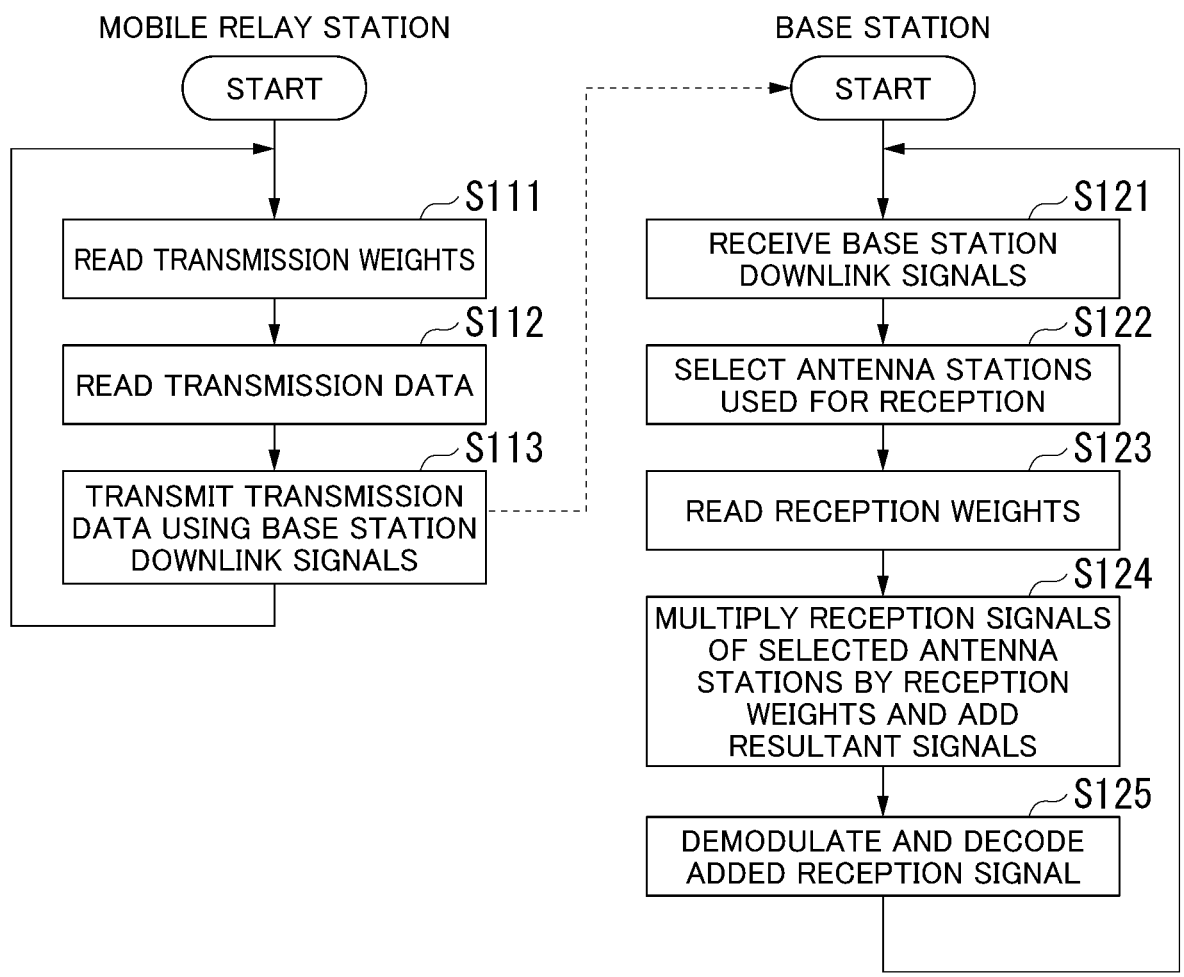
FIG. 3 is a flowchart illustrating a process of the wireless communication system according to this embodiment.

FIG. 3 is a flowchart illustrating a process of the wireless communication system 1 of a case in which a base station downlink signals are transmitted from the mobile relay station 2. The controller 242 included in the base station communicator 24 of the mobile relay station 2 reads transmission weights corresponding to the current time from the storage 241 and gives an instruction of the transmission weights to the transmitter 244 (Step S111). The transmission data modulator 243 receives an instruction from the controller 242 and reads terminal transmission data accumulated in the data storage 23 as transmission data (Step S112).

The transmission data modulator 243 encodes the read transmission data, performs parallel conversion of the encoded transmission data, and then modulates the converted data. The transmitter 244 performs weighting of the transmission data modulated by the transmission data modulator 243 using transmission weights instructed from the controller 242, thereby generating a base station downlink signal that is a transmission signal to be transmitted from each antenna 25. The transmitter 244 transmits each generated base station downlink signal from the antennas 25 using MIMO (Step S113). The mobile relay station 2 repeats the process from Step S111. In addition, the mobile relay station 2 may perform the process of Step S111 after the process of Step S112.

Each antenna station 41 of the base station 4 outputs a reception signal acquired by converting the base station downlink signal received from the mobile relay station 2 into an electric signal to the receiver 42 (Step S121). The controller 422 selects some antenna stations 41 of a predetermined number having large transmission capacities at the current time among all the antenna stations 41 as a subset by referring to the transmission capacity information stored in the storage 421 (Step 122). The controller 422 instructs the adder 423 to use reception signals of the selected antenna stations 41 of the subset for reception. In addition, the controller 422 reads a reception weight corresponding to the current time from the storage 421 and gives an instruction of the read reception weight to the adder 423 (Step S123).

The adder 423 selects a reception signal of each antenna station 41 instructed to be used for reception from the controller 422 and multiplies the selected reception signal by a reception weight instructed from the controller 422. The adder 423 adds reception signals that have been multiplied by reception weights (Step S124). The base station signal reception processor 43 demodulates the added reception signal and decodes the demodulated reception signal to acquire terminal transmission data (Step S125). The base station 4 repeats the process from Step S121.

In addition, in a case in which the mobile relay station 2 includes only one antenna 25, the mobile relay station 2 does not perform the process of Step S111. Then, in Step S113, the transmission data modulator 243 modulates transmission data of a serial signal, and the transmitter 244 transmits a base station downlink signal in which the modulated transmission data is set from the antenna 25.

In the description presented above, although the storage 421 of the base station 4 stores transmission capacity information and reception weights that have been calculated in advance, the controller 422 may generate such information as required and write the generated information in the storage 421.

In addition, the storage 421 may store antenna stations 41 of a subset for each time or for each time frame in place of the transmission capacity information. Antenna stations 41 of a predetermined number are selected as a subset in order of largest to smallest transmission capacity on the basis of a transmission capacity of a downlink of each antenna station 41 for each time. The controller 422 reads information of the antenna stations 41 of the subset corresponding to the current time from the storage 421 in Step S122.

The mobile relay station 2 may receive a base station uplink signal transmitted from the base station 4. In such a case, as described above, a transmission capacity of an uplink between each antenna of the mobile relay station 2 and each antenna station 41 of the base station 4 at each time is calculated in advance on the basis of movement schedule information of the mobile relay station 2, information of the position of each antenna station 41 of the base station 4, and a frequency of wireless communication.

Figure 4:
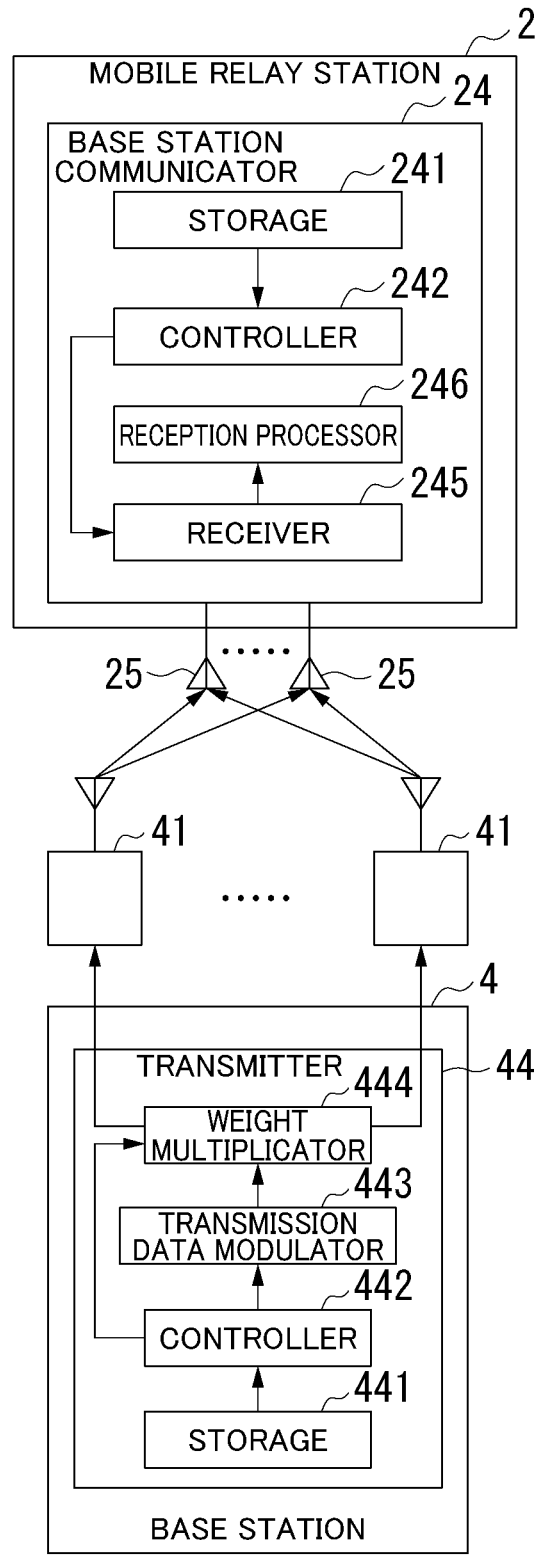
FIG. 4 is a functional block diagram of a mobile relay station and a base station according to this embodiment.

FIG. 4 is a block diagram illustrating a configuration of the mobile relay station 2 and the base station 4 of a case in which the mobile relay station 2 receives a base station uplink signal from the base station 4. In FIG. 4, only functional modules relating to transmission/reception of base station uplink signals are extracted and illustrated.

The base station 4 includes a transmitter 44. The transmitter 44 includes a storage 441, a controller 442, a transmission data modulator 443, and a weight multiplicator 444.

The storage 441 stores transmission capacity information and a transmission weight for each transmission time in advance. The transmission capacity information stored by the storage 441 represents a transmission capacity of an uplink between each antenna station 41 and the mobile relay station 2 for each transmission time. A transmission weight for each transmission time is calculated on the basis of orbit information of the LEO satellite and a position of each antenna station 41.

The controller 442 selects antenna stations 41 of a predetermined number in order of largest to smallest transmission capacity of the uplink at each transmission time by referring to the transmission capacity information stored in the storage 441. The number of selected antenna stations 41 is smaller than a total number of the antenna stations 41 included in the base station 4. The controller 442 instructs the transmission data modulator 443 to transmit a terminal uplink signal using the antenna station 41 selected for each transmission time. In addition, the controller 442 reads a transmission weight of each antenna station 41 for each transmission time from the storage 441 and gives an instruction of the read transmission weight to the weight multiplicator 444.

The transmission data modulator 443 encodes transmission data to be transmitted to the mobile relay station 2. The transmission data modulator 443 converts the encoded transmission data into parallel signals to be transmitted from each antenna station 41 instructed from the controller 442 and then modulates the parallel signals. The weight multiplicator 444 performs weighting of the modulated parallel signals using transmission weights instructed from the controller 442 and generates a base station uplink signal transmitted from each of antenna stations 41. The weight multiplicator 444 outputs the generated base station uplink signals to a corresponding antenna stations 41. Each of the antenna stations 41 selected by the controller 442 wirelessly transmits the base station uplink signal.

The base station communicator 24 of the mobile relay station 2 includes a storage 241, a controller 242, a receiver 245, and a reception processor 246. The storage 241 stores a reception weight of the base station uplink signal, which is received by each antenna 25, for each reception time in advance. The reception weight for each reception time is calculated on the basis of the orbit information of the LEO satellite and the position of each antenna station 41. In addition, a constant reception weight may be used regardless of the reception time.

The controller 242 reads a reception weight of each antenna 25 for each reception time from the storage 241 and gives an instruction of the read reception weight to the receiver 245. The receiver 245 receives a base station uplink signal using each antenna 25 and performs weighting of the reception signal received by each antenna 25 using a reception weight instructed from the controller 242 and then adds and synthesizes the reception signals. The reception processor 246 demodulates and decodes the reception signal added and synthesized by the receiver 245, thereby acquiring transmission data transmitted by the base station 4.

Figure 5:
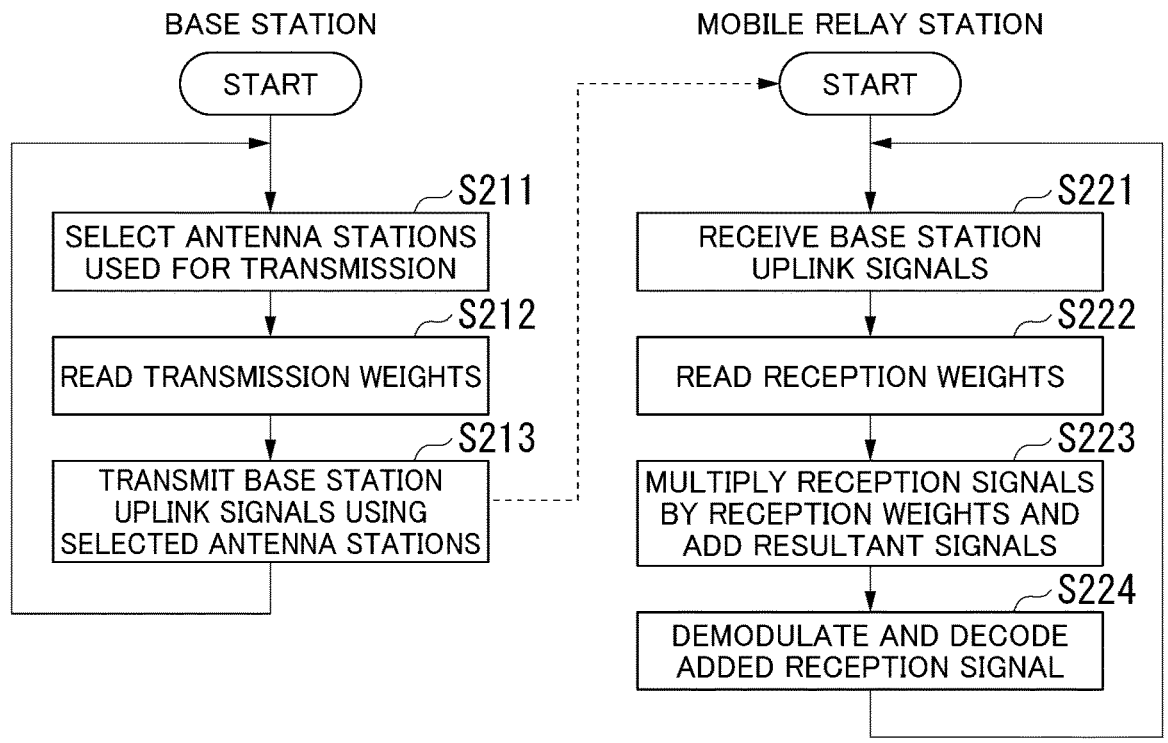
FIG. 5 is a flowchart illustrating a process of the wireless communication system according to this embodiment.

FIG. 5 is a flowchart illustrating a process of the wireless communication system 1 of a case in which a base station uplink signal is transmitted from the base station 4. The controller 442 of the base station 4 selects antenna stations 41 of a predetermined number in order of largest to smallest transmission capacity of the uplink at the current time as a subset by referring to the transmission capacity information stored in the storage 441 (Step S211). The controller 442 instructs the transmission data modulator 443 to transmit terminal uplink signals using the antenna stations 41 of the subset. In addition, the controller 442 reads a transmission weight of each of the antenna stations 41 of the subset corresponding to the current time from the storage 441 and gives an instruction of the read transmission weight to the weight multiplicator 444 (Step S212).

The transmission data modulator 443 encodes transmission data transmitted to the mobile relay station 2, converts the encoded transmission data into parallel signals to be transmitted from each of the antenna stations 41 of the subset, and then modulates the parallel signals. The weight multiplicator 444 performs weighting of the modulated parallel signals using a transmission weight instructed from the controller 442 and generates a base station uplink signal to be transmitted from each of the antenna stations 41 of the subset. The weight multiplicator 444 outputs the generated base station uplink signal to a corresponding antenna station 41. Each of the antenna stations 41 of the subset wirelessly transmits the base station uplink signal (Step S213).

The receiver 245 of the mobile relay station 2 receives the base station uplink signal using each antenna 25 (Step S221). The controller 242 reads a reception weight of each antenna 25 corresponding to the current time from the storage 241 and gives an instruction of the read reception weight to the receiver 245 (Step S222). The receiver 245 performs weighting of a reception signal received by each antenna 25 using a reception weight instructed from the controller 242 and then performs addition and synthesis of the reception signals (Step S223). The reception processor 246 demodulates and decodes the reception signal acquired by performing addition and synthesis using the receiver 245 and acquires transmission data transmitted by the base station 4 (Step S224).

In addition, in a case in which the mobile relay station 2 includes only one antenna 25, the mobile relay station 2 does not perform the processes of Step S222 and Step S223. In Step S224, the reception processor 246 demodulates and decodes the base station uplink signal received by the receiver 245 using the antenna 25.

In addition, in the description presented above, although the storage 441 of the base station 4 stores the transmission capacity information and the transmission weights calculated in advance, the controller 442 may generate such information as required and write the generated information in the storage 441. In addition, the base station 4 may transmit information of a transmission weight and a reception weight of each antenna 25 for each time to the mobile relay station 2 using a base station uplink signal.

In addition, the storage 441 may store antenna stations 41 of a subset for each time or each time frame in place of the transmission capacity information. Antenna stations 41 of a predetermined number are selected as a subset in order of largest to smallest transmission capacity on the basis of the transmission capacity of the uplink of each antenna station 41 for each time. The controller 442 reads information of the antenna stations 41 of the subset corresponding to the current time from the storage 441 in Step S211.

According to the embodiment described above, the base station 4 can receive data collected from a plurality of terminal stations 3 from the mobile relay station 2 with good quality using antenna stations 41 of a subset. In addition, in the present embodiment, a channel model is designated in advance, and a reception weight and a transmission weight according to movement of the mobile relay station 2 and information or antenna stations 41 of a subset for selecting antenna stations 41 of a subset used for transmission/reception are calculated in advance. For this reason, feedback of CSI is not required, and a transmission/reception process between the mobile relay station 2 and the base station 4 can be reduced. In addition, by storing transmission capacities calculated in advance in the base station 4 and selecting antenna stations 41 of a subset on the basis of the stored transmission capacities, in a case in which a transmission capacity of antenna stations 41 selected as a subset is reduced for a certain reason, other antenna stations 41 can be selected.

Second Embodiment

In the first embodiment, data is received by all the antenna stations of a base station. In the present embodiment, switching to antenna stations having a high transmission capacity is sequentially performed. Hereinafter, this embodiment will be described with focusing on differences from the first embodiment.

A configuration of a wireless communication system according to this embodiment is similar to the wireless communication system 1 according to the first embodiment illustrated in FIG. 2. Similar to the first embodiment, in the present embodiment, a transmission capacity between an antenna 25 of a mobile relay station 2 and each antenna station 41 of a base station 4 is calculated at each time. Antenna stations 41 of a predetermined number are selected as the subset such that a transmission capacity of a downlink becomes a maximum for each time. In a storage 241 of the mobile relay station 2, transmission weights used for transmitting a base station downlink signal to the antenna stations 41 of the subset selected for each time or each time frame are stored in advance. In addition, in a storage 421 of the base station 4, selected antenna information representing antenna stations 41 of a subset selected for each time or a time frame and a reception weight with which a reception signal according to the antenna stations 41 of the subset selected for each time is multiplied are stored in advance.

Figure 6:
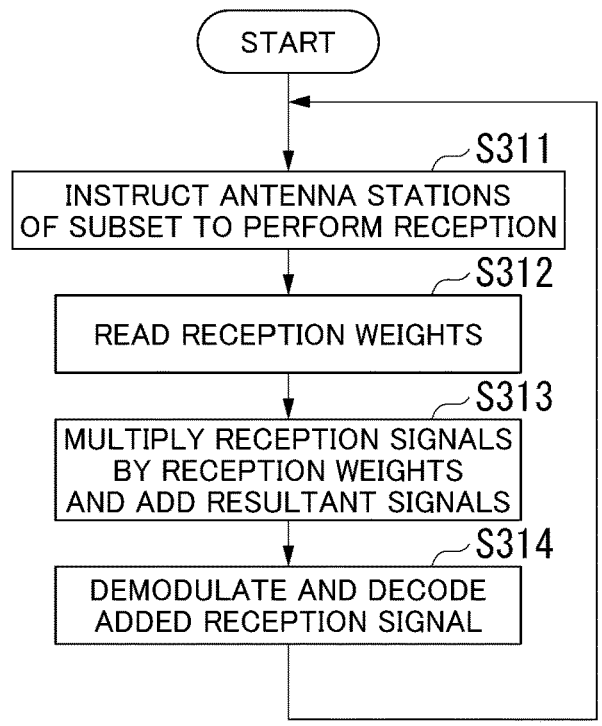
FIG. 6 is a flowchart illustrating a process of a base station according to a second embodiment.

The base station 4 according to this embodiment performs a process represented in FIG. 6 in place of the processes of Step S121 to Step S122 represented in FIG. 3. FIG. 6 is a flowchart illustrating the process of the base station 4 according to this embodiment.

A controller 422 of the base station 4 reads selected antenna information stored in the storage 421 that is information of antenna stations 41 of a subset at the current time and instructs the antenna stations 41 of the subset represented by the read selected antenna information to perform reception (Step S311). In addition, the controller 422 may instruct antenna stations 41 not included in the subset to stop reception. Each antenna station 41 instructed to perform reception receives a base station downlink signal from the mobile relay station 2 and outputs a reception signal acquired by converting the received base station downlink signal into an electric signal to a receiver 42.

The controller 422 reads a reception weight for a reception signal of each of the antenna stations 41 of the subset from the storage 421 and gives an instruction to the adder 423 (Step S312). The adder 423 multiplies each of reception signals input from the antenna stations 41 of the subset with the reception weight instructed from the controller 422. The adder 423 adds reception signals with which reception weights have been multiplied (Step S313). A base station signal reception processor 43 demodulates the added reception signal and decodes the demodulated reception signal, thereby acquiring terminal transmission data (Step S314). The base station 4 repeats the process from Step S311.

In addition, the storage 421 may store transmission capacity information similar to that according to the first embodiment. In Step S311, the controller 422 selects some antenna stations 41 of a predetermined number having large transmission capacities at the current time among all the antenna stations 41 as a subset by referring to the transmission capacity information. In addition, information stored in the storage 421 of the base station 4 may be generated by the controller 422 as required.

In a case in which the mobile relay station 2 according to this embodiment receives a base station uplink signal from the base station 4, the mobile relay station 2 and the base station 4 have the configuration according to the first embodiment illustrated in FIG. 4. However, a storage 441 of the base station 4 stores selected antenna information representing antenna stations 41 of a subset selected for each tune or each time frame and a transmission weight by which a transmission signal transmitted from each of the antenna stations 41 of the subset selected for each transmission time is multiplied in advance. The antenna stations 41 of the subset are selected on the basis of a transmission capacity of an uplink between the antenna 25 of the mobile relay station 2 and each antenna station 41 of the base station 4 for each time. In addition, the storage 241 of the mobile relay station 2 stores a reception weight used for receiving a base station uplink signal from the antenna station 41 of the subset selected for each time or each time frame.

The mobile relay station 2 and the base station 4 according to this embodiment perform processes similar to those according to the first embodiment illustrated in FIG. 5 except for the following points. In other words, in Step S211, a controller 442 of the base station 4 reads antenna stations 41 of a subset at the current time from selected antenna information stored in a storage 441 and instructs the read antenna station 41 of the subset to perform transmission. In addition, the controller 442 may instruct antenna stations 41 not included in the subset to stop transmission.

Furthermore, a storage 441 may store transmission capacity information similar to that according to the first embodiment. The controller 442 selects some antenna stations 41 of a predetermined number having large transmission capacities at the current time among all the antenna stations 41 as a subset by referring to the transmission capacity information. In addition, information stored in the storage 441 of the base station 4 may be generated by the controller 442 as required.

Third Embodiment

In the first and second embodiments, antenna stations among a plurality of antenna stations of a base station that is to be used is selected in accordance with movement of a mobile relay station. In the present embodiment, a mobile relay station to communicate with a base station is selected among a plurality of mobile relay stations. This embodiment will be described with focusing on differences from the first embodiment.

Figure 7:
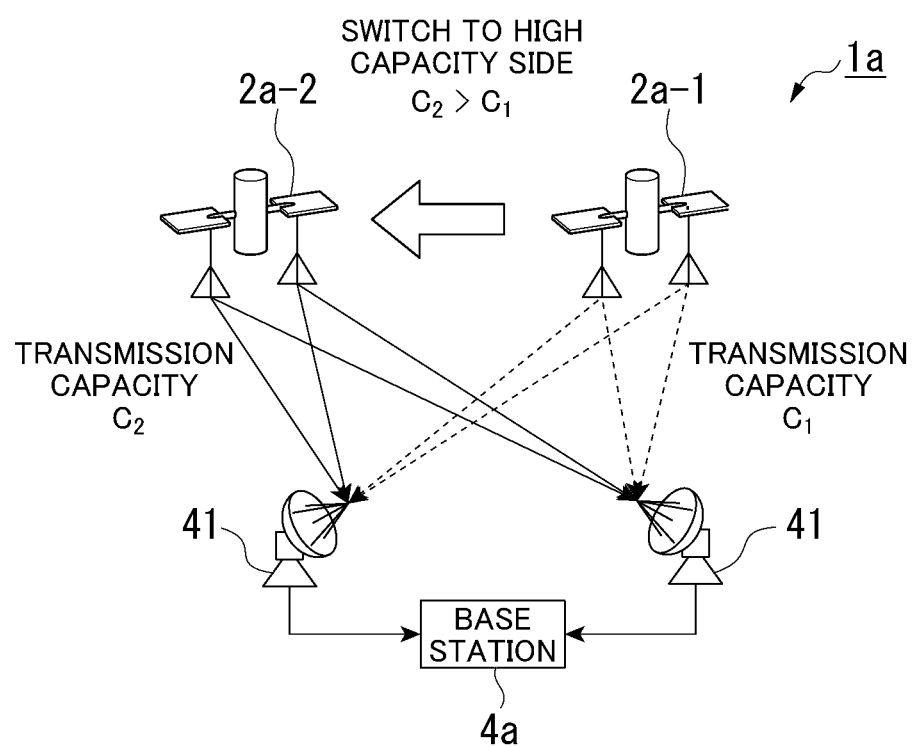
FIG. 7 is a diagram illustrating an overview of a wireless communication system according to a third embodiment.

FIG. 7 is a diagram illustrating an overview of a wireless communication system 1*a* according to this embodiment. The wireless communication system 1*a* includes a mobile relay station 2*a*, a terminal station 3, and a base station 4*a*. In the drawing, illustration of the terminal station 3 is omitted. Hereinafter, N (here, N is an integer equal to or larger than 2) mobile relay stations 2*a* will be referred to as mobile relay stations 2*a*-1 to 2*a*-N. FIG. 7 illustrates an example of a case in which N=2.

In the present embodiment, a transmission capacity $C_n$ between a mobile relay station 2*a*-*n* and all the antenna stations 41 of a base station 4*a* for each time is calculated on the basis of orbit information of a LEO satellite in which mobile relay stations 2*a*-*n* (here, n is an integer equal to or larger than 1 and equal to or smaller than N) are mounted, information of a position of each antenna station 41, and a frequency of wireless communication. Then, a mobile relay station 2*a*-*n* of which a transmission capacity $C_n$ is a maximum at each time is selected as a communication destination. The base station 4*a* stores communication destination relay station information representing a mobile relay station 2*a*-*n* of a communication destination selected at each time in advance. The base station 4*a* wirelessly communicates with the mobile relay station 2*a*-*n* that is described to be a communication destination at the current time in the communication destination relay station information. For example, in a time frame in which transmission capacity C1>transmission capacity C2, the base station 4*a* communicates with the mobile relay station 2*a*-1, and, at a timing at which transmission capacity C1<transmission capacity C2, the base station 4*a* switches the communication destination from the mobile relay station 2*a*-1 to the mobile relay station 2*a*-2.

Figure 8:
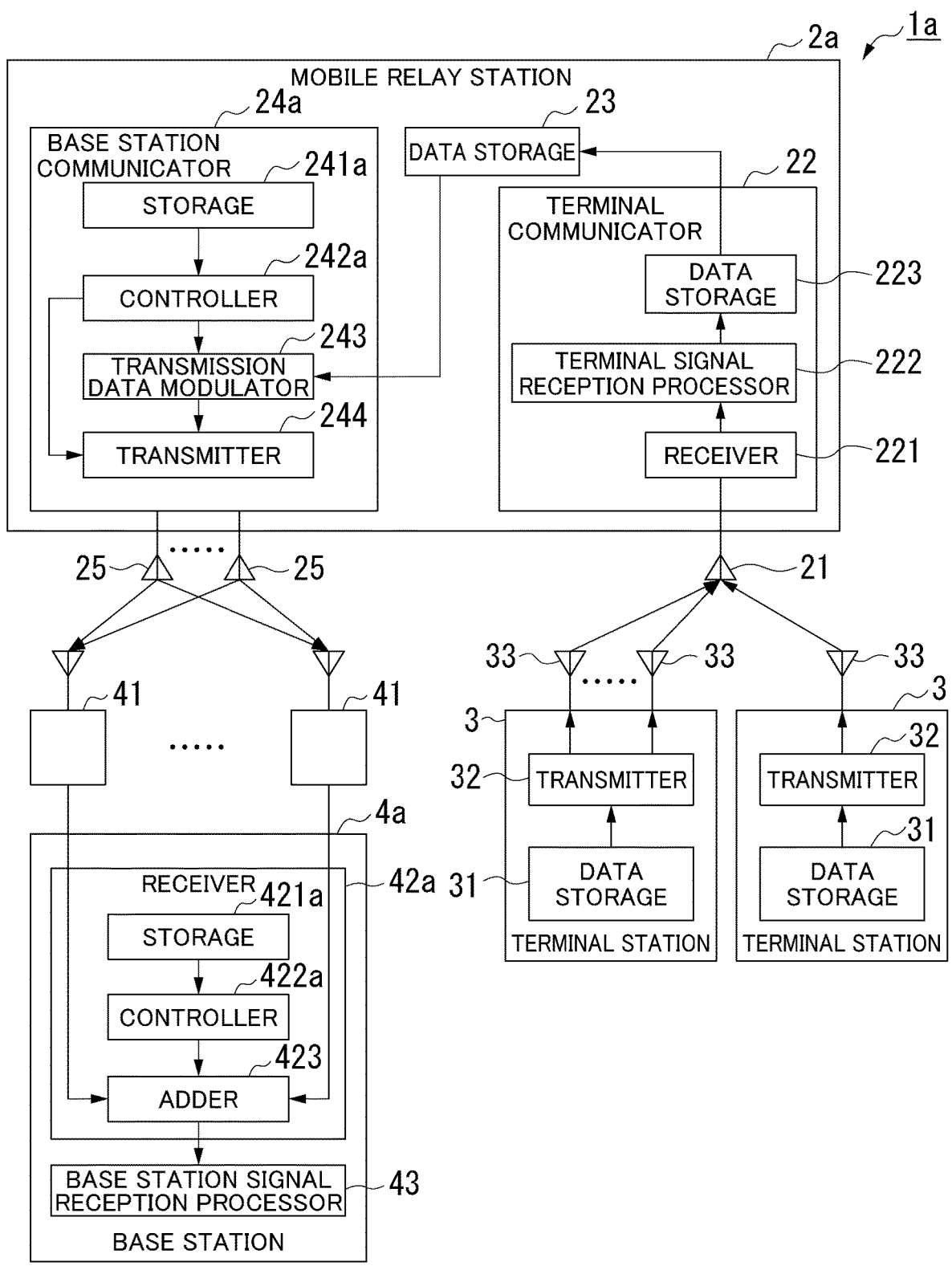
FIG. 8 is a configuration diagram of the wireless communication system according to the third embodiment.

FIG. 8 is a block diagram illustrating a configuration of the wireless communication system 1*a* according to this embodiment. In the drawing, the same reference signs will be assigned to the same parts as those of the wireless communication system 1 according to the first embodiment illustrated in FIG. 2, and description thereof will be omitted.

The mobile relay station 2*a* includes one or more antennas 21, a terminal communicator 22, a data storage 23, a base station communicator 24*a*, and one or more antennas 25. In the present embodiment, an example of a case where the mobile relay station 2*a* includes a plurality of antennas 25 and wirelessly communicates with the base station 4*a* using MIMO will be described. The base station communicator 24*a* includes a storage 241*a*, a controller 242*a*, a transmission data modulator 243, and a transmitter The storage 241*a* stores communication destination base station information in which a communication time frame and a base station 4*a* of which a communication destination is its own mobile relay station in the communication time frame are associated with each other. 244.

The storage 241*a* stores communication destination base station information in which a communication time frame and a base station 4*a* of which a communication destination is its own mobile relay station in the communication time frame are associated with each other. In a communication time frame set in the communication destination base station information, the controller 242*a* performs control of the transmission data modulator 243 and the transmitter 244 to communicate with a base station 4*a* associated with the communication time frame. In addition, the storage 241*a* stores a transmission weight of a base station downlink signal transmitted from each antenna 25 to the base station 4*a* that is the communication destination for each transmission time in advance. The transmission weight for each transmission time is calculated on the basis of the orbit information of the LEO satellite and the position of the antenna station 41 of the base station 4*a* that is the communication destination.

The base station 4*a* includes a plurality of antenna stations 41, a receiver 42*a*, and a base station signal reception processor 43. The receiver 42*a* includes a storage 421*a*, a controller 422*a*, and an adder 423.

The storage 421*a* stores communication destination relay station information and a reception weight for each reception time in advance. The communication destination relay station information represents a mobile relay station 2*a* of a communication destination for each reception time or each communication time frame. The reception weight for each reception time is calculated on the basis of the orbit information of the LEO satellite in which the mobile relay station 2*a* of the communication destination is mounted at the reception time and the position of each antenna station 41. By using the reception weight, a base station downlink signal can be selectively received from the mobile relay station 2*a* of the communication destination by generating a beam. The controller 422*a* reads a reception weight of a reception signal according to each antenna station 41 for each reception time from the storage 421*a* and gives an instruction of the read reception weight to the adder 423.

An operation of the wireless communication system 1*a* will be described.

Figure 9:
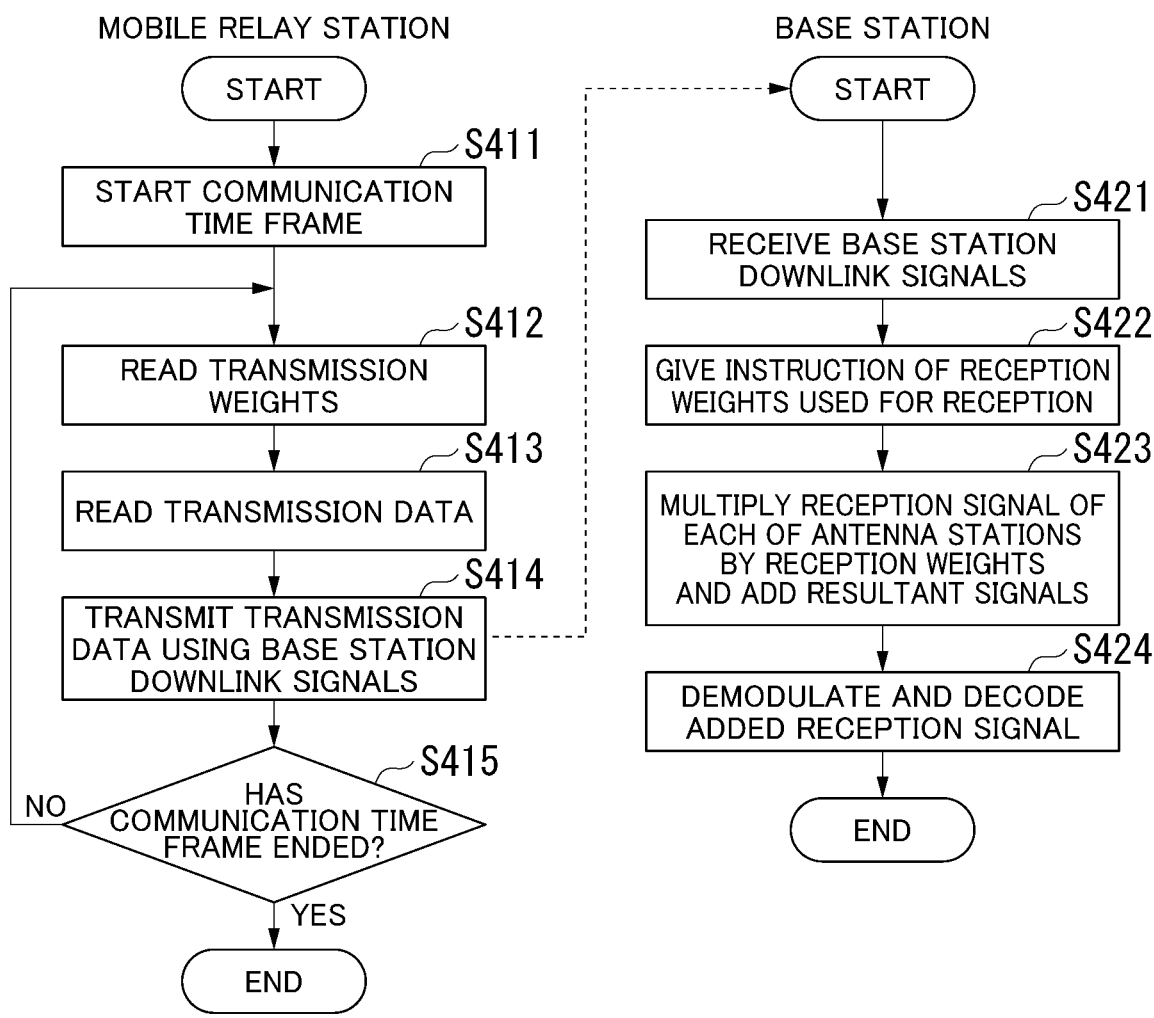
FIG. 9 is a flowchart illustrating a process of the wireless communication system according to this embodiment.

FIG. 9 is a flowchart illustrating a process of the wireless communication system 1*a* of a case in which a base station downlink signal is transmitted from the mobile relay station 2*a*. When it is detected that the current time is a start time of a communication time frame set in the communication destination base station information, the controller 242*a* of the mobile relay station 2*a* notifies the transmission data modulator 243 of a base station 4*a* associated with the communication time frame as a communication destination (Step S411). The controller 242*a* reads a transmission weight corresponding to the current time from the storage 241*a* and gives an instruction to the transmitter 244 (Step S412).

The transmission data modulator 243 reads terminal transmission data to be transmitted to the base station 4*a* that is the communication destination from the data storage 23 as transmission data (Step S413). The transmission data modulator 243 encodes the read transmission data. The transmission data modulator 243 converts the encoded transmission data into parallel data and then modulates the parallel data. The transmitter 244 performs weighting of the transmission data modulated by the transmission data modulator 243 using a transmission weight instructed from the controller 242*a*, thereby generating a base station downlink signal that is a transmission signal to be transmitted from each antenna 25. The transmitter 244 transmits each base station downlink signal that has been generated from the antenna 25 using MIMO (Step S414).

The controller 242*a* determines whether or not the current time exceeds the communication time frame detected in Step S411 (Step S415). In a case in which it is determined that the current time has not exceeded the communication time frame (Step S415: No), the controller 242*a* repeats the process from Step S412, and, in a case in which it is determined that the current time has exceeded the communication time frame (Step S415: Yes), the controller ends the process. In addition, in a case in which all the terminal transmission data to be transmitted to the mobile relay station 2*a* that is the communication destination has been transmitted, the controller 242*a* may end the process.

Each antenna station 41 of the base station 4*a* converts the base station downlink signal received from the mobile relay station 2*a* into an electric signal and outputs a reception signal converted into the electric signal to the receiver 42*a* (Step S421). The controller 422*a* gives an instruction of a reception weight corresponding to the current time to the adder 423 (Step S422). The adder 423 multiplies the reception signal of each antenna station 41 by the reception weight instructed from the controller 422*a*. The adder 423 adds the reception signals multiplied by weights and outputs the added reception signal to the base station signal reception processor 43 (Step S423). The base station signal reception processor 43 demodulates the reception signal input from the receiver 42*a* and decodes the demodulated reception signal, thereby acquiring terminal transmission data (Step S424).

In addition, in a case in which the mobile relay station 2*a* includes only one antenna 25, the mobile relay station 2*a* does not perform the process of Step S412. Then, in Step S414, the transmission data modulator 243 modulates transmission data of a serial signal, and the transmitter 244 transmits a base station downlink signal in which the modulated transmission data is set from the antenna 25. In addition, in a case in which the base station 4*a* includes only one antenna station 41, the receiver 42*a* outputs the reception signal to the base station signal reception processor 43 without performing the processes of Step S422 and Step S423.

In addition, the mobile relay station 2a may receive a base station uplink signal transmitted from the base station 4a. In such a case, as described above, a transmission capacity between each mobile relay station 2a and all the antenna stations 41 of the base station 4a is calculated, and a mobile relay station 2a of which a transmission capacity of the uplink at each time is a maximum is selected as a communication destination.

Figure 10:
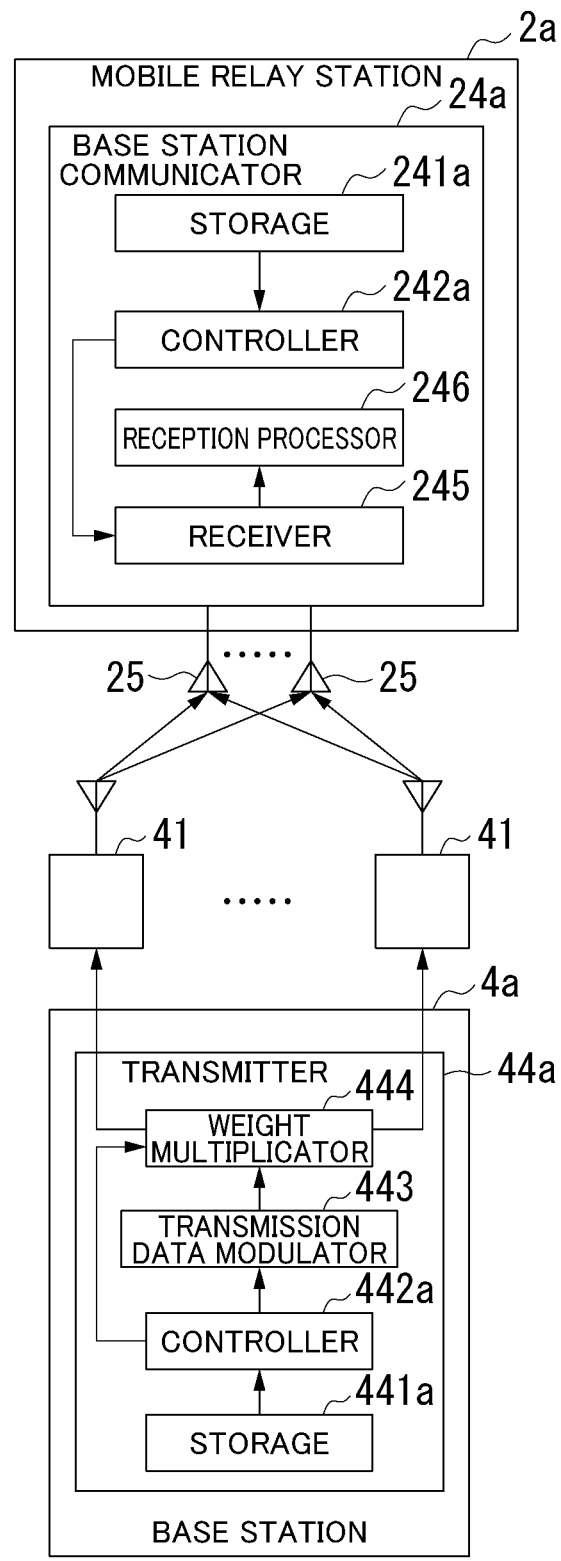
FIG. 10 is a functional block diagram of a mobile relay station and a base station according to this embodiment.

FIG. 10 is a block diagram illustrating a configuration of the mobile relay station 2a and the base station 4a of a case in which the mobile relay station 2a receives a base station uplink signal from the base station 4a. In FIG. 10, only functional modules relating to transmission/reception of base station uplink signals are extracted and illustrated.

The base station 4a includes a transmitter 44a. The transmitter 44a includes a storage 441a, a controller 442a, a transmission data modulator 443, and a weight multiplicator 444.

The storage 441a stores a mobile relay station 2a that is a communication destination and a transmission weight for each transmission time in advance. A transmission weight for each transmission time is calculated on the basis of the orbit information of the LEO satellite in which the mobile relay station 2a that is a communication destination at the transmission time is mounted and the position of each antenna station 41.

The controller 442a reads a transmission weight of a transmission signal according to each antenna station 41 for each transmission time from the storage 441a and gives an instruction of the read transmission weight to the weight multiplicator 444. The transmission data modulator 443 converts transmission data to be transmitted to the mobile relay station 2a into parallel signals to be transmitted from each antenna station 41 and then modulates the parallel signals. The weight multiplicator 444 performs weighting of the modulated parallel signals using the transmission weight instructed from the controller 442a, thereby generating a base station uplink signal to be transmitted from each antenna station 41. The weight multiplicator 444 outputs the generated base station uplink signal to a corresponding antenna station 41. The antenna station 41 wirelessly transmits the base station uplink signal.

The base station communicator 24a of the mobile relay station 2a includes a storage 241a, a controller 242a, a receiver 245, and a reception processor 246. As described above, the storage 241a stores the communication destination base station information in which a communication time frame and a base station 4a of which a communication destination is its own mobile relay station in the communication time frame are associated with each other. In addition, the storage 241a stores a reception weight of a base station uplink signal received by each antenna 25 from the base station 4a that is the communication destination for each reception time. The reception weight for each reception time is calculated on the basis of the orbit information of the LEO satellite and the position of each antenna station 41 of the base station 4a that is a communication destination.

The controller 242a reads a reception weight of each antenna 25 for each reception time from the storage 241a and gives an instruction of the read reception weight to the receiver 245. The receiver 245 receives a base station uplink signal using each antenna 25, multiplies the reception signal received by each antenna 25 by the reception weight instructed from the controller 242a, and then adds and synthesizes resultant reception signals. The reception processor 246 demodulates and decodes a reception signal acquired by adding and synthesizing the reception signals using the receiver 245, thereby acquiring transmission data transmitted by the base station 4a.

A process of the wireless communication system 1a of a case in which a base station uplink signal is transmitted from the base station 4a is similar to the process of the first embodiment illustrated in FIG. 5 except for the following points. In other words, the base station 4a selects all the antenna stations 41 in place of antenna stations 41 of a subset without performing the process of Step S211.

In addition, in a case in which the base station 4a includes only one antenna station 41, the base station 4a does not perform the processes of Step S221 and Step S222. The transmission data modulator 443 modulates encoded transmission data and outputs a base station uplink signal in which the modulated transmission data is set to the antenna station 41. In addition, in a case in which the mobile relay station 2a includes only one antenna 25, the mobile relay station 2a does not performed the processes of Step S222 and Step S223. Then, in Step S224, the reception processor 246 demodulates and decodes the base station uplink signal received by the receiver 245 using the antenna 25.

In addition, the controller 442a may generate information stored in the storage 421a of the base station 4a as required. Furthermore, the controller 442a may generate the information stored in the storage 441a of the base station 4a as required. In addition, the base station 4a may transmit the information stored in the storage 241a to the mobile relay station 2a using the base station uplink signal.

Furthermore, the process of the first or second embodiment may be performed between the base station 4a and the mobile relay station 2a that is the communication destination.

Fourth Embodiment

In the first and second embodiments described above, selection and switching of an antenna station performing reception for a base station are performed. In the present embodiment, in addition to selection and switching of an antenna station performing reception for a base station, selection and switching of an antenna performing transmission are performed also in a mobile relay station. Hereinafter, this embodiment will be described with focusing on differences from the first embodiment.

Figure 11:
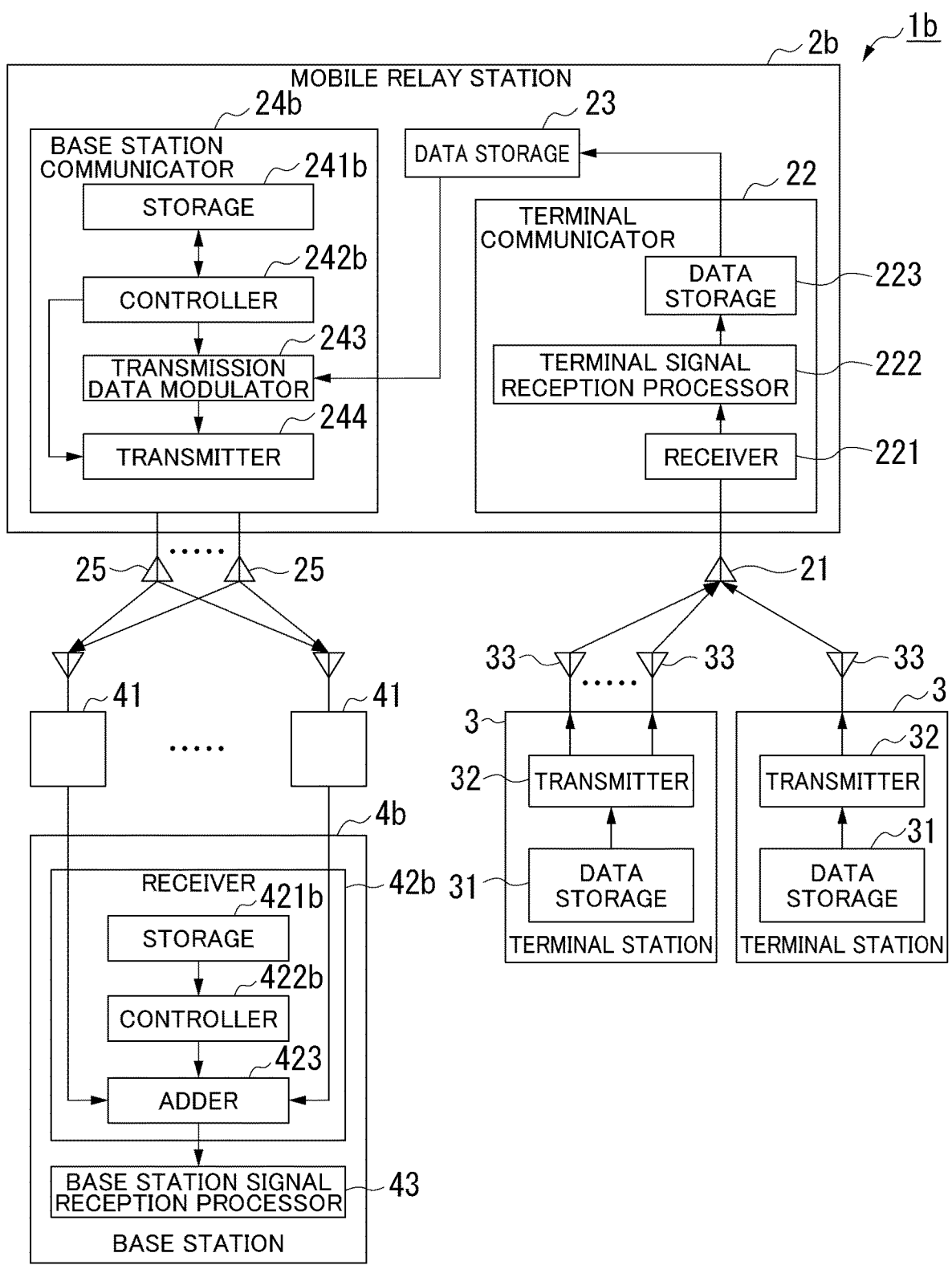
FIG. 11 is a diagram illustrating an overview of a wireless communication system according to a fourth embodiment.

FIG. 11 is a diagram illustrating an overview of a wireless communication system 1b according to a fourth embodiment. The wireless communication system 1b includes mobile relay station 2b, terminal stations 3, and base stations 4b. The number of each of the mobile relay stations 2b, the terminal stations 3, and the base stations 4b included in the wireless communication system 1b is arbitrary, but it is assumed that there are a large number of terminal stations 3.

The mobile relay station 2b includes one or more antennas 21, a terminal communicator 22, a data storage 23, a base station communicator 24, and a plurality of antennas 25. In the present embodiment, an example of a case where the mobile relay station 2b includes three or more antennas 25, and selection and switching of antennas 25 are performed at the time of performing wireless communication with the base station 4b using MIMO will be described. For example, in a case in which the mobile relay station 2b uses two antennas 25 at the time of wirelessly communicating with the base station 4b using MIMO, two antennas 25 among three or more antennas 25 included in the mobile relay station 2b are selected. The mobile relay station 2b performs switching of antennas 25 such that communication is performed using the two antennas 25 that have been selected.

The base station communicator 24b transmits terminal transmission data to the base station 4b. The base station communicator 24b includes a storage 241b, a controller 242b, a transmission data modulator 243, and a transmitter 244.

The storage 241b stores in advance a transmission weight for each transmission time of a base station downlink signal transmitted from each antenna 25. In addition, the storage 241b stores information of used antennas 25 (hereinafter, referred to as "mobile relay station used antenna information") for each time. The mobile relay station used antenna information, for example, is information in which the number of used antennas 25 and a time are associated with each other.

The controller 242b determines a combination of antennas 25, which are included in the mobile relay station 2b, used for communication between the mobile relay station 2b and the base station 4b and antenna stations 41, which are included in the base station 4b, used for communication between the mobile relay station 2b and the base station 4b (hereinafter, referred to as "a combination of used antennas") for each time on the basis of a channel capacity (transmission capacity) between the mobile relay station 2b and the base station 4b. The combination of used antennas described here is a combination of the number of antennas 25 and antenna stations 41 used for communication between the mobile relay station 2b and the base station 4b. More specifically, the combination of used antennas is a combination of the number of antennas 25 and the number of antenna stations 41 used at each time.

The controller 242b selects antennas 25 to be used for communication with the base station 4b among antennas 25 included in the mobile relay station 2b in accordance with the determined combination of used antennas for each time. The controller 242b performs switching among a plurality of antennas 25 such that communication is performed using the selected antennas 25. For switching among antennas 25, a switch may be used. The controller 242b instructs the transmission data modulator 243 to transmit the terminal transmission data. The controller 242b gives an instruction of a transmission weight for each transmission time that has been read from the storage 241 to the transmitter 244.

The base station 4b includes a plurality of antenna stations 41, a receiver 42b, and a base station signal reception processor 43. The receiver 42b aggregates base station downlink signals received from a plurality of antenna stations 41. For example, the receiver 42b aggregates base station downlink signals received from antenna stations 41 corresponding to a number notified from the mobile relay station 2b in advance. The receiver 42b includes a storage 421b, a controller 422b, and an adder 423.

The storage 421b stores information of used antenna stations 41 (hereinafter, referred to as "base station used antenna information") for each time, transmission capacity information, and a reception weight for each reception time in advance. For example, the base station used antenna information is information in which the number of antenna stations 41 to be used and a time are associated with each other.

The controller 422b selects antenna stations 41 to be used for communication with the mobile relay station 2b among antenna stations 41 included in the base station 4b on the basis of the base station used antenna information and the transmission capacity information notified from the mobile relay station 2b. For example, the controller 422b selects antenna stations 41 corresponding to the number included in the base station used antenna information in order of largest to smallest transmission capacity at each reception time.

The controller 422b instructs the adder 423 to add reception signals of the selected antenna stations 41. In addition, the controller 422b reads a reception weight of each reception signal for each reception time from the storage 421 and gives an instruction of the read reception weight to the adder 423.

Figure 12:
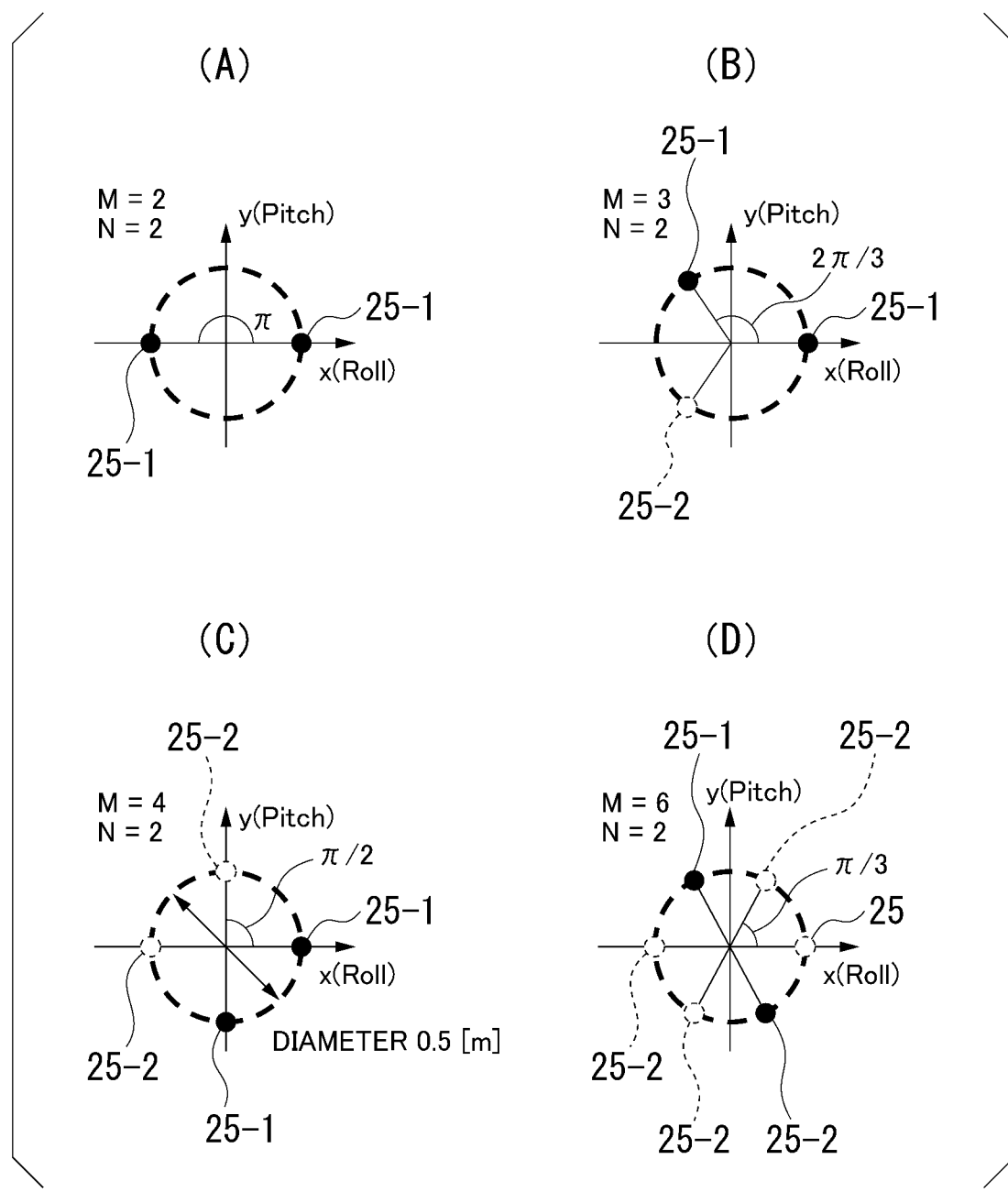
FIG. 12 is a diagram illustrating an example of arrangement of antennas arranged in a mobile relay station.

FIG. 12 is a diagram illustrating an example of arrangement of antennas 25 arranged in the mobile relay station 2b.

In FIG. 12, M represents a total number of antennas 25 arranged in the mobile relay station 2b, and N represents the number of antennas 25 used for communication with the base station 4b in the mobile relay station 2b. In addition, in FIG. 12, an antenna 25 used for communication with the base station 4b is denoted by 25-1, and an antenna 25 not used for communication with the base station 4b is denoted by 25-2.

FIG. 12(A) illustrates arrangement positions of antennas 25 of a case in which a total number of antennas 25 arranged in the mobile relay station 2b is 2, and the number of antennas 25 used by the mobile relay station 2b is 2. FIG. 12(B) illustrates arrangement positions of antennas 25 of a case in which a total number of antennas 25 arranged in the mobile relay station 2b is 3, and the number of antennas 25 used by the mobile relay station 2b is 2. FIG. 12(C) illustrates arrangement positions of antennas 25 of a case in which a total number of antennas 25 arranged in the mobile relay station 2b is 4, and the number of antennas 25 used by the mobile relay station 2b is 2. FIG. 12(D) illustrates arrangement positions of antennas 25 of a case in which a total number of antennas 25 arranged in the mobile relay station 2b is 6, and the number of antennas 25 used by the mobile relay station 2b is 2.

As illustrated in FIG. 12, the antennas 25 are disposed at the interval of $2\pi/M$. In addition, M is a total number of antennas 25.

Figure 13:
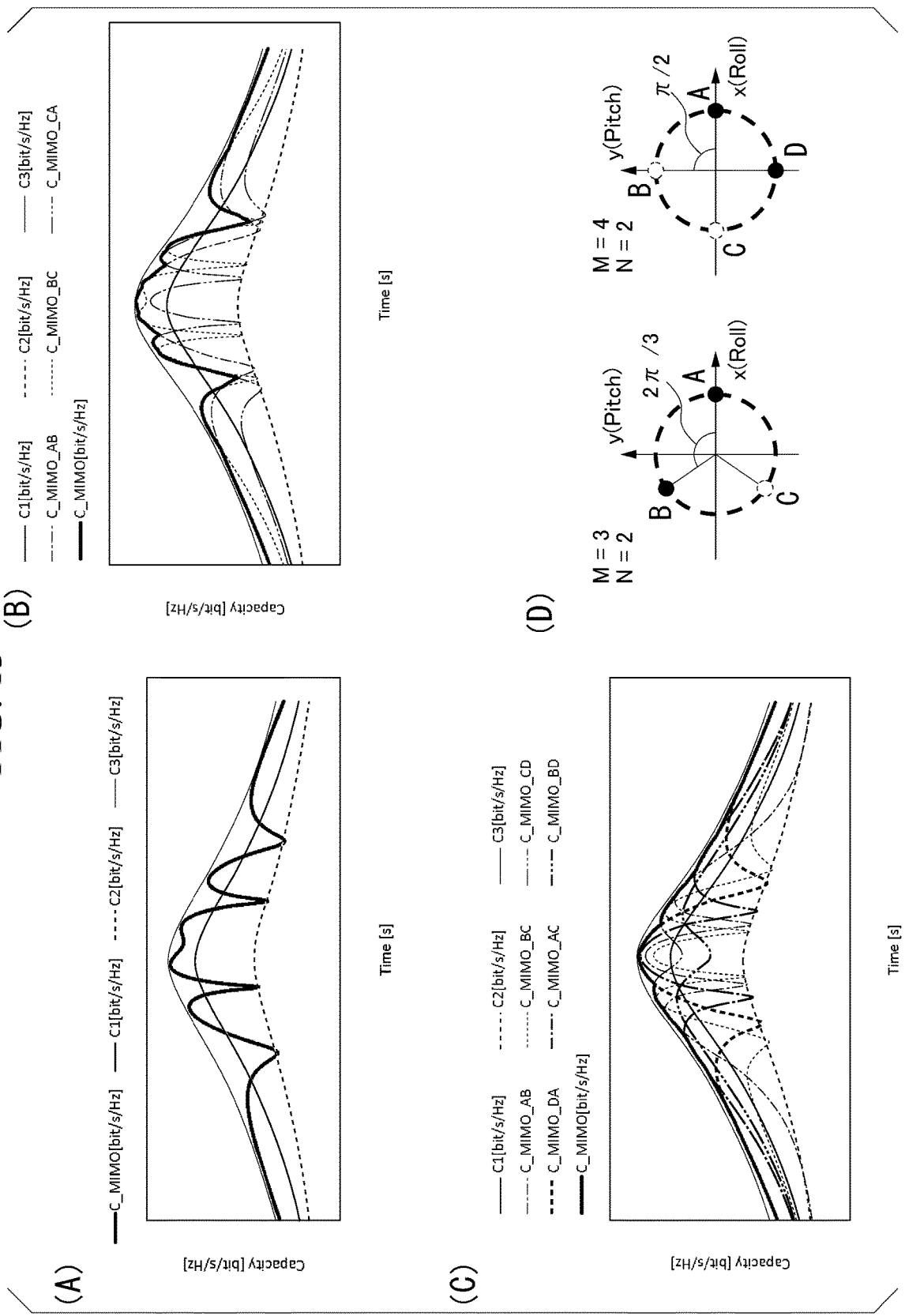
FIG. 13 is a diagram illustrating a result of analysis of a channel capacity at the time of performing MIMO communication between a mobile relay station and a base station.

FIG. 13 illustrates a result of analysis of a channel capacity at the time of performing MIMO communication between the mobile relay station 2b and the base station 4b. In FIG. 13, the horizontal axis represents time, and the vertical axis represents a channel capacity. FIG. 13(A) illustrates a result of analysis of a channel capacity in the case of the arrangement of antennas 25 illustrated in FIG. 12(A), FIG. 13(B) illustrates a result of analysis of a channel capacity in the case of the arrangement of antennas 25 illustrated in FIG. 12(B), and FIG. 13(C) illustrates a result of analysis of a channel capacity in the case of the arrangement of antennas 25 illustrated in FIG. 12(C).

As illustrated in FIG. 13, in accordance with an increase in the total antenna number M of antennas 25, a result "a channel capacity (C_MIMO) at the time of applying MIMO gradually approaching a maximum value (C3)=an interference time being decreased" was acquired.

Details of the general example illustrated in FIG. 13 are illustrated below.

C_MIMO: channel capacity at time of applying MIMO (after combination optimization)

C1: channel capacity at time of complete separation of signal (channel matrix has only diagonal elements)

C2: minimum value of channel capacity (channel correlation 0)

C3: maximum value of channel capacity (channel correlation 1)

C_MIMO_AB: channel capacity at time of selection of antennas A and B (see FIG. 13(D))
C_MIMO_BC: channel capacity at time of selection of antennas B and C (see FIG. 13(D))
C_MIMO_CD: channel capacity at time of selection of antennas C and D (see FIG. 13(D))
C_MIMO_DA: channel capacity at time of selection of antennas D and A (see FIG. 13(D))
C_MIMO_AC, C_MIMO_CA: channel capacity at time of selection of antennas A and C (see FIG. 13(D))
C_MIMO_BD: channel capacity at time of selection of antennas B and D (see FIG. 13(D))

Figure 14:
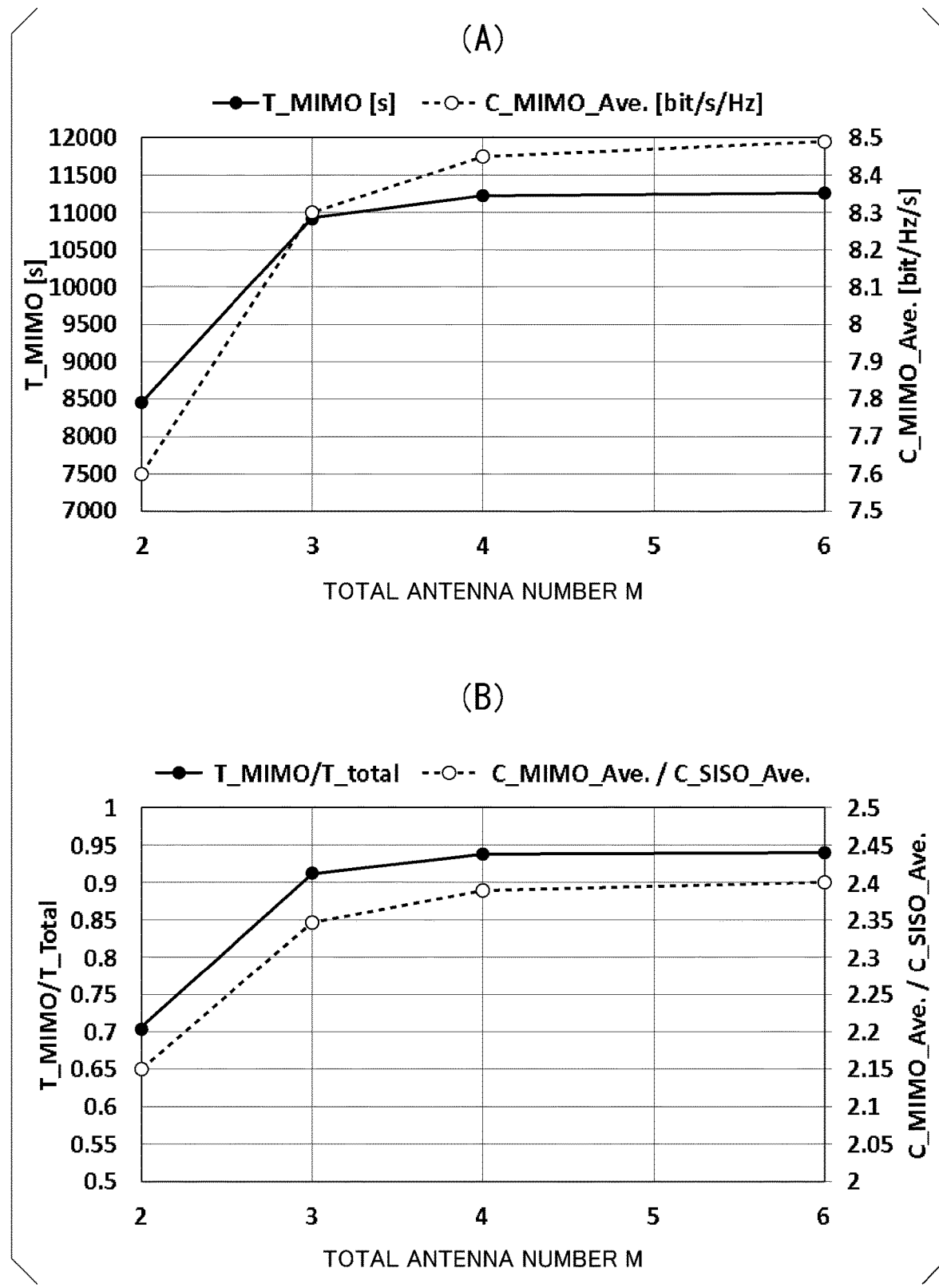
FIG. 14 is a diagram illustrating a result of analysis of a MIMO application time and a channel capacity average value per week for each number of antennas.

FIG. 14 is a diagram illustrating a result of analysis of a MIMO application time and a channel capacity average value per week for each number of antennas.

In FIG. 14, a time frame in which the channel capacity is above "the channel capacity (C1) at time of complete separation of signals" in FIG. 13 is defined as an MIMO applicable time. SISO is at time of transmission using one antenna, MIMO is at time of transmission using two antennas, and transmission power of one antenna is assumed to be constant. As illustrated in FIG. 14, a result "in accordance with an increase in the total antenna number M, the MIMO applicable time and the average channel capacity increasing=the interference time being decreased" was acquired.

Details of the general example illustrated in FIG. 13 are illustrated below.
T_MIMO: sum of time frames in which C_MIMO>C1 in all visualization time during 1 week
T_MIMO: sum of all visualization times during 1 week
C_MIMO_Ave.: average value of channel capacity in all visualization paths during 1 week at time of performing MIMO (at time of transmission using 2 antennas)
C_SISO_Ave.: average value of channel capacity in all visualization paths during 1 week at time of performing SISO (at time of transmission using 1 antenna)

An operation of the wireless communication system 1b will be described.

Figure 15:
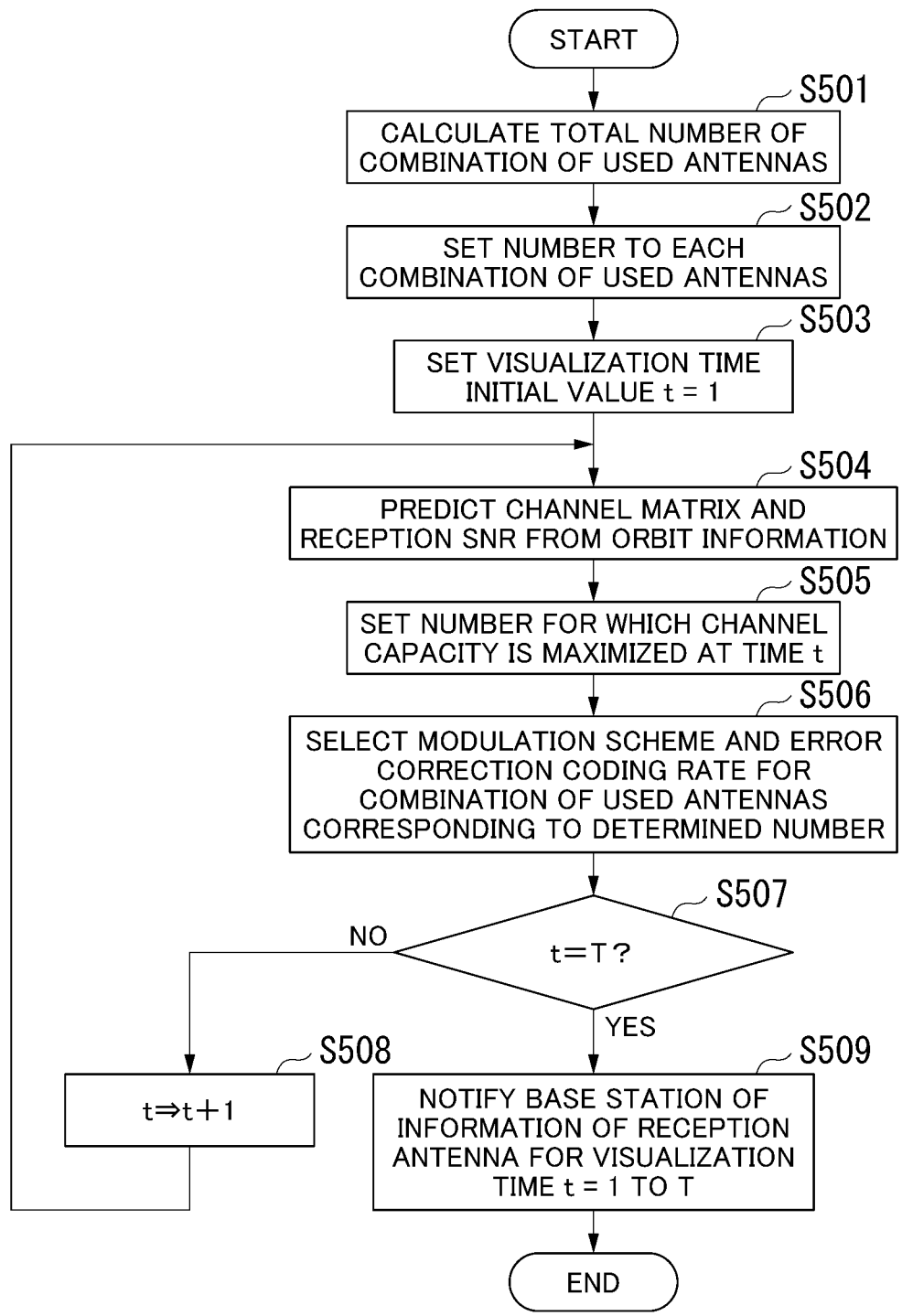
FIG. 15 is a flowchart illustrating a process of a mobile relay station determining a combination of antennas to be used.

FIG. 15 is a flowchart illustrating a process of the mobile relay station 2b determining a combination of used antennas. In FIG. 15, a process of the mobile relay station 2b determining a combination of antennas to be used for a visualization time before the mobile relay station 2b starts communication for transmitting data acquired from the terminal station 3 to the base station 4b will be described. The visualization time may be calculated on the basis of the orbit information of the mobile relay station 2b and the position information of the base station 4b or may be set in advance.

The controller 242b, first, derives a total combination number X of used antennas on the basis of the following Equation (1) (Step S501).

[Math. 1]

$$X = \binom{M_s}{N} \times \binom{M_t}{N} \times \binom{M_r}{N} \quad \text{Equation (1)}$$

In Equation (1), $M_s$ represents the number of mobile relay stations 2b, $M_t$ represents the number of antennas (for example, the antennas 25) to be used for transmission, n represents the number of antennas (for example, the antenna stations 41) to be used for reception, and N represents the number of streams (N=2 in the case of 2×2 MIMO). In the example of this embodiment, the number of mobile relay stations 2b is one, and thus $M_s$ is 1. Here, in a case in which a plurality of mobile relay stations 2b are included in the wireless communication system 1b, the number of mobile relay stations 2b is the value of $M_s$.

Next, the controller 242b sets a number for each combination of used antennas (Step S502). For example, the controller 242b sequentially sets the number, for example, x=1, 2, . . . , X for each combination of used antennas. As one example, a combination of the number "1" of mobile relay stations 2b, the number "2" of antennas 25, and the number "2" of antenna stations 41 is set as Sequence "1". The controller 242b may store a combination and the number of used antennas in the storage 241b in association with each other.

Next, the controller 242b sets an initial value of a visualization time t to 1 (Step S503). Here, the visualization time t represents a time in which the mobile relay station 2b and the base station 4b can communicate with each other. The controller 242b predicts a channel matrix (H) and a reception SNR(γ) from the orbit information of the mobile relay station 2b at the time t (Step S504). The controller 242b determines a number x(t) of a combination of used antennas for maximizing a channel capacity $C_x$ at the time t using the channel matrix (H) and the reception SNR(γ) that have been predicted (Step S505). For example, as an example of optimization of the channel capacity $C_x$, the controller 242b determines a number x(t) of a combination of used antennas for maximizing the channel capacity Cx in accordance with the following Equation (2). As a parameter that becomes an index, an arbitrary value other than the channel capacity may be used. In addition, in description of this specification (this embodiment and other embodiments), as an example of optimization of the channel capacity $C_x$, a case in which Equation (2) is used will be described. The controller 242b stores information of the number of antennas (for example, the antennas 25) used for transmission in the combination of used antennas associated with the determined number x(t) in the storage 241b as mobile relay station used antenna information.

[Math. 2]

$$C_x = \log_2 \{\det(HH^H(\gamma/N)) + I_N\} \quad \text{Equation (2)}$$
$$x(t) = \arg\max C_x$$
$$1 \leq x \leq X$$

In Equation (2), $I_N$ represents a unit matrix of N×N. The controller 242b selects a modulation scheme and an error correction coding rate in the combination of used antennas associated with the determined number x(t) (Step S506). The controller 242b stores information of the modulation scheme and the error correction coding rate in the combination of used antennas being associated with the determined number x(t) in the storage 241b.

The controller 242b determines whether or not t=T (Step S507). T represents an end time of the visualization time. In a case in which t≠T (Step S507—No), the controller 242b adds 1 to the value of t and repeatedly performs the process of Step S504 and subsequent steps (Step S508). In this way, the controller 242b determines a combination of used antennas for each visualization time.

On the other hand, in a case in which t=T (Step S507—Yes), the controller 242b acquires information of the number of reception antennas (for example, the number of antenna stations 41) in the combination of used antennas determined for each visualization time. The controller 242b gathers the information of the number of reception antennas (for example, the number of antenna stations 41) in the acquired visualization time (t=1 to T) and notifies the base station 4b of the information through the antennas 25 (Step S509).

Figure 16:
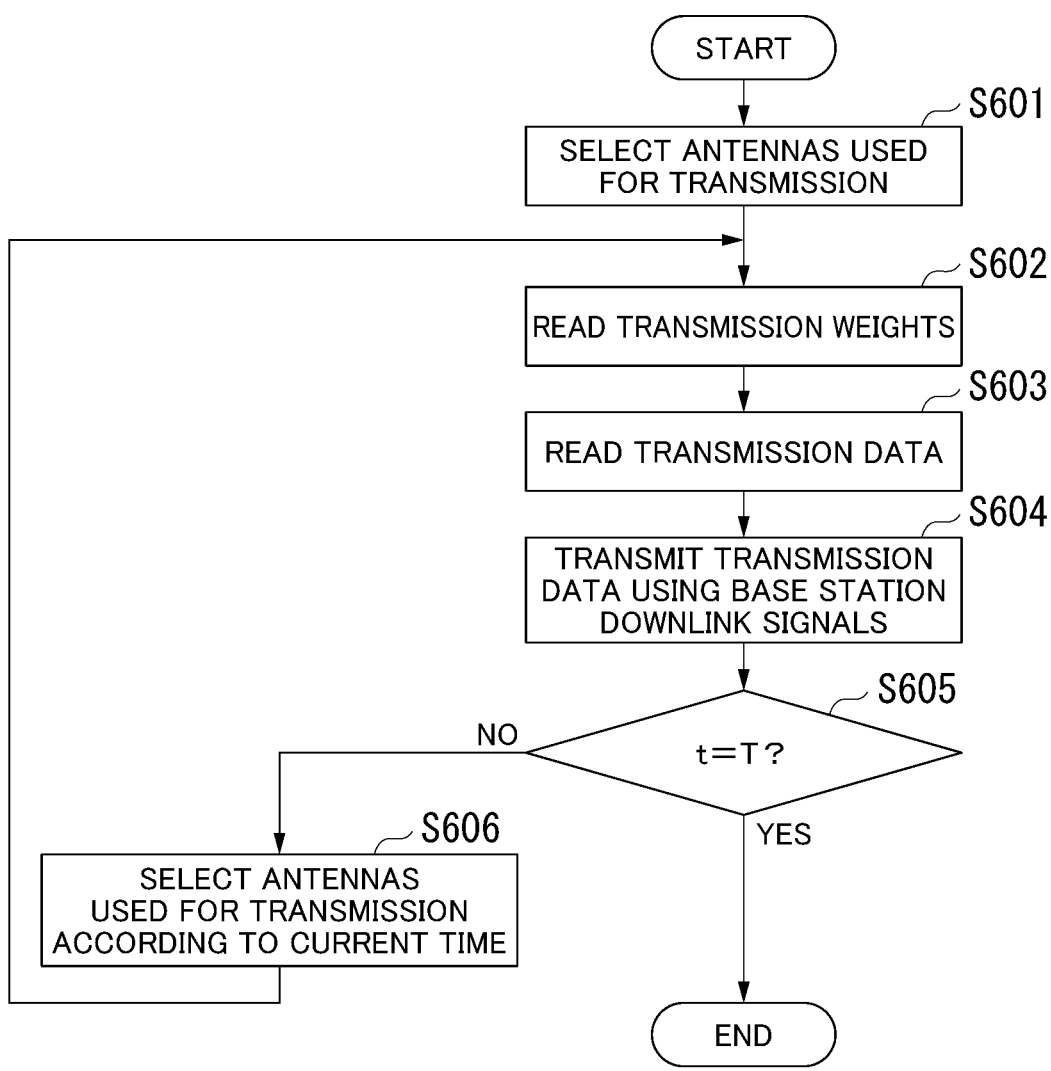
FIG. 16 is a flowchart illustrating a process of transmitting a base station downlink signal from a mobile relay station.

FIG. 16 is a flowchart illustrating a process of transmitting a base station downlink signal from the mobile relay station 2b. The process illustrated in FIG. 16 is performed in a case in which it becomes a communication time (visualization time t=1) for the base station 4b.

The controller 242b of the mobile relay station 2b selects the antenna 25 to be used for transmission by referring to the mobile relay station used antenna information stored in the storage 241b (Step S601). For example, in a case in which it is stored in the storage 241b as the mobile relay station used antenna information that a total number of antennas 25 used for transmission at a time t is two, the controller 242b selects two antennas 25 among a plurality of antennas 25. The antennas 25 to be selected may be selected on the basis of a relation as illustrated in FIG. 11. For example, in a case in which a total number of antennas 25 to be used for transmission at the time t is 2, the controller 242b may select two antennas 25 for which an angle between the two antennas 25 is π as illustrated in FIG. 11(A). In addition, in a case in which there are a plurality of combinations of antennas 25 for which an angle between the two antennas 25 is π, the controller 242b may randomly select one combination of antennas 25 among the plurality of combinations of antennas 25. The controller 242b performs switching of antennas 25 such that base station downlink signals are transmitted by the selected antennas 25.

The controller 242b reads a transmission weight corresponding to the current time t from the storage 241b and gives an instruction of the transmission weight to the transmitter 244 (Step S602). The transmission data modulator 243 receives an instruction from the controller 242b and reads terminal transmission data accumulated in the data storage 23 as transmission data (Step S603).

The transmission data modulator 243 encodes the read transmission data using an error correction coding rate at the time t, converts the encoded transmission data into parallel data, and then modulates the parallel data using a modulation scheme at the time t. The error correction coding rate and the modulation scheme for each time are stored in the controller 242b. The transmitter 244 performs weighting of the transmission data modulated by the transmission data modulator 243 using the transmission weight instructed from the controller 242, thereby generating a base station downlink signal that is a transmission signal to be transmitted from a selected antenna 25. The transmitter 244 transmits each base station downlink signal that has been generated from the selected antenna 25 using MIMO (Step S604).

The controller 242b determines whether or not the current time t is a time T (Step S605). In a case in which the current time t is the time T (Step S605—Yes), the mobile relay station 2b ends the process illustrated in FIG. 16.

On the other hand, in a case in which the current time t is not the time T (Step S605—No), the controller 242b selects antennas 25 to be used for transmission according to the current time by referring to the time again (Step S606).

Since the time slowly elapses, after the mobile relay station 2b transmits the base station downlink signal to the base station 4b, the time becomes a time different from a time at which the antennas 25 were selected at the previous time. Thus, the controller 242b selects antennas 25 to be used for transmission again with the time after transmission of the base station downlink signal set as the current time. Here, a time after the transmission of the base station downlink signal may be a timing at which the process of Step S604 ends. In addition, in a case in which the same antennas 25 as those of the previous time are selected, the controller 242b may not perform switching of the antennas 25. Thereafter, the mobile relay station 2b performs a process of Step S602 and subsequent steps.

Figure 17:
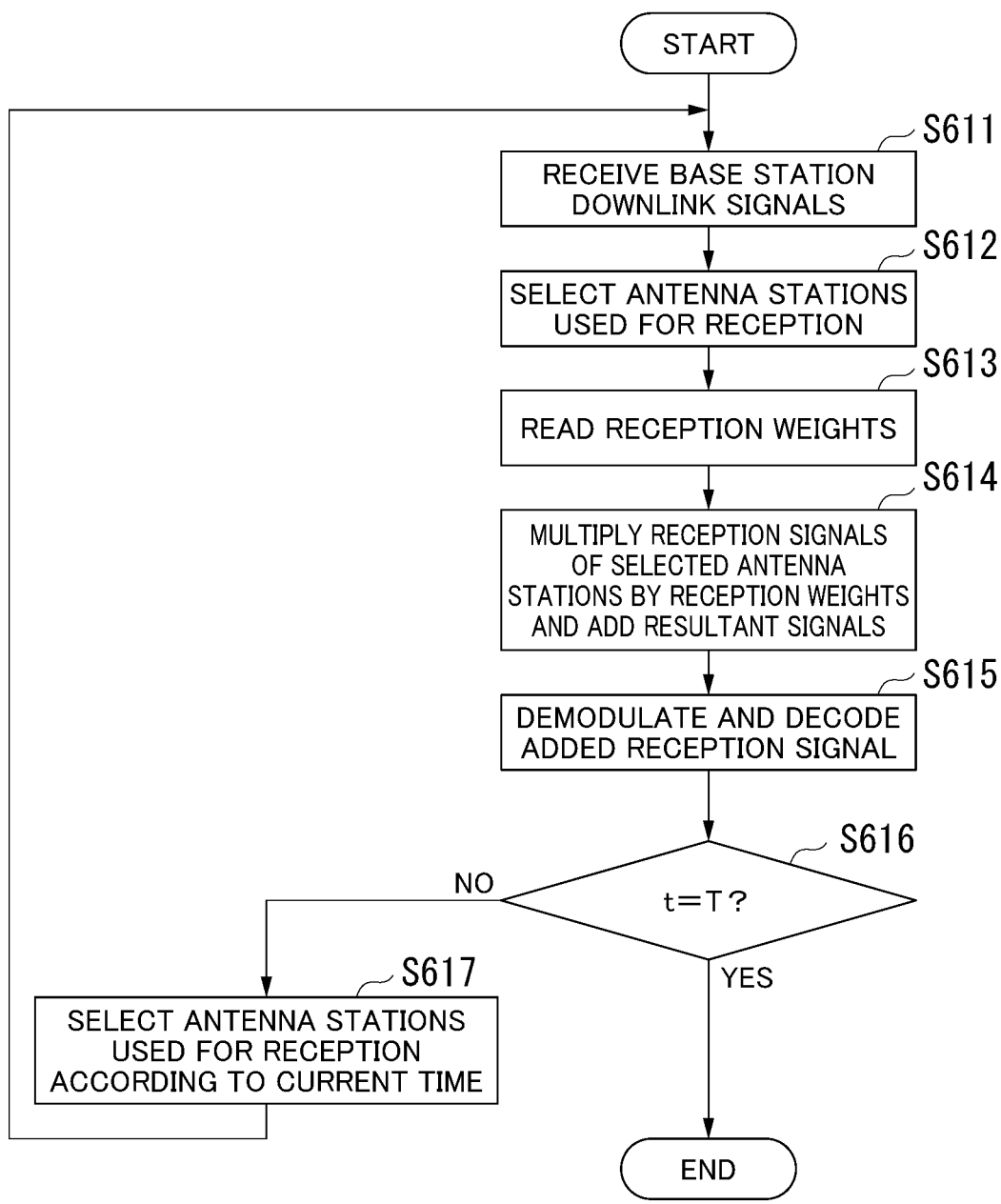
FIG. 17 is a flowchart illustrating a process of a base station receiving a base station downlink signal from a mobile relay station.

FIG. 17 is a flowchart illustrating a process of the base station 4b receiving a base station downlink signal from the mobile relay station 2b. The process illustrated in FIG. 17 is performed in a case in which it becomes a communication time (the visualization time t=1) for the mobile relay station 2b. When the process illustrated in FIG. 17 starts, the base station used antenna information for time t to time T is assumed to be stored in the storage 421b of the base station 4b.

Each antenna station 41 of the base station 4b outputs a reception signal acquired by converting the base station downlink signal received from the mobile relay station 2b into an electric signal to the receiver 42b (Step S611). The controller 422b selects antenna stations 41 to be used for reception at the current time t among all the antenna stations 41 as a subset by referring to the base station used antenna information and the transmission capacity information stored in the storage 421b (Step S612). The controller 422b instructs the adder 423 to use reception signals of the selected antenna stations 41 of the subset for reception. In addition, the controller 422b reads a reception weight corresponding to the current time t from the storage 421 and gives an instruction of the read reception weight to the adder 423 (Step S613).

The adder 423 selects a reception signal of each antenna station 41 instructed from the controller 422b to be used for reception and multiplies the selected reception signal by the reception weight instructed from the controller 422b. The adder 423 adds the reception signals that have been multiplied by the reception weights (Step S614). The base station signal reception processor 43 demodulates the added reception signal and decodes the demodulated reception signal, thereby acquiring terminal transmission data (Step S615).

The controller 422b determines whether or not the current time t is the time T (Step S616). In a case in which the current time t is the time T (Step S616—Yes), the base station 4b ends the process illustrated in FIG. 17.

On the other hand, in a case in which the current time t is not the time T (Step S616—No), the controller 422b selects antennas 25 to be used for reception according to the current time by referring to the time again (Step S617).

Since the time slowly elapses, after the base station 4b receives the base station downlink signal, the time becomes a time different from the time at which the antenna stations 41 were selected at the previous time. Thus, the controller 422b selects antenna stations 41 to be used for reception with the time after reception of the base station downlink signal set as the current time again. Here, the time after the reception of the base station downlink signal may be a timing at which the process of Step S611 ends or a timing at which the process of Step S615 ends. In addition, in a case in which the same antenna stations 41 as those of the previous time were selected, the controller 422b may not give an instruction to the adder 423. Thereafter, the base station 4b performs the process of Step S611 and subsequent steps.

According to the embodiment described above, on the basis of a transmission capacity between the mobile relay station 2b and the base station 4b, in addition to determination of the number of antenna stations 41 to be used for reception in the base station 4b, the mobile relay station 2b determines the number of antennas 25 used for transmission in the mobile relay station 2b. In accordance with this, a combination of used antennas for which the transmission capacity becomes higher can be determined. As a result, communication that is more efficient than that according to each embodiment described above can be performed.

Modified Example of Fourth Embodiment

The controller 242b may be configured to select antennas 25 to be used for communication with the base station 4b using the transmission capacity information. In the case of such a configuration, the transmission capacity information is additionally stored in the storage 241b. The transmission capacity information stored in the storage 241b represents a transmission capacity of a downlink of each antenna 25 for each transmission time. The controller 242b selects antennas 25 corresponding to the determined number in order of largest to smallest transmission capacity at each transmission time by referring to the transmission capacity information stored in the storage 241b.

In the fourth embodiment, data is received by all the antenna stations 41 of the base station 4b. In contrast to this, switching of antenna stations 41 performing reception may be configured to be sequentially performed in accordance with time. Hereinafter, differences from the fourth embodiment will be focused in description.

In the storage 421b of the base station 4b, base station used antenna information is stored. Thus, the controller 422b performs the following process in place of the processes of Steps S611 and S612 illustrated in FIG. 17. More specifically, the controller 422b reads information representing the number of antenna stations 41 to be used at the current time from the storage 421b by referring to the base station used antenna information. The controller 422b selects antenna stations 41 to be used for reception among antenna stations 41 included in the base station 4b on the basis of the read information representing the number of antenna stations 41. For example, the controller 422b selects antenna stations 41 corresponding to the number, which is included in the base station used antenna information, in order of largest to smallest transmission capacity at the current time by referring to the transmission capacity information. The controller 422b instructs the selected antenna stations 41 to perform reception. In addition, the controller 422b may instruct antenna stations 41 that have not been selected to stop reception. The antenna station 41 that has been instructed to perform reception receives a base station downlink signal from the mobile relay station 2b and outputs a reception signal acquired by converting the received base station downlink signal into an electric signal to the receiver 42b.

By configuring as described above, antenna stations 41 that are not necessary for reception do not need to be operated, and thus power consumption can be reduced.

Fifth Embodiment

In the fourth embodiment, before the mobile relay station starts communication for transmitting data acquired from the terminal station to the base station, a combination of antennas to be used for a visualization time is determined. In the present embodiment, a configuration in which a combination of used antennas is determined as required while a mobile relay station is performing communication for transmitting data acquired from a terminal station to a base station (in real time) will be described. Hereinafter, this embodiment will be described focusing on differences from the fourth embodiment.

A configuration of a wireless communication system according to this embodiment is similar to that of the wireless communication system 1b according to the fourth embodiment illustrated in FIG. 10. As a difference in the process between this embodiment and the fourth embodiment, while the mobile relay station 2b determines a combination of antennas to be used for a visualization time before start of communication in the fourth embodiment, in the present embodiment, a mobile relay station 2b determines a combination of antennas to be used at a different timing after start of communication. In addition, the mobile relay station 2b performs the processes of Steps S501 and S502 illustrated in FIG. 15 in advance and stores results of the processes in a storage 241b.

Figure 18:
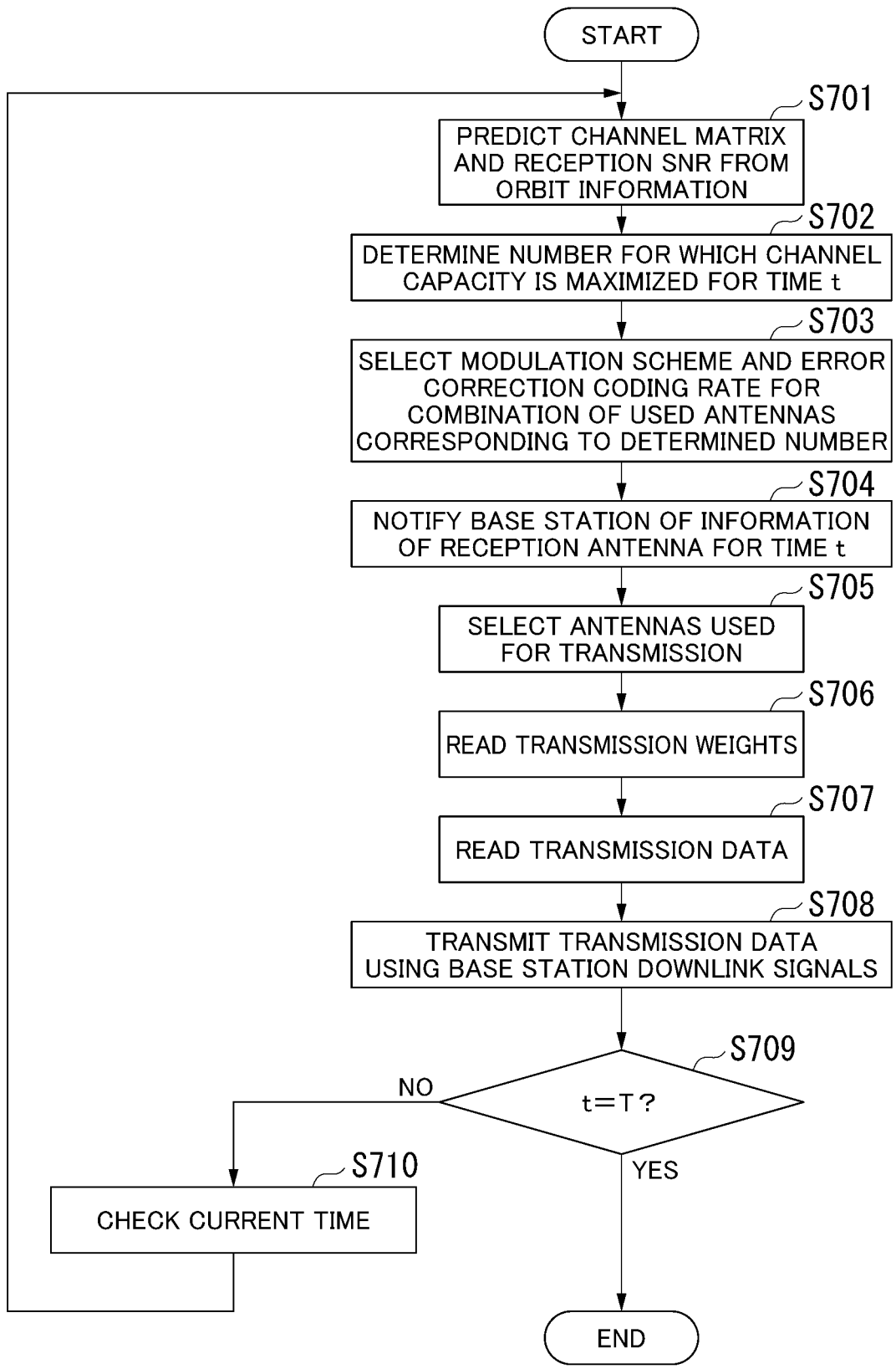
FIG. 18 is a flowchart illustrating a process of a mobile relay station determining a combination of used antennas and transmitting a base station downlink signal.

FIG. 18 is a flowchart illustrating a process of the mobile relay station 2b determining a combination of antennas to be used and transmitting a base station downlink signal. The process illustrated in FIG. 18 is performed in a case in which it is a communication time (a visualization time t=1) for a base station 4b.

A controller 242b predicts a channel matrix (H) and a reception SNR ($\gamma$) from orbit information of the mobile relay station 2b at a time t (for example t=1) (Step S701). The controller 242b determines a number x(t) of a combination of used antennas that maximizes a channel capacity $C_x$ at a time t on the basis of Equation (2) described above and a number for each combination of used antennas stored in the storage 241b (Step S702). The controller 242b stores information of the number of antennas (for example, antennas 25) to be used for transmission in the combination of used antennas associated with the determined number x(t) in the storage 241b as mobile relay station used antenna information.

The controller 242b selects a modulation scheme and an error correction coding rate in the combination of used antennas associated with the determined number x(t) (Step S703). The controller 242b causes the storage 241b to store information of the modulation scheme and the error correction coding rate in the combination of used antennas associated with the determined number x(t). The controller 242b notifies a base station 4b of information of the number of reception antennas at the time t through an antenna 25 (Step S704).

Thereafter, the controller 242b selects antennas 25 used for transmission at the time t by referring to mobile relay station used antenna information stored in the storage 241b (Step S705). The controller 242b reads a transmission weight corresponding to the current time t from the storage 241b and gives an instruction of the transmission weight to the transmitter 244 (Step S706). A transmission data modulator 243 receives an instruction from the controller 242b and reads terminal transmission data accumulated in a data storage 23 as transmission data (Step S707).

The transmission data modulator 243 encodes the read transmission data with the error correction coding rate at the time t, converts the encoded transmission data into parallel data, and then modulates the parallel data using a modulation scheme for the time t. The transmitter 244 performs weighting of the transmission data modulated by the transmission data modulator 243 using a transmission weight instructed from the controller 242, thereby generating a base station downlink signal that is a transmission signal to be transmitted from the selected antenna 25. The transmitter 244 transmits each base station downlink signal, which has been generated, from the selected antenna 25 using MIMO (Step S708).

The controller 242b determines whether or not the current time t is a time T (Step S709). In a case in which the current time t is the time T (Step S709—Yes), the mobile relay station 2b ends the process illustrated in FIG. 18.

On the other hand, in a case in which the current time t is not the time T (Step S709—No), the controller 242b checks the current time t by referring to the time again (Step S710). Thereafter, the mobile relay station 2b performs the process of Step S701 and subsequent steps.

As described above, the mobile relay station 2b according to the fifth embodiment selects antennas 25 to be used for transmission in real time and notifies the base station 4b of information of the number of antenna stations 41 used for reception.

In addition, the process of the base station 4b is similar to that according to the fourth embodiment except that information of the number of antenna stations 41 used for reception is notified from the mobile relay station 2b, and antenna stations 41 used for reception are selected on the basis of the notified information.

According to the embodiment described above, the mobile relay station 2b can determine the number of antenna stations 41 used for reception in the base station 4b and the number of antennas 25 used for transmission in the mobile relay station 2b in real time. In accordance with this, as in the fourth embodiment, compared to a case in which the mobile relay station 2b determines a combination of used antennas for a visualization time in advance, a combination of used antennas can be determined more in correspondence with a change in a communication environment. For this reason, in a communication environment changing every moment, a combination of used antennas for which the transmission capacity increases can be determined.

Modified Example of Fifth Embodiment

The controller 242b according to the fifth embodiment may be configured to select antennas 25 used for communication with the base station 4b using the transmission capacity information. In the case of such a configuration, transmission capacity information is additionally stored in the storage 241b. The controller 242b selects antennas 25 corresponding to the determined number in order of largest to smallest transmission capacity at each transmission time by referring to the transmission capacity information stored in the storage 241b.

In the fifth embodiment, all the antenna stations of the base station 4b performs reception. In contrast to this, in accordance with the time, sequential switching of antenna stations 41 performing reception may be configured to be performed. Hereinafter, differences from the fifth embodiment will be focused in description.

The base station 4b stores information of the number of reception antennas (for example, the number of antenna stations 41) at the time t notified from the mobile relay station 2b in real time as base station used antenna information. Thus, every time when the information of the number of reception antennas for each time is notified from the mobile relay station 2b, the controller 422b selects antenna stations 41 used for reception among antenna stations 41 included in the base station 4b on the basis of the information representing the number of antenna stations 41 included in the notified information of the number of reception antennas. The controller 422b instructs the selected antenna stations 41 to perform reception. In addition, the controller 422b may instruct antenna stations 41 that have not been selected to stop reception. The antenna station 41 that has been instructed to perform reception receives a base station downlink signal from the mobile relay station 2b and outputs a reception signal acquired by converting the received base station downlink signal into an electric signal to the receiver 42b.

By configuring as described above, antenna stations 41 that are not necessary for reception do not need to be operated also during real-time communication, and thus power consumption can be reduced.

Sixth Embodiment

In the fourth embodiment described above, the mobile relay station determines a combination of used antennas for each visualization time. In the present embodiment, an apparatus installed on the ground determines a combination of used antennas for each visualization time. Hereinafter, this embodiment will be described with focusing on differences from the fourth embodiment.

Figure 19:
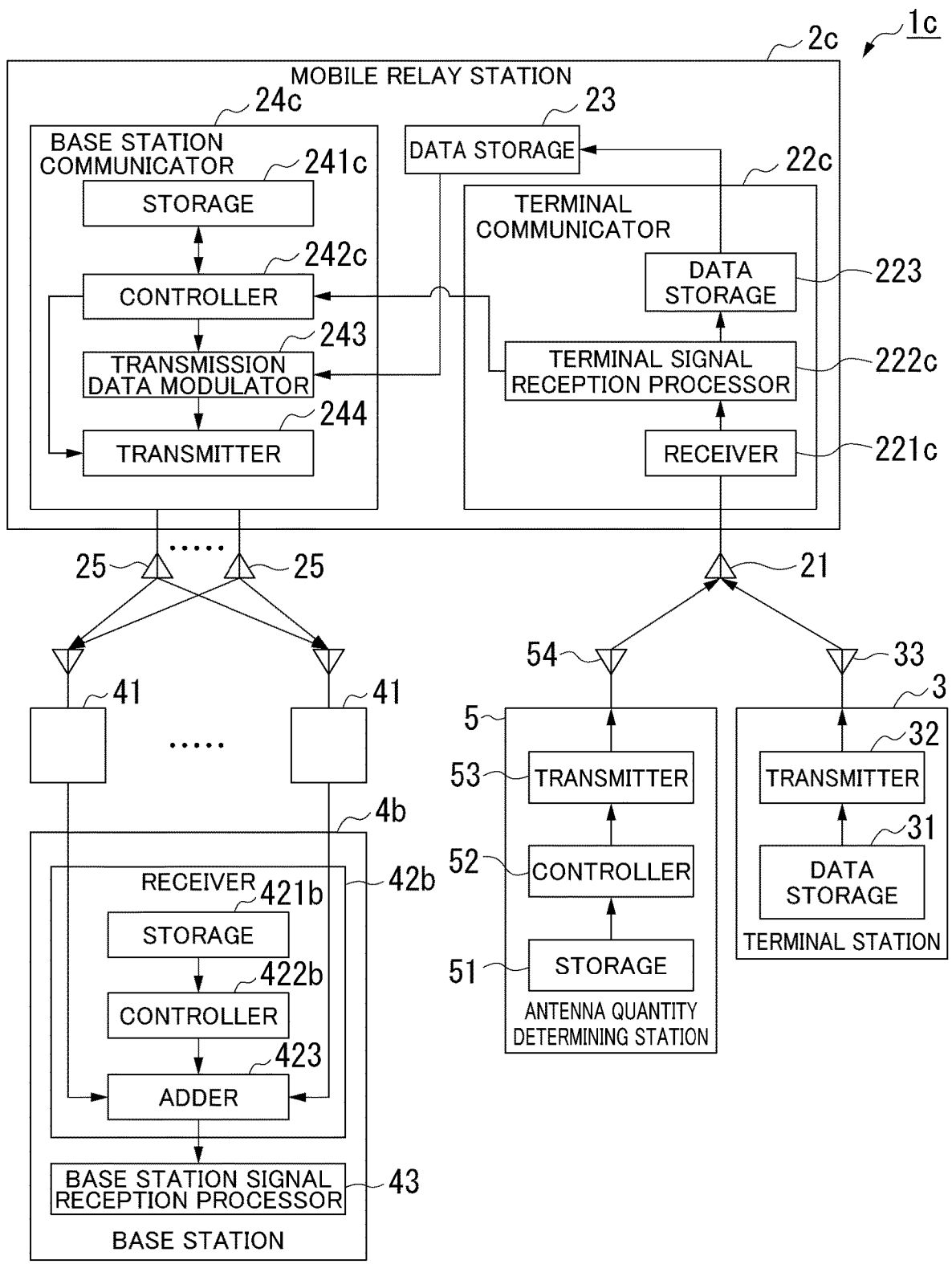
FIG. 19 is a diagram illustrating an overview of a wireless communication system according to a sixth embodiment.

FIG. 19 is a diagram illustrating an overview of a wireless communication system 1c according to a sixth embodiment. The wireless communication system 1c includes mobile relay stations 2c, terminal stations 3, base stations 4b, and an antenna quantity determining station 5. The number of each of the mobile relay stations 2c, the terminal stations 3, and the base stations 4b included in the wireless communication system 1c is arbitrary, but it is assumed that there are a large number of terminal stations 3.

The antenna quantity determining station 5 determines a combination of used antennas for each visualization time. The antenna quantity determining station 5 includes a storage 51, a controller 52, a transmitter 53, and an antenna 54.

The storage 51 stores orbit information and position information of the base station 4b in advance.

The controller 52 determines a combination of used antennas for each time on the basis of a channel capacity (a transmission capacity) between the mobile relay station 2c and the base station 4b. In addition, the controller 52 selects information of a modulation scheme and an error correction coding rate for a combination of used antennas.

The controller 52 may acquire information of a channel capacity from the mobile relay station 2c. In addition, the controller 52 may calculate a transmission capacity at each time between the mobile relay station 2c and all the antenna stations 41 of the base station 4b on the basis of orbit information of the mobile relay station 2c, information of a position of each antenna station 41, and a frequency of wireless communication.

The transmitter 53 transmits transmission information including the information of a combination of used antennas determined by the controller 52 and the information of the modulation scheme and the error correction coding rate for the combination of the used antennas for a visualization time to the mobile relay station 2c through the antenna station 54.

The mobile relay station 2c includes one or more antennas 21, a terminal communicator 22c, a data storage 23, a base station communicator 24c, and a plurality of antennas 25. In the present embodiment, a case in which the mobile relay station 2c includes three or more antennas 25 and performs switching of antennas 25 at the time of wirelessly communicating with the base station 4b using MIMO will be described as an example.

The terminal communicator 22c includes a receiver 221c, a terminal signal reception processor 222c, and a data recorder 223. The receiver 221c receives a terminal uplink signal transmitted from each terminal station 3 using the one or more antennas 21. In addition, the receiver 221c receives transmission information transmitted from the antenna quantity determining station 5.

The terminal signal reception processor 222c performs a process of receiving a terminal uplink signal. The terminal signal reception processor 222c outputs the transmission information received through the receiver 221c to the base station communicator 24c.

The base station communicator 24c transmits the terminal transmission data to the base station 4b. The base station communicator 24c includes a storage 241c, a controller 242c, a transmission data modulator 243, and a transmitter 244.

The storage 241c stores in advance a transmission weight for each transmission time of a base station downlink signal transmitted from each antenna 25. In addition, the storage 241c stores the information of a combination of used antennas and the information of the modulation scheme and the error correction coding rate for the combination of the used antennas that are included in the transmission information.

The controller 242c selects antennas 25 used for communication with the base station 4b among antennas 25 included in the mobile relay station 2c on the basis of the information of a combination of used antennas for each time that is stored in the storage 241c. The controller 242c performs switching among a plurality of antennas 25 such that communication is performed using selected antennas 25. The controller 242c instructs the transmission data modulator 243 to transmit terminal transmission data.

The controller 242c instructs the transmitter 244 to transmit a transmission weight for each transmission time read from the storage 241c. In addition, the controller 242c notifies the base station 4b of information of the number of antenna stations 41 used by the base station 4b for reception in the information of a combination of used antennas for each time transmitted from the antenna quantity determining station 5.

The transmission data modulator 243 receives an instruction from the controller 242c and reads terminal transmission data accumulated in the data storage 23 as transmission data. The transmission data modulator 243 encodes the read transmission data with an error correction coding rate at the time t, converts the encoded transmission data into parallel data, and modulates the parallel data using a modulation scheme for the time t.

An operation of the wireless communication system 1c will be described.

Figure 20:
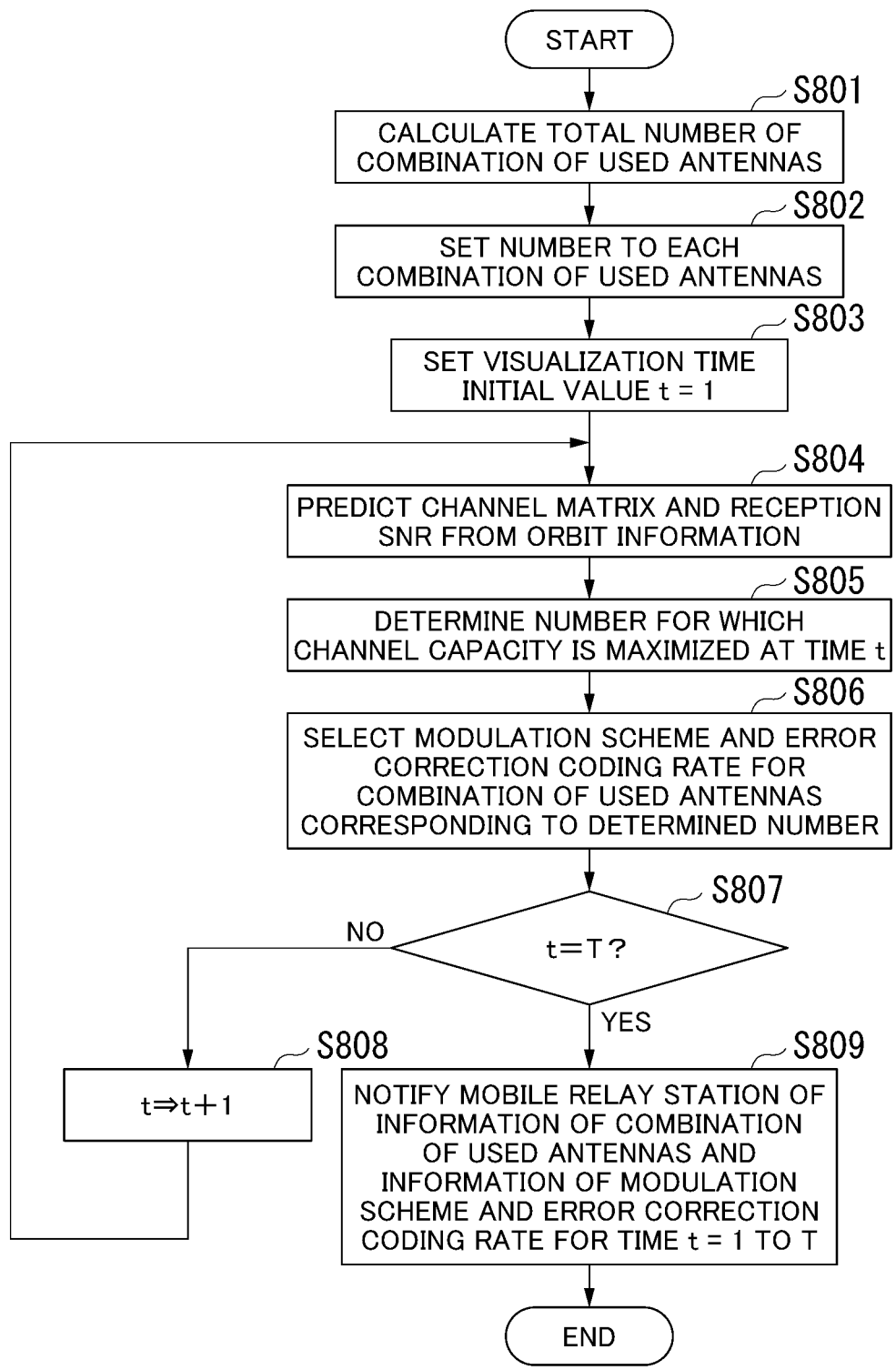
FIG. 20 is a flowchart illustrating a process of an antenna quantity determining station determining a combination of used antennas.

FIG. 20 is a flowchart illustrating a process of the antenna quantity determining station 5 determining a combination of used antennas. FIG. 20 illustrates a process of the antenna quantity determining station 5 determining a combination of used antennas for a visualization time before the mobile relay station 2c and the base station 4b start communication.

First, the controller 52 of the antenna quantity determining station 5 derives a total number X of combinations of used antennas on the basis of Equation (1) described above (Step S801). Next, the controller 52 sets a number for each combination of used antennas (Step S802). The controller 52 may cause the storage 51 to store a combination of used antennas and a number in association with each other. Next, the controller 52 sets an initial value of the visualization time t to 1 (Step S803).

The controller 52 predicts a channel matrix (H) and a reception SNR($\gamma$) using the orbit information of the mobile relay station 2b at the time t that is stored in the storage 51 (Step S804). The controller 52 determines a number x(t) of a combination of used antennas for maximizing a channel capacity $C_x$ at the time t on the basis of Equation (2) represented above (Step S805).

The controller 52 selects a modulation scheme and an error correction coding rate in the combination of used antennas associated with the determined number x(t) (Step S806). The controller 52 stores information of the modulation scheme and the error correction coding rate in the combination of used antennas being associated with the determined number x(t) in the storage 51.

The controller 52 determines whether or not t=T (Step S807). In a case in which t≠T (Step S807—No), the controller 52 adds 1 to the value of t and repeatedly performs the process of Step S804 and subsequent steps (Step S808). In this way, the controller 52 determines a combination of used antennas for each visualization time.

On the other hand, in a case in which t=T (Step S807—Yes), the controller 52 notifies the mobile relay station 2c of the information of a combination of used antennas and information of a modulation scheme and an error correction coding rate for the combination of used antennas for the visualization time (t=1 to T) through the antenna 54 (Step S809).

According to the embodiment described above, the antenna quantity determining station 5 installed on the ground determines antennas 25 used for transmission in the mobile relay station 2c on the basis of a communication capacity between the mobile relay station 2c and the base station 4b in addition to selection of antenna stations 41 used for reception in the base station 4b. The antenna quantity determining station 5 notifies the mobile relay station 2c of the information of a combination of used antennas for each time that has been determined. In accordance with this, a combination of used antennas does not need to be determined by the mobile relay station 2c. For this reason, the processing load of the mobile relay station 2c can be alleviated.

In addition, the mobile relay station 2c determines the number of antennas 25 used for transmission on the basis of the information of a combination of used antennas notified from the antenna quantity determining station 5. The mobile relay station 2c notifies the base station 4b of the information of antenna stations 41 used for reception. In accordance with this, communication can be performed between the mobile relay station 2c and the base station 4b using a combination of used antennas for which the transmission capacity is high. As a result, efficient communication can be performed.

Modified Example of Sixth Embodiment

The mobile relay station 2c according to the sixth embodiment may be changed in the form to be similar to the mobile relay station 2b according to the fourth embodiment.

Similar to the base station 4b according to the fourth embodiment, the base station 4b according to the sixth embodiment may be configured to cause antenna stations 41 other than antenna stations 41 used for reception to stop reception.

Seventh Embodiment

According to the sixth embodiment, the antenna quantity determining station determines a combination of used antennas for a visualization time before the mobile relay station and the base station start communication. In the present embodiment, a configuration in which an antenna quantity determining station determines a combination of used antennas as required while a mobile relay station and a base station are communicating with each other (in real time) will be described. Hereinafter, this embodiment will be described focusing on differences from the sixth embodiment.

A configuration of a wireless communication system according to this embodiment is similar to that of the wireless communication system 1c according to the sixth embodiment illustrated in FIG. 19. As a difference in the process between this embodiment and sixth embodiment, while the antenna quantity determining station 5 determines a combination of used antennas for a visualization time before start of communication in the sixth embodiment, in the present embodiment, an antenna quantity determining station 5 determines a combination of used antennas at a different timing after start of communication. In addition, the antenna quantity determining station 5 performs the processes of Steps S801 and S802 illustrated in FIG. 20 in advance and stores results of the processes in a storage 51.

Figure 21:
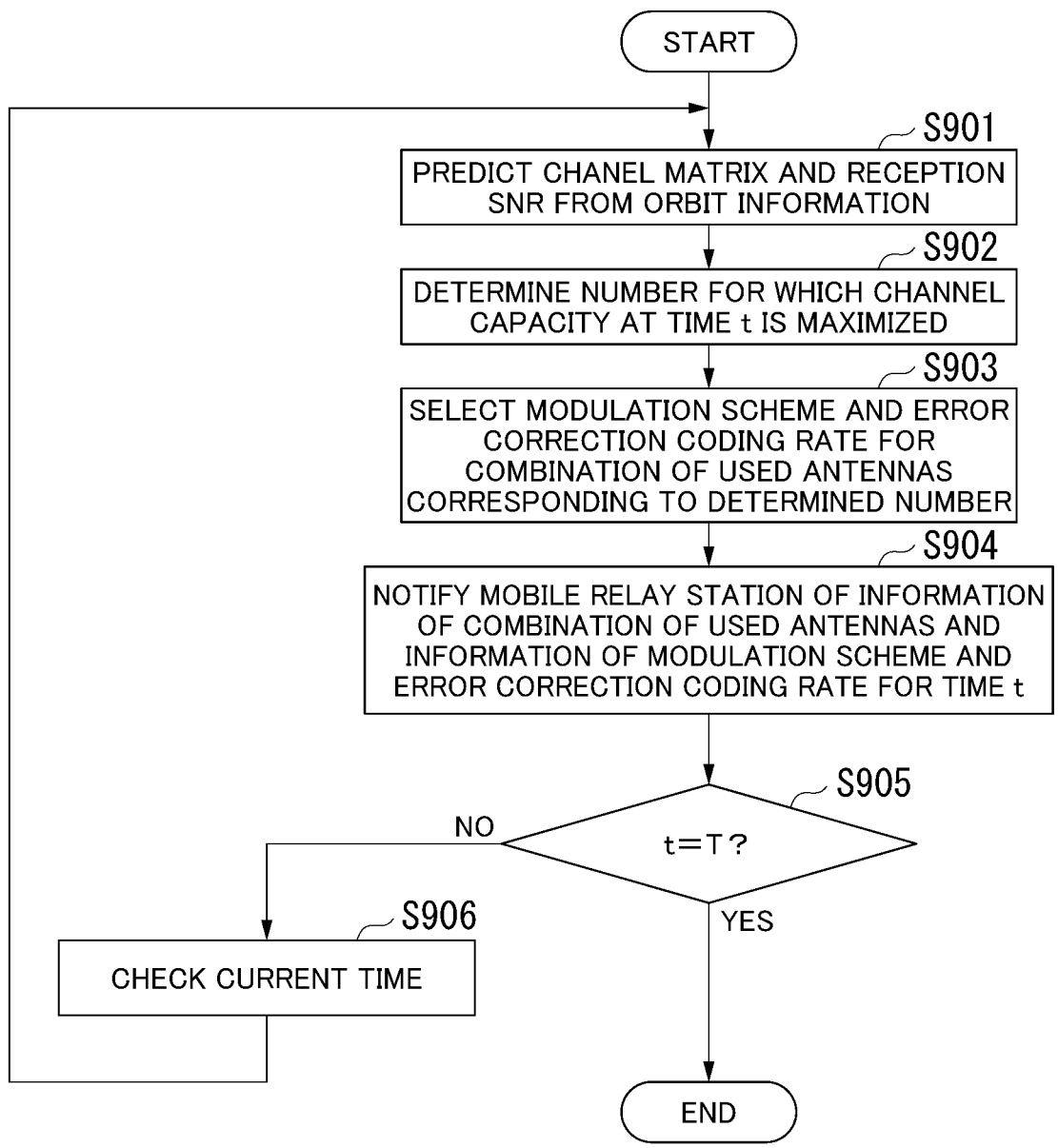
FIG. 21 is a flowchart illustrating a process of an antenna quantity determining station determining a combination of used antennas.

FIG. 21 is a flowchart illustrating a process of the antenna quantity determining station 5 determining a combination of used antennas. The process illustrated in FIG. 21 is performed in a case in which it is a communication time between a mobile relay station 2c and a base station 4b (a visualization time t=1).

A controller 52 predicts a channel matrix (H) and a reception SNR (γ) from orbit information of a mobile relay station 2c at a time t (for example t=1) stored in a storage 51 (Step S901). The controller 52 determines a number x(t) of a combination of used antennas that maximizes a channel capacity $C_x$ at a time t on the basis of Equation (2) described above and a number for each combination of used antennas stored in the storage 51 (Step S902). In accordance with this, the controller 52 determines a combination of the number of antennas 25 used by the mobile relay station 2c for transmission and the number of antenna stations 41 used by a base station 4b for reception for the time t.

The controller 52 selects a modulation scheme and an error correction coding rate in the combination of used antennas associated with the determined number x(t) (Step S903). The controller 52 notifies the mobile relay station 2c notifies the mobile relay station 2c of transmission information including the information of a combination of used antennas and the information of a modulation scheme and an error correction coding rate for the combination of used antennas at the time t through an antenna 54 (Step S904).

The controller 52 determines whether or not the current time t is a time T (Step S909). In a case in which the current time t is the time T (Step S905—Yes), the antenna quantity determining station 5 ends the process illustrated in FIG. 21.

On the other hand, in a case in which the current time t is not the time T (Step S905—No), the controller 52 checks the current time t by referring to time again (Step S906). Thereafter, the antenna quantity determining station 5 performs the process of Step S901 and subsequent steps.

As described above, the antenna quantity determining station 5 according to the seventh embodiment notifies the mobile relay station 2c of the information of a combination of antennas used for transmission in the mobile relay station 2c and antenna stations used for reception in the base station 4b in real time.

Figure 22:
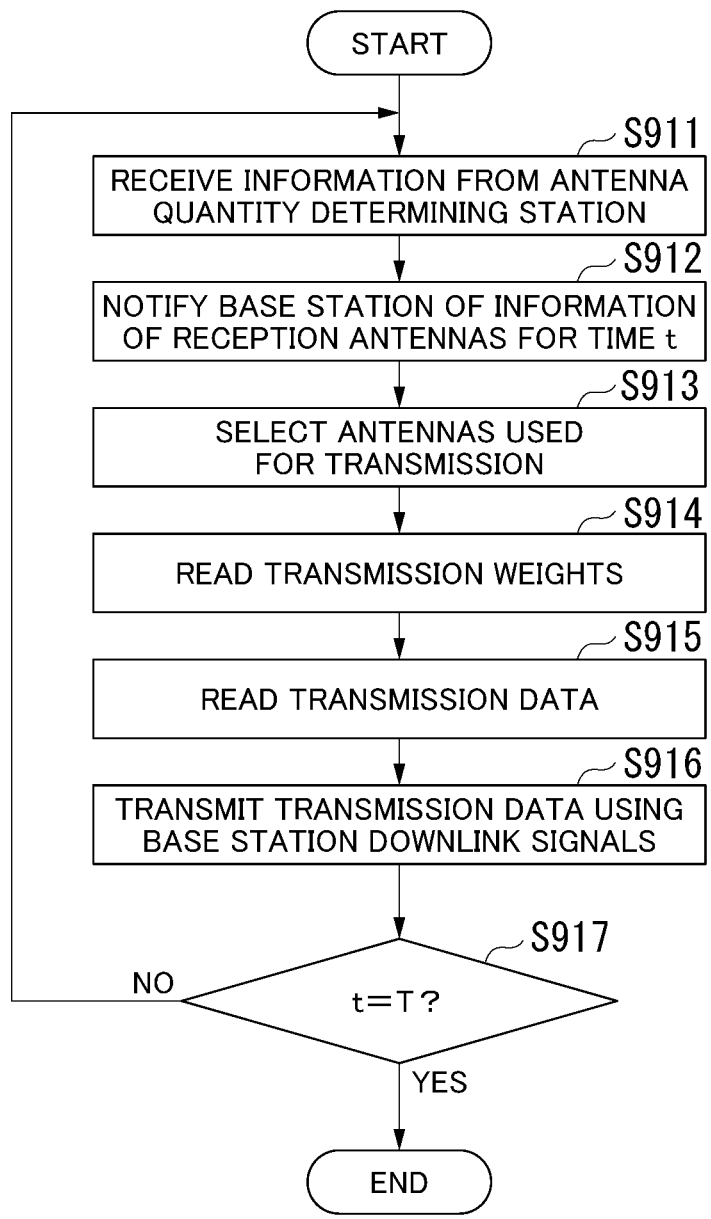
FIG. 22 is a flowchart illustrating a process of transmitting a base station downlink signal from a mobile relay station.

FIG. 22 is a flowchart illustrating a process of transmitting a base station downlink signal from the mobile relay station 2c. The process illustrated in FIG. 22 is performed in a case in which it becomes a communication time (the visualization time t=1) for the base station 4b.

The terminal communicator 22c receives transmission information for the time t (for example, t=1) that is transmitted from the antenna quantity determining station 5 (Step S911). The terminal communicator 22c outputs the received transmission information to a base station communicator 24c. A controller 242c of the base station communicator 24c stores the information of a combination of used antennas and the information of a modulation scheme and an error correction coding rate for the combination of used antennas that are included in the acquired transmission information in a storage 241c. The controller 242c notifies the base station 4b of the information of the number of antennas used for reception for the time t in the information of the combination of used antennas through the antenna 25 (Step S912).

The controller 242c selects antennas 25 used for transmission at the time t in the acquired information of a combination of used antennas (Step S913). The controller 242c reads a transmission weight corresponding to the current time t from the storage 241b and gives an instruction of the read transmission weight to the transmitter 244 (Step S914). The transmission data modulator 243 receives an instruction from the controller 242c and reads terminal transmission data accumulated in the data storage 23 as transmission data (Step S915).

The transmission data modulator 243 encodes the read transmission data with the error correction coding rate at the time t, converts the encoded transmission data into parallel data, and then modulates the parallel data using a modulation scheme for the time t. The transmitter 244 performs weighting of the transmission data modulated by the transmission data modulator 243 using a transmission weight instructed from the controller 242, thereby generating a base station downlink signal that is a transmission signal to be transmitted from the selected antenna 25. The transmitter 244 transmits each base station downlink signal, which has been generated, from the selected antenna 25 using MIMO (Step S916).

The controller 242c determines whether or not the current time t is a time T (Step S917). In a case in which the current time t is the time T (Step S917—Yes), the mobile relay station 2c ends the process illustrated in FIG. 22.

On the other hand, in a case in which the current time t is not the time T (Step S917—No), the mobile relay station 2c performs the process of Step S911 and subsequent steps.

As described above, the mobile relay station 2c according to the seventh embodiment selects antennas 25 to be used for transmission in real time on the basis of the information from the antenna quantity determining station 5 and notifies the base station 4b of information of the number of antenna stations 41 used for reception.

In addition, the process of the base station 4b is similar to that according to the sixth embodiment except that information of the number of antenna stations 41 used for reception is notified from the mobile relay station 2c, and antenna stations 41 used for reception are selected on the basis of the notified information.

According to the embodiment described above, the antenna quantity determining station 5 can determine the number of antenna stations 41 used for reception in the base station 4b and the number of antennas 25 used for transmission in the mobile relay station 2c in real time. In accordance with this, as in the sixth embodiment, compared to a case in which the antenna quantity determining station 5 determines a combination of used antennas for a visualization time in advance, a combination of used antennas can be determined more in correspondence with a change in a communication environment. For this reason, in a communication environment changing every moment, a combination of used antennas for which the transmission capacity increases can be determined.

Modified Example of Seventh Embodiment

The mobile relay station 2c according to the seventh embodiment may be changed in the form to be similar to the mobile relay station 2b according to the fifth embodiment.

Similar to the base station 4b according to the fifth embodiment, the base station 4b according to the seventh embodiment may be configured to cause antenna stations 41 other than antenna stations 41 used for reception to stop reception.

In the fourth embodiment to the seventh embodiment described above, transmission of a base station downlink signal from the mobile relay station to the base station has been mainly described. In the fourth embodiment to the seventh embodiment described above, the mobile relay station may receive a base station uplink signal transmitted from the base station. In such a case, a transmission capacity of an uplink between each antenna 25 of the mobile relay station and each antenna station 41 at each time is assumed to be calculated in advance. The method of calculating a transmission capacity of the uplink has been described in the first embodiment, and thus description thereof will be omitted. Hereinafter, a configuration in which the mobile relay station receives a base station uplink signal in each of the fourth embodiment to the seventh embodiment has been described.

(Reception Configuration of Base Station Uplink Signal According to Fourth Embodiment)

Figure 23:
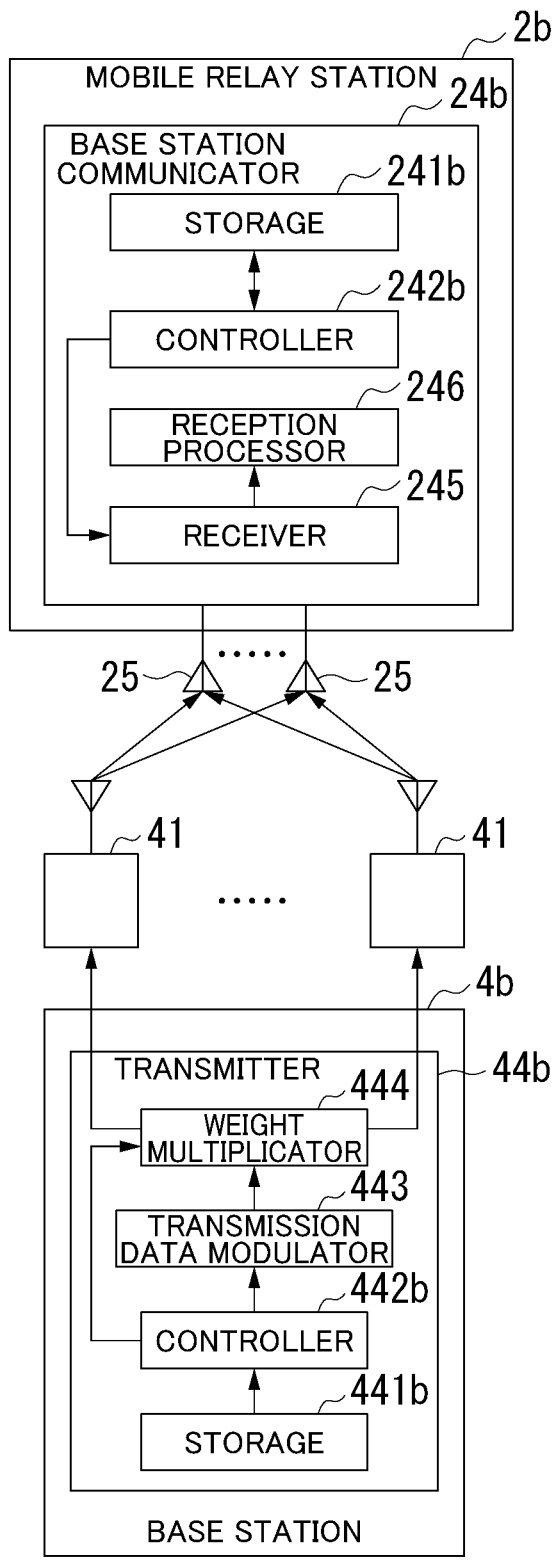
FIG. 23 is a block diagram illustrating a configuration of a mobile relay station and a base station of a case in which the mobile relay station receives a base station uplink signal from the base station.

FIG. 23 is a block diagram illustrating a configuration of the mobile relay station 2b and the base station 4b of a case in which the mobile relay station 2b receives a base station uplink signal from the base station 4b. In FIG. 23, only functional modules relating to transmission/reception of a base station uplink signal are extracted and illustrated.

The base station 4b includes a transmitter 44b. The transmitter 44b includes a storage 441b, a controller 442b, a transmission data modulator 443, and a weight multiplicator 444.

The storage 441b stores transmission capacity information and a transmission weight for each transmission time in advance. In addition, the storage 441b stores base station used antenna information. The base station used antenna information stored by the storage 441b is assumed to be transmitted from the mobile relay station 2b to the base station 4b in advance using the method described in the fourth embodiment.

The controller 442b selects antenna stations 41 to be used for communication with the mobile relay station 2b among antenna stations 41 included in the base station 4b on the basis of the base station used antenna information and the transmission capacity information stored in the storage 441b. For example, the controller 422b selects antenna stations 41 corresponding to the number included in the base station used antenna information in order of largest to smallest transmission capacity of the uplink at each transmission time.

The controller 442b instructs the transmission data modulator 443 to transmit a terminal uplink signal using the selected antenna stations 41 for each transmission time. The controller 442b reads a transmission weight of each antenna station 41 for each transmission time from the storage 441b and gives an instruction of the read transmission weight to the weight multiplicator 444.

The transmission data modulator 443 encodes transmission data to be transmitted to the mobile relay station 2b. The transmission data modulator 443 converts the encoded transmission data into parallel signals transmitted from each antenna station 41 instructed from the controller 442b and then modulates the parallel signals. In addition, an error correction coding rate used for encoding and a modulation scheme used for modulation are determined by the mobile relay station 2b and are notified to the base station 4b.

The weight multiplicator 444 performs weighting of the modulated parallel signals using the transmission weight instructed from the controller 442b, thereby generating a base station uplink signal to be transmitted from each antenna station 41. The weight multiplicator 444 outputs the generated base station uplink signal to an antenna station 41 selected by the controller 442b. The antenna station 41 selected by the controller 442 wirelessly transmits a base station uplink signal.

The mobile relay station 2b includes a base station communicator 24b. The base station communicator 24b includes a storage 241b, a controller 242b, a receiver 245, and a reception processor 246.

The storage 241b stores in advance a reception weight for each reception time of a base station uplink signal received by each antenna 25. The reception weight for each reception time is calculated on the basis of the orbit information of the LEO satellite and the position of each antenna station 41. In addition, a constant reception weight may be used regardless of the reception time. Furthermore, the storage 241b stores the mobile relay station used antenna information.

The controller 242b determines a combination of used antennas for each time on the basis of a channel capacity (a transmission capacity) between the mobile relay station 2b and the base station 4b. A method of determining a combination of used antennas of a case in which a base station uplink signal is received by the mobile relay station 2b is partly different from that according to the fourth embodiment. More specifically, according to the fourth embodiment, in Equation (1) used for deriving a total number X of combinations of used antennas, $M_t$ is the number of antennas 25 used for transmission, and $M_r$ is the number of antenna stations 41 used for reception. In contrast to this, in a configuration in which the mobile relay station 2b receives a base station uplink signal, in Equation (1), $M_t$ is the number of antenna stations 41 used for transmission, and $M_r$ is the number of antennas 25 used for reception.

The controller 242b reads a reception weight of each antenna 25 for each reception time from the storage 241b and gives an instruction of the read reception weight to the receiver 245. The receiver 245 receives a base station uplink signal using each antenna 25 and performs weighting of the reception signal received by each antenna 25 using a reception weight instructed from the controller 242b and then adds and synthesizes the reception signals. The reception processor 246 demodulates and decodes the reception signal added and synthesized by the receiver 245, thereby acquiring transmission data transmitted by the base station 4b.

Figure 24:
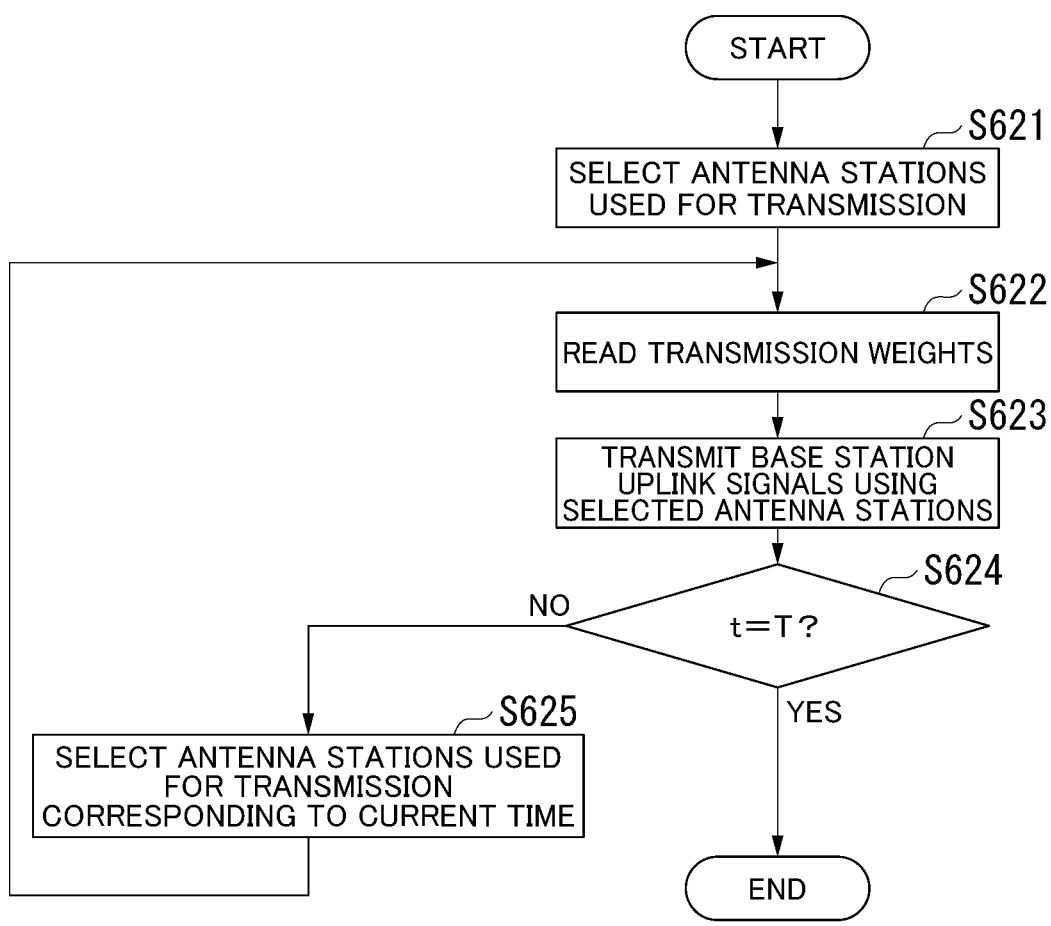
FIG. 24 is a flowchart illustrating a process of transmitting a base station uplink signal from a base station.

FIG. 24 is a flowchart illustrating a process of transmitting a base station uplink signal from the base station 4b. The process illustrated in FIG. 24 is performed in a case in which it is a communication time for the mobile relay station 2b (a visualization time t=1). At the time of start of the process illustrated in FIG. 24, the base station used antenna information at time t to time T is assumed to be stored in the storage 441b of the base station 4b.

The controller 442b of the base station 4b selects antenna stations 41 to be used for transmission at the current time t among all the antenna stations 41 as a subset by referring to the base station used antenna information and the transmission capacity information stored in the storage 441*b* (Step S621). For example, the controller 442*b* selects antenna stations 41 corresponding to the number represented in the base station used antenna information as a subset in order of largest to smallest transmission capacity of the uplink.

The controller 442*b* instructs the transmission data modulator 443 to transmit terminal uplink signals using the antenna stations 41 of the subset. In addition, the controller 442*b* reads a transmission weight of each of the antenna stations 41 of the subset corresponding to the current time from the storage 441*b* and gives an instruction of the read transmission weight to the weight multiplicator 444 (Step S622).

The transmission data modulator 443 encodes transmission data transmitted to the mobile relay station 2*b* with an error correction coding rate at the time t, converts the encoded transmission data into parallel signals to be transmitted from each of the antenna stations 41 of the subset, and then modulates the parallel signals using a modulation scheme of the time t.

The weight multiplicator 444 performs weighting of the modulated parallel signals using a transmission weight instructed from the controller 442*b* and generates a base station uplink signal to be transmitted from each of the antenna stations 41 of the subset. The weight multiplicator 444 outputs the generated base station uplink signal to a corresponding antenna station 41. Each of the antenna stations 41 of the subset wirelessly transmits the base station uplink signal (Step S623).

The controller 442*b* determines whether or not the current time t is a time T (Step S624). In a case in which the current time t is the time T (Step S624—Yes), the base station 4*b* ends the process illustrated in FIG. 24.

On the other hand, in a case in which the current time t is not the time T (Step S624—No), the controller 442*b* selects antenna stations 41 to be used for transmission according to the current time by referring to the time again (Step S625). In addition, in a case in which the same antenna stations 41 as those of the previous time are selected, the controller 442*b* may not perform switching of the antenna stations 41. Thereafter, the base station 4*b* performs the process of Step S622 and subsequent steps.

Figure 25:
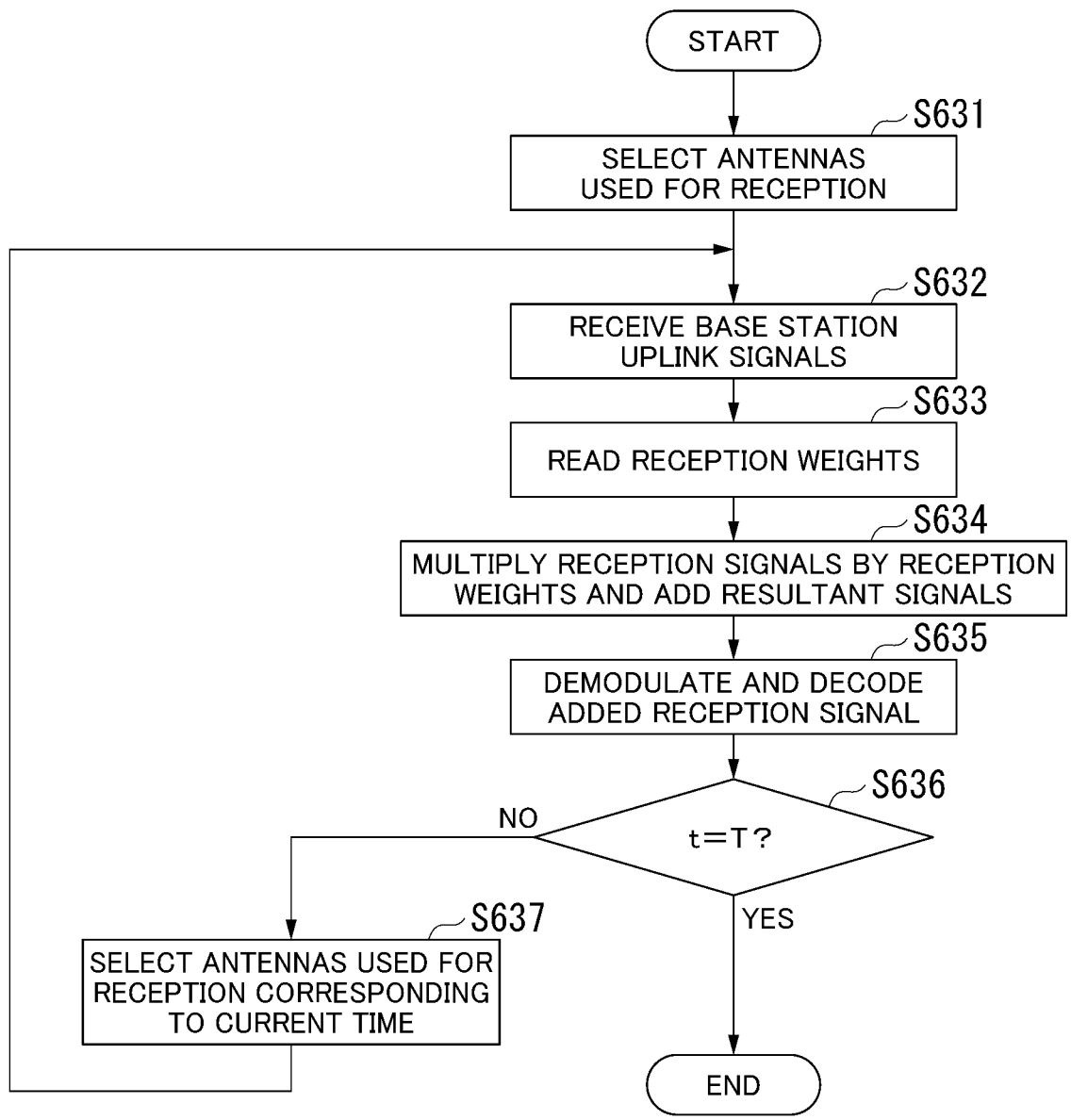
FIG. 25 is a flowchart illustrating a process of a mobile relay station receiving a base station uplink signal from a base station.

FIG. 25 is a flowchart illustrating a process of the mobile relay station 2*b* receiving a base station uplink signal from the base station 4*b*. The process illustrated in FIG. 25 is performed in a case in which it is a communication time for the base station 4*b* (a visualization time t=1). At the time of start of the process illustrated in FIG. 25, the mobile relay station used antenna information at time t to time T is assumed to be stored in the storage 241*b* of the controller 242*b*.

The controller 242*b* of the mobile relay station 2*b* selects antennas 25 to be used for reception by referring to the mobile relay station used antenna information stored in the storage 241*b* (Step S631). The controller 242*b* performs switching of antennas 25 such that the base station uplink signal is received by the selected antennas 25.

The receiver 245 of the mobile relay station 2*b* receives the base station uplink signal using the antennas 25 selected by the controller 242*b* (Step S632). The controller 242*b* reads a reception weight of each antenna 25 corresponding to the current time from the storage 241*b* and gives an instruction of the read reception weight to the receiver 245 (Step S633).

The receiver 245 performs weighting of a reception signal received by each antenna 25 selected by the controller 242*b* using a reception weight instructed from the controller 242*b* and then performs addition and synthesis of the reception signals (Step S634). The reception processor 246 demodulates and decodes the reception signal acquired by performing addition and synthesis using the receiver 245 and acquires transmission data transmitted by the base station 4*b* (Step S635).

The controller 242*b* determines whether or not the current time t is a time T (Step S636). In a case in which the current time t is the time T (Step S636—Yes), the mobile relay station 2*b* ends the process illustrated in FIG. 25.

On the other hand, in a case in which the current time t is not the time T (Step S636—No), the controller 242*b* selects antennas 25 to be used for reception according to the current time by referring to the time again (Step S637). In addition, in a case in which the same antennas 25 as those of the previous time are selected, the controller 242*b* may not perform switching of the antennas 25. Thereafter, the mobile relay station 2*b* performs a process of Step S632 and subsequent steps.

According to the embodiment described above, also in transmission/reception of base station uplink signals, similar to the fourth embodiment, efficient communication can be performed.

The controller 242*b* may be configured to select antennas 25 used for communication with the base station 4*b* using the transmission capacity information. In the case of such a configuration, transmission capacity information is additionally stored in the storage 241*b*. In this case, the transmission capacity information stored by the storage 241*b* represents a transmission capacity of the uplink of each antenna 25 for each reception time. The controller 242*b* selects antennas 25 corresponding to the determined number in order of largest to smallest transmission capacity at each reception time by referring to the transmission capacity information stored in the storage 241*b*.

(Reception Configuration of Base Station Uplink Signal According to Fifth Embodiment)

The configuration of the wireless communication system according to this embodiment is similar to the configuration illustrated in FIG. 22. A difference in the process between the configuration of this embodiment and the configuration illustrated in FIG. 22 is in that the mobile relay station 2*b* determines a combination of used antennas in real time and receives a base station uplink signal in the configuration illustrated in FIG. 22. In addition, the mobile relay station 2*b* performs the processes of Steps S501 and S502 illustrated in FIG. 15 in advance and stores results of the processes in the storage 241*b*.

Figure 26:
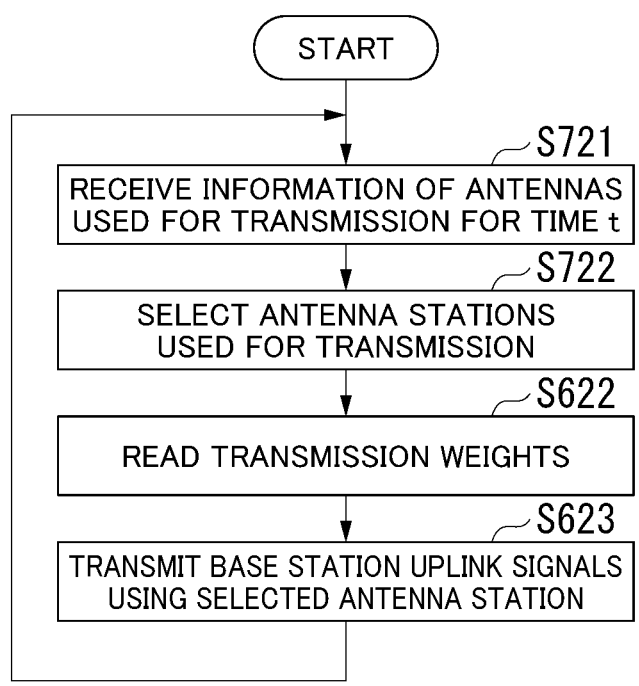
FIG. 26 is a flowchart illustrating a process of a base station selecting antenna stations used for transmission and transmitting a base station uplink signal in real time.

FIG. 26 is a flowchart illustrating a process of the base station 4*b* selecting antenna stations used for transmission and transmitting a base station uplink signal in real time. The process illustrated in FIG. 26 is performed in a case in which it is a communication time for the mobile relay station 2*b* (a visualization time t=1). In FIG. 26, reference signs similar to those illustrated in FIG. 24 are assigned to the same processes as those illustrated in FIG. 24, and description thereof will be omitted.

Each antenna station 41 of the base station 4*b* receives information of a transmission antenna of a time t transmitted from the mobile relay station 2*b* (Step S721). Here, the transmission antenna information of the time t is information that represents the number of antenna stations 41 used by the base station 4*b* for transmission of a base station uplink signal at the time t. The controller 442*b* selects antenna stations 41 to be used for transmission at the time t among all the antenna stations 41 as a subset by referring to the information of transmission antennas and the transmission capacity information received through the antenna station 41 (Step S722). Thereafter, the base station 4*b* performs the process of Step S622 and subsequent steps. In accordance with this, the base station 4*b* receives the information of transmission antennas of each time as required and selects antenna stations 41 on the basis of the latest information of transmission antennas.

Figure 27:
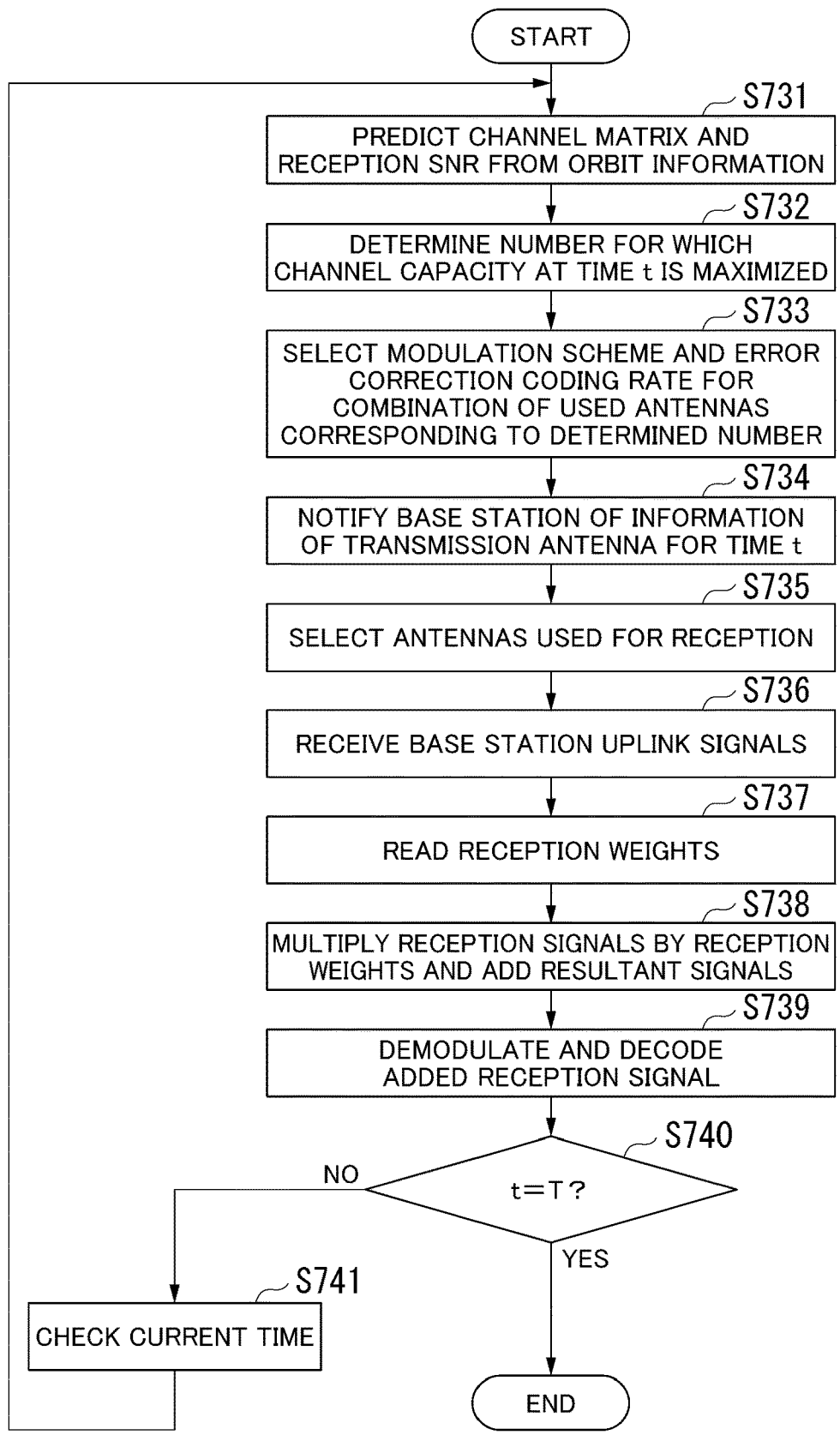
FIG. 27 is a flowchart illustrating a process of a mobile relay station determining a combination of used antennas and receiving a base station uplink signal.

FIG. 27 is a flowchart illustrating a process of the mobile relay station 2*b* determining a combination of used antennas and receiving a base station uplink signal. The process illustrated in FIG. 27 is performed in a case in which it is a communication time (a visualization time t=1) for the base station 4*b*.

A controller 242*b* predicts a channel matrix (H) and a reception SNR (γ) from orbit information of the mobile relay station 2*b* at a time t (for example t=1) (Step S731).

The controller 242*b* determines a number x(t) of a combination of used antennas that maximizes a channel capacity $C_x$ at a time t on the basis of Equation (2) described above and a number for each combination of used antennas stored in the storage 241*b* (Step S732). The controller 242*b* stores information of the number of antennas 25 in the combination of used antennas associated with the determined number x(t) in the storage 241*b* as mobile relay station used antenna information.

The controller 242*b* selects a modulation scheme and an error correction coding rate in the combination of used antennas associated with the determined number x(t) (Step S733). The controller 242*b* causes the storage 241*b* to store information of the modulation scheme and the error correction coding rate in the combination of used antennas associated with the determined number x(t). The controller 242*b* notifies the base station 4*b* of the information of transmission antennas of the time t through an antenna 25 (Step S734).

Thereafter, the controller 242*b* selects antennas 25 used for reception at the time t by referring to mobile relay station used antenna information stored in the storage 241*b* (Step S735). The controller 242*b* performs switching of antennas 25 such that a base station uplink signal is received by the selected antennas 25.

The receiver 245 of the mobile relay station 2*b* receives the base station uplink signal using the antennas 25 selected by the controller 242*b* (Step S736). The controller 242*b* reads a reception weight of each antenna 25 corresponding to the current time from the storage 241*b* and gives an instruction of the read reception weight to the receiver 245 (Step S637).

The receiver 245 performs weighting of a reception signal received by each antenna 25 selected by the controller 242*b* using a reception weight instructed from the controller 242*b* and then performs addition and synthesis of the reception signals (Step S738). The reception processor 246 demodulates and decodes the reception signal acquired by performing addition and synthesis using the receiver 245 and acquires transmission data transmitted by the base station 4*b* (Step S739).

The controller 242*b* determines whether or not the current time t is a time T (Step S740). In a case in which the current time t is the time T (Step S740—Yes), the mobile relay station 2*b* ends the process illustrated in FIG. 27.

On the other hand, in a case in which the current time t is not the time T (Step S740—No), the controller 242*b* checks the current time t by referring to the time again (Step S741). Thereafter, the mobile relay station 2*b* performs the process of Step S731 and subsequent steps.

According to the embodiment described above, also in transmission/reception of base station uplink signals, similar to the fifth embodiment, efficient communication can be performed.

The controller 242*b* may be configured to select antennas 25 used for communication with the base station 4*b* using the transmission capacity information. In the case of such a configuration, transmission capacity information is additionally stored in the storage 241*b*. The controller 242*b* selects antennas 25 corresponding to the determined number in order of largest to smallest transmission capacity at each reception time by referring to the transmission capacity information stored in the storage 241*b*.

(Reception Configuration of Base Station Uplink Signal According to Sixth Embodiment)

Figure 28:
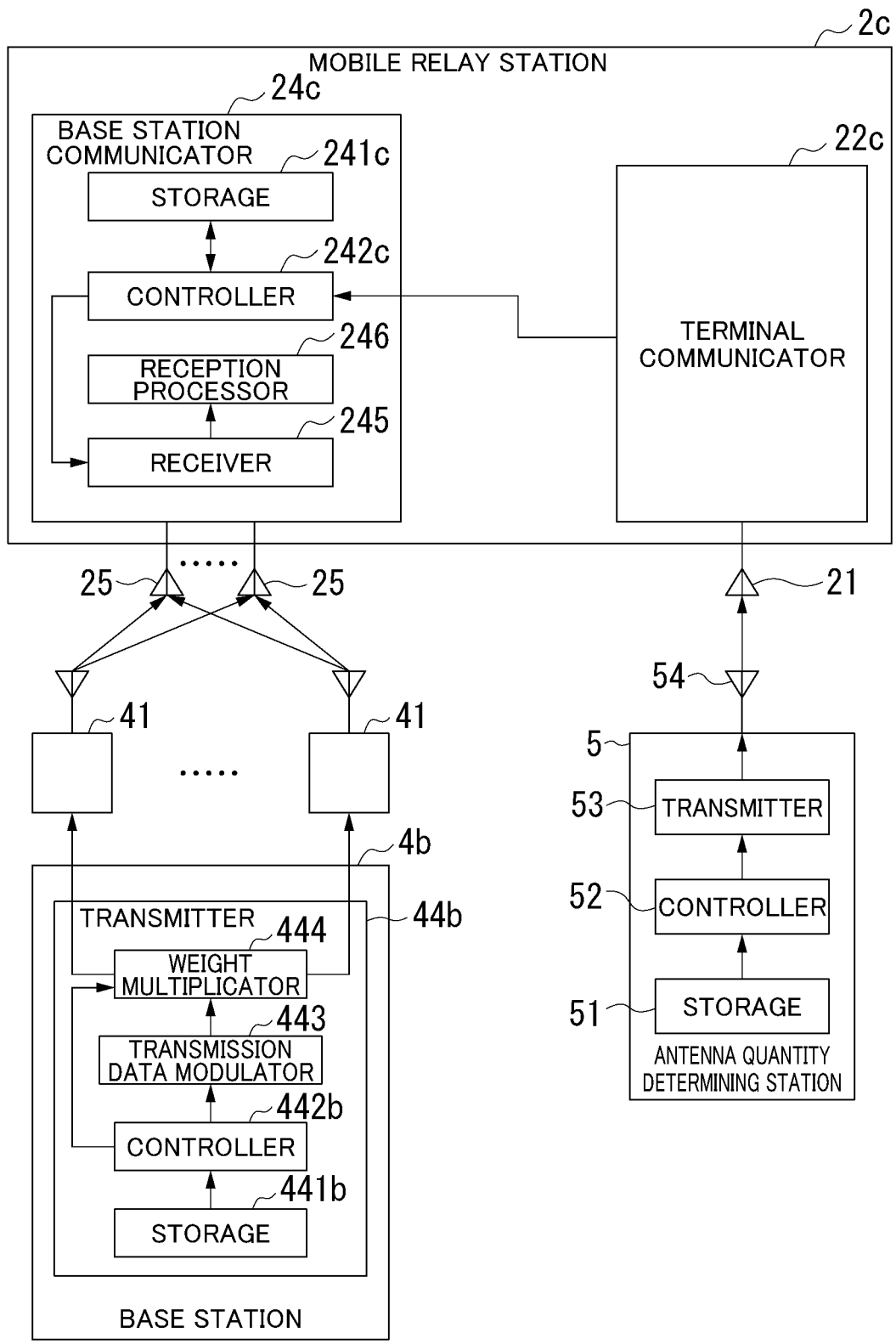
FIG. 28 is a block diagram illustrating a configuration of a mobile relay station and a base station of a case in which the mobile relay station receives a base station uplink signal from the base station.

FIG. 28 is a block diagram illustrating a configuration of the mobile relay station 2*c* and the base station 4*b* of a case in which the mobile relay station 2*c* receives a base station uplink signal from the base station 4*b*. The antenna quantity determining station 5 illustrated in FIG. 28 performs the process represented in the sixth embodiment. In FIG. 28, only functional modules relating to transmission/reception of base station uplink signals are extracted and illustrated.

In the configuration illustrated in FIG. 28, the process of determining a combination of used antennas illustrated in FIG. 20 is performed by the antenna quantity determining station 5, and information of used antennas for a visualization time is stored in each of the mobile relay station 2*c* and the base station 4*b*. In this case, the process performed in a case in which the base station 4*b* transmits a base station uplink signal is similar to that illustrated in FIG. 24. Furthermore, a process performed in a case in which the mobile relay station 2*c* receives a base station uplink signal from the base station 4*b* is similar to that illustrated in FIG. 25.

According to the embodiment described above, also in transmission/reception of base station uplink signals, similar to the sixth embodiment, efficient communication can be performed.

(Reception Configuration of Base Station Uplink Signal According to Seventh Embodiment)

The configuration of the wireless communication system according to this embodiment is similar to the configuration illustrated in FIG. 27. A difference in the process between the configuration of this embodiment and the configuration illustrated in FIG. 27 is in that the antenna quantity determining station 5 determines a combination of used antennas in real time in the configuration illustrated in FIG. 27. The antenna quantity determining station 5 performs the processes of Steps S801 and S802 illustrated in FIG. 20 in advance and stores results of the processes in the storage 51.

Figure 29:
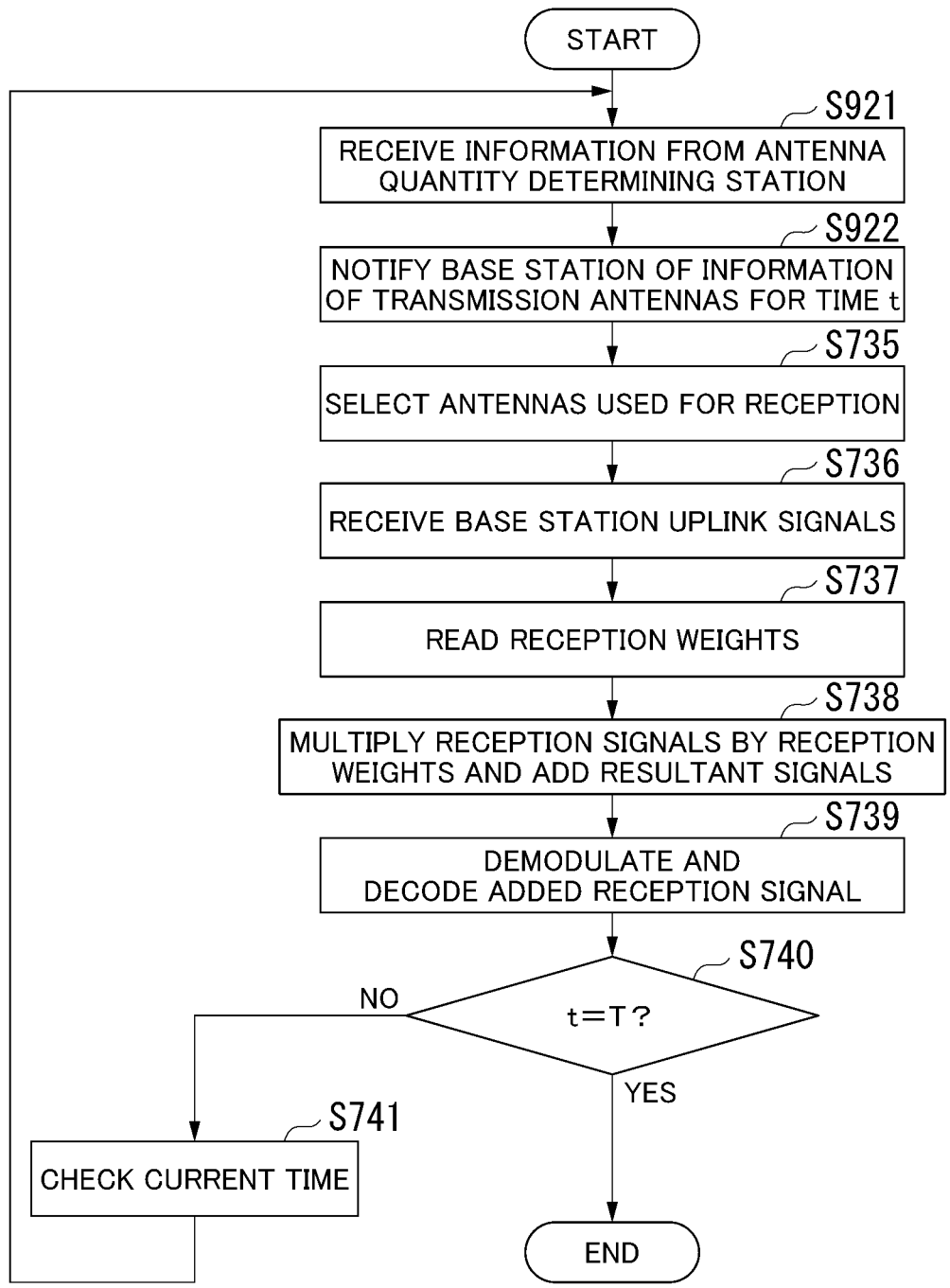
FIG. 29 is a flowchart illustrating a process of a mobile relay station receiving a base station uplink signal.

FIG. 29 is a flowchart illustrating a process of the mobile relay station 2*c* receiving a base station uplink signal. The process illustrated in FIG. 29 is performed in a case in which it is a communication time for the base station 4*b* (a visualization time t=1). In FIG. 29, reference signs similar to those illustrated in FIG. 27 are assigned to the same processes as those illustrated in FIG. 27, and description thereof will be omitted.

The terminal communicator 22*c* receives transmission information for the time t (for example, t=1) that is transmitted from the antenna quantity determining station 5 (Step S921). The terminal communicator 22*c* outputs the received transmission information to a base station communicator 24*c*. A controller 242*c* of the base station communicator 24*c* stores the information of a combination of used antennas and the information of a modulation scheme and an error correction coding rate for the combination of used antennas that are included in the acquired transmission information in a storage 241c. The controller 242c notifies the base station 4b of the information of the number of antennas used for reception for the time t in the information of the combination of used antennas through the antenna 25 (Step S922). Thereafter, the mobile relay station 2c performs the process of Step S735 and subsequent steps.

The process of the base station 4b is similar to that illustrated in FIG. 26.

According to the embodiment described above, also in transmission/reception of base station uplink signals, similar to the seventh embodiment, efficient communication can be performed.

Eighth Embodiment

In the fourth embodiment to the seventh embodiment, a case in which one mobile relay station is provided has been described. In the present embodiment, a configuration of a case in which a plurality of mobile relay stations are included in the wireless communication system will be described. In other words, in the eighth embodiment, antennas included in each of a plurality of mobile relay stations are included as candidates for a combination of used antennas. Hereinafter, this embodiment will be described focusing on differences from the fourth embodiment.

Figure 30:
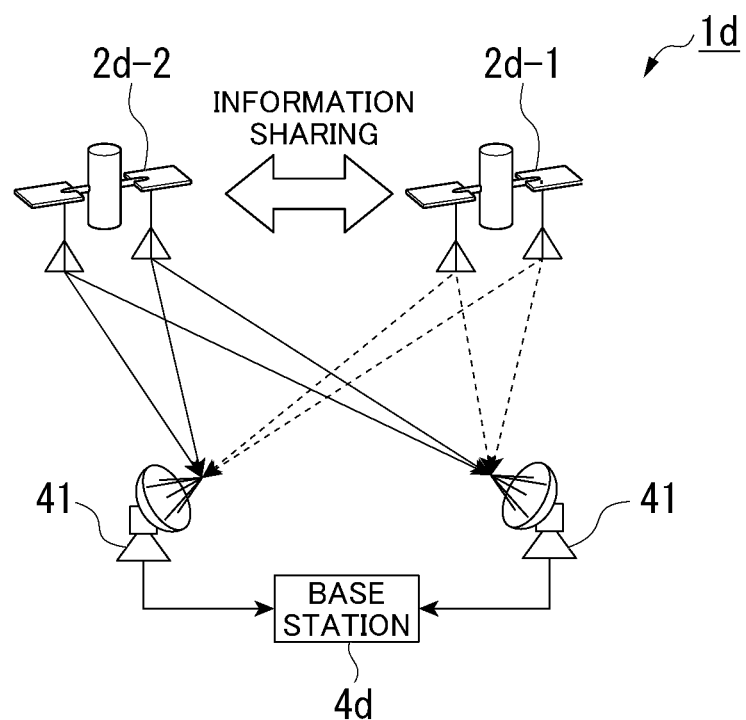
FIG. 30 is a diagram illustrating an overview of a wireless communication system according to an eighth embodiment.

FIG. 30 is a diagram illustrating an overview of a wireless communication system 1d according to the eighth embodiment. The wireless communication system 1d includes N (here, N is an integer equal to or greater than 2) mobile relay stations 2d, terminal stations 3, and a base station 4d. In the drawing, illustration of the terminal stations 3 is omitted. Hereinafter, N mobile relay stations 2d will be represented as mobile relay stations 2d-1 to 2d-N. FIG. 30 illustrates an example of a case in which N=2.

In the present embodiment, the mobile relay station 2d-n calculates a transmission capacity between an antenna 25 included in each mobile relay station 2d-n and all the antenna stations 41 of the base station 4b at each time. In other words, a certain mobile relay station 2d-n calculates a transmission capacity of a combination of all the antennas 25 of all the mobile relay stations 2d-n. The transmission capacity is calculated on the basis of orbit information of a LEO satellite in which the mobile relay station 2d-n is mounted, information of a position of each antenna station 41, and a frequency of wireless communication. At least one mobile relay station 2d-n among the plurality of mobile relay stations 2d-n determines a combination of used antennas for each time on the basis of a channel capacity (a transmission capacity) between the mobile relay station 2d-n and the base station 4d. Between the mobile relay stations 2d-n, the information of the determined combination of used antennas of each time is shared. Each mobile relay station 2d-n communicates with the base station 4b using antennas 25 corresponding to the number included in the information of the combination of used antennas among antennas 25 included in its own apparatus.

As described above, in a case in which there are a plurality of mobile relay stations 2d-n that can communicate with the base station 4d, between the base station 4d and the plurality of mobile relay stations 2d-n, communication is assumed to be performed in any one of the following two patterns.

A first pattern, as illustrated in FIG. 7, is a pattern in which the mobile relay station 2d-n communicating with the base station 4b is switched in accordance with a time. In the case of the first pattern, first, a mobile relay station 2d-n of which reception power is the highest is selected as a communication destination of the base station 4b. Next, a combination of antennas 25 of which a transmission capacity is the highest among the antennas 25 included in the selected mobile relay station 2d-n is selected. Then, the selected mobile relay station 2d-n communicates with the base station 4d using selected antennas 25.

A second pattern is a pattern in which communication with the base station 4b is performed using antennas 25 of a plurality of mobile relay stations 2d-n. In the case of the second pattern, simultaneous transmission from a plurality of mobile relay stations 2d-n to the base station 4b is performed. As one example, two antennas including one antenna 25 of the mobile relay station 2d-1 and one antenna 25 of the mobile relay station 2d-2 illustrated in FIG. 30 are assumed to be selected as transmission antennas.

Figure 31:
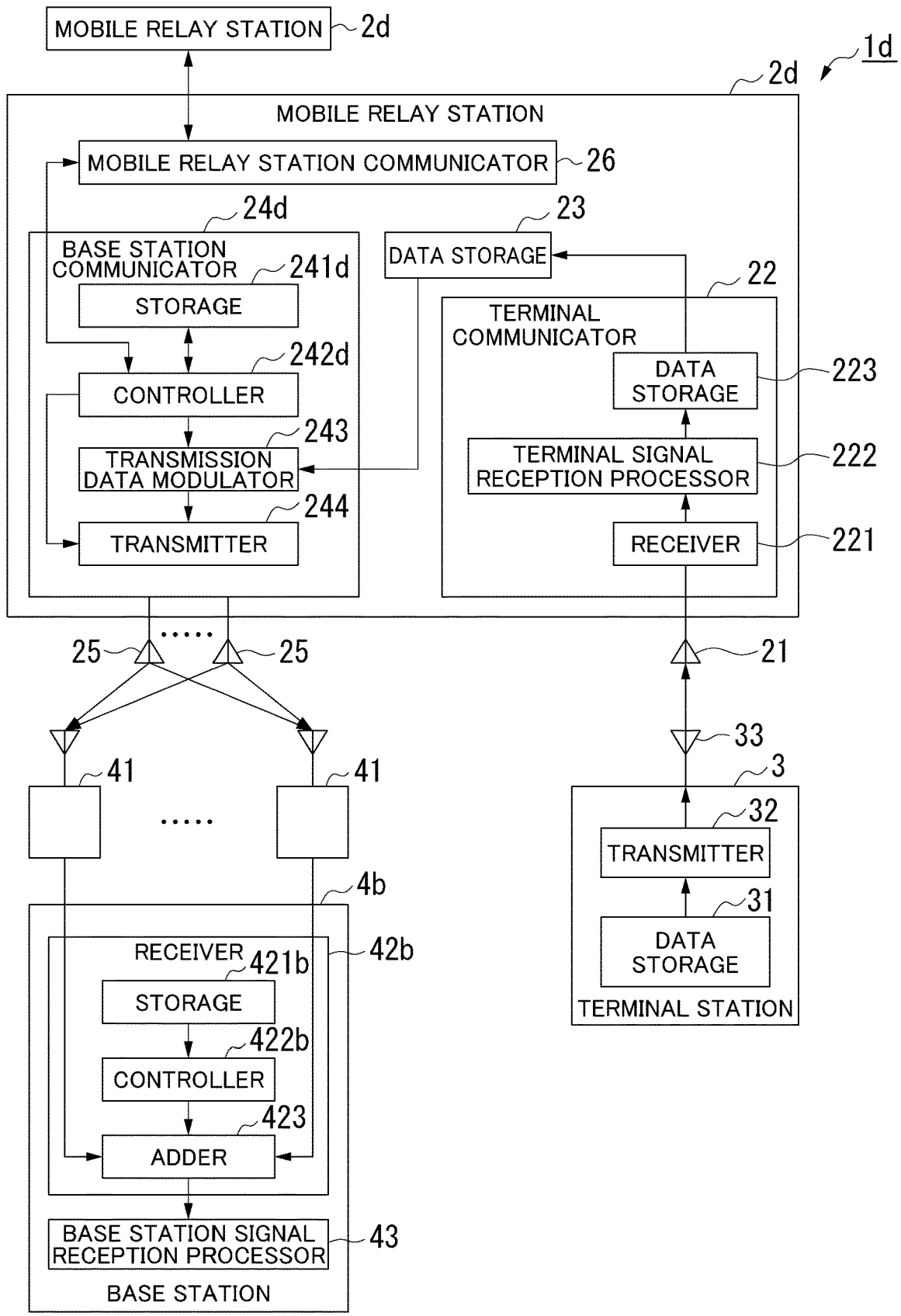
FIG. 31 is a configuration diagram of the wireless communication system according to the eighth embodiment.

FIG. 31 is a block diagram illustrating a configuration of the wireless communication system 1d according to the eighth embodiment. In the drawing, the same reference signs will be assigned to the same parts as those of the wireless communication system 1b according to the fourth embodiment illustrated in FIG. 11, and description thereof will be omitted.

The mobile relay station 2d includes one or more antennas 21, a terminal communicator 22, a data storage 23, a base station communicator 24d, one or more antennas 25, and a mobile relay station communicator 26. The base station communicator 24d has a configuration similar to that of the fourth embodiment.

The base station communicator 24d transmits terminal transmission data to the base station 4b. The base station communicator 24d includes a storage 241d, a controller 242d, a transmission data modulator 243, and a transmitter 244.

The storage 241d stores in advance a transmission weight for each transmission time of a base station downlink signal transmitted from each antenna 25. In addition, the storage 241d stores mobile relay station used antenna information for each time.

The controller 242d determines a combination of used antennas for each time on the basis of a channel capacity (a transmission capacity) between a plurality of mobile relay stations 2d-n and the base station 4b. In the eighth embodiment, the controller 242d determines a combination of the number of antennas 25 of each mobile relay station 2d-n and the number of antenna stations 41 of the base station 4b for each time. The controller 242d selects antennas 25 used for communication with the base station 4b among antennas 25 included in the mobile relay station 2d in accordance with the combination of used antennas for each time.

The mobile relay station communicator 26 performs communication with another mobile relay station 2d-n. For example, the mobile relay station communicator 26 transmits information of the combination of used antennas determined by the controller 242d to another mobile relay station 2d-n. In accordance with this, among a plurality of mobile relay stations 2d-n (for example, between the mobile relay station 2d-1 and the mobile relay station 2d-2), the information of the combination of used antennas can be shared.

An operation of the wireless communication system 1d will be described with reference to the flowchart illustrated in FIG. 15. Here, the mobile relay station 2d-1 determines a combination of used antennas.

In a process of Step S501, the controller 242d of the mobile relay station 2d-1 derives a total number X of combinations of used antennas on the basis of Equation (1)

represented above. In an example of this embodiment, in Equation (1), $M_s$ is "2", $M_t$ is the number of antennas 25 of two mobile relay stations 2d-n, and $M_r$ is the number of antenna stations 41 of the base station 4b. Thereafter, processes of Step S502 to Step S507 are performed.

In the process of Step S507, in a case in which t=T (Step S507—Yes), the controller 242d performs the following process as the process of Step S509. More specifically, the controller 242d collects information of the number of reception antennas (for example, the number of antenna stations 41) in a visualization time (t=1 to T) and notifies the base station 4b of the information through the antenna 25. In addition, the controller 242d transmits the information of a combination of used antennas in the visualization time (t=1 to T) to the mobile relay station 2d-2 through the mobile relay station communicator 26.

Each of the mobile relay stations 2d-1 and 2d-2 selects antennas 25 to be used for transmission at each time in accordance with the information of the combination of used antennas. For example, in a case in which information indicating that one antenna 25 of the mobile relay station 2d-1 and one antenna 25 of the mobile relay station 2d-2 are used at the time t is included in the information of the combination of used antennas, each of the mobile relay stations 2d-1 and 2d-2 selects one antenna 25 among the plurality of antennas 25 for the time t. Then, each of the mobile relay stations 2d-1 and 2d-2 transmits a base station downlink signal to the mobile relay station 2b using the selected antennas 25 at the time t.

The embodiment described above can be applied also to a case in which a plurality of mobile relay stations 2d are present. In accordance with this, in a case in which the transmission capacity is large than that of the case of one mobile relay station 2d, communication with the base station 4b can be performed using a plurality of mobile relay stations 2d. As a result, more efficient communication can be performed.

In addition, the configuration of a case in which a plurality of mobile relay stations 2d are included in the eighth embodiment may be applied to a configuration in which the mobile relay station 2d receives a base station uplink signal transmitted from the base station 4b.

The configuration of the case in which a plurality of mobile relay stations 2d are included in the eighth embodiment can be applied also to the fifth embodiment to the seventh embodiment. Hereinafter, detailed description will be presented.

(Configuration of Case in which Configuration Including Plurality of Mobile Relay Stations 2d According to Eight Embodiment is Applied to Fifth Embodiment)

In this case, in the process of Step S704 illustrated in FIG. 18, one mobile relay station 2d notifies the base station 4b of the information of the number of reception antennas for the time t through the antenna 25. In addition, the controller 242d transmits the information of the combination of used antennas for the time t to another mobile relay station 2d through the mobile relay station communicator 26. In this way, in a process performed once, the controller 242d transmits the information of the combination of used antennas for a certain time t to another mobile relay station 2d through the mobile relay station communicator 26. Then, in accordance with elapse of time, the controller 242d transmits the information of the combination of used antennas according to the time to another mobile relay station 2d through the mobile relay station communicator 26.

Each of the mobile relay stations 2d-1 and 2d-2 selects antennas 25 to be used for transmission for the time t in accordance with the information of the combination of used antennas. Each of the mobile relay stations 2d-1 and 2d-2 transmits a base station downlink signal to the mobile relay station 2b using the selected antennas 25 at the time t.

In addition, the configuration described above may be applied to a configuration in which the mobile relay station 2d receives a base station uplink signal transmitted from the base station 4b.

(Configuration of Case in which Configuration Including Plurality of Mobile Relay Stations 2d According to Eight Embodiment is Applied to Sixth Embodiment)

In this case, the antenna quantity determining station 5 determines a combination of used antennas for each time on the basis of a channel capacity (a transmission capacity) between the plurality of mobile relay stations 2d-n in place of the mobile relay station 2d and the base station 4b. The antenna quantity determining station 5 transmits transmission information including the information of the combination of used antennas and the information of a modulation scheme and an error correction coding rate for the combination of used antennas for the visualization time to one mobile relay station 2d (for example, the mobile relay station 2d-1). In a case in which the antenna quantity determining station 5 can communicate with a plurality of mobile relay stations 2d, it may transmit transmission information to the plurality of mobile relay stations 2d.

The mobile relay station 2d-1 transmits the received transmission information to another mobile relay station 2d-2 through the mobile relay station communicator 26. Each of the mobile relay stations 2d-1 and 2d-2 selects antennas 25 to be used for transmission at each time in accordance with the information of the combination of used antennas. Then, each of the mobile relay stations 2d-1 and 2d-2 transmits a base station downlink signal to the mobile relay station 2b using the selected antennas 25 at each time.

Furthermore, the configuration described above may be applied to a configuration in which the mobile relay station 2d receives a base station uplink signal transmitted from the base station 4b.

(Configuration of Case in which Configuration Including Plurality of Mobile Relay Stations 2d According to Eight Embodiment is Applied to Seventh Embodiment)

In this case, the antenna quantity determining station 5 determines a combination of used antennas for each time on the basis of a channel capacity (a transmission capacity) between the plurality of mobile relay stations 2d-n in place of the mobile relay station 2d and the base station 4b. The antenna quantity determining station 5 transmits transmission information including the information of the combination of used antennas and the information of a modulation scheme and an error correction coding rate for the combination of used antennas for a time t to one mobile relay station 2d (for example, the mobile relay station 2d-1). In this way, in a process performed once, the antenna quantity determining station 5 transmits the transmission information of a certain time to the mobile relay station 2d.

The mobile relay station 2d-1 transmits the received transmission information to another mobile relay station 2d-2 through the mobile relay station communicator 26. Each of the mobile relay stations 2d-1 and 2d-2 selects antennas 25 to be used for transmission at the time t in accordance with the information of the combination of used antennas. Then, each of the mobile relay stations 2d-1 and 2d-2 transmits a base station downlink signal to the mobile relay station 2b using the selected antennas 25 at the time t.

Furthermore, the configuration described above may be applied to a configuration in which the mobile relay station 2*d* receives a base station uplink signal transmitted from the base station 4*b*.

Although a case where a moving body on which the mobile relay station is mounted is a LEO satellite has been described in the above embodiments, it may be a geostationary satellite, a drone, a HAPS, or another aircraft flying over the sky. Like the LEO satellite, in a case in which a trend of communication characteristics is periodical in a time series, selection of antennas having good CSI characteristics may be set in a time series. On the other hand, in a case in which a moving body in which the mobile relay station is mounted is an unmanned aerial vehicle (UAV) or the like, the communication characteristics may not be necessarily periodical. Even in such a case, by using information representing a position, an orientation, a posture, and the like of a moving body in which the mobile relay station is mounted for each time as movement schedule information, a transmission capacity between the antenna of the mobile relay station and the antenna station of the base station can be calculated. Thus, a selectin pattern for antenna stations or a mobile relay station that is a communication destination of the base station can be changed in accordance with movement of the mobile relay station.

According to this embodiment, even in a case in which a wireless communication environment changes over time due to movement of the mobile relay station, antennas of a reception side or antennas of a transmission side used for wireless communication can be selected such that the transmission capacity increases while reducing the load. Antennas that are targets for selection are antenna stations included in the base station in the first and second embodiments and are antennas of each mobile relay station according to the third embodiment.

According to the embodiment described above, a wireless communication system includes a first wireless communication apparatus and a second wireless communication apparatus. For example, the first wireless communication apparatus is included in a flying object flying above the Earth such as a low orbit satellite or the like, and the second wireless communication apparatus is installed on the Earth. For example, the first wireless communication apparatus is the mobile relay station 2 or 2*a* in the embodiment, and the second wireless communication apparatus is the base station 4 or 4*a* in the embodiment.

The first wireless communication apparatus includes one or more first antennas and a first communicator that wirelessly communicates with the second wireless communication apparatus using the first antenna. For example, the first antenna is the antenna 25 according to the embodiment, and the first communicator is the transmitter 244 and the receiver 245 according to the embodiment. The second wireless communication apparatus includes one or more second antennas and a second communicator that wirelessly communicates with the first wireless communication apparatus using the second antenna. For example, the second antenna is the antenna station 41 according to the embodiment, and the second communicator is the receiver 42 or 42*a* and the transmitter 44 or 44*a* according to the embodiment. The first wireless communication apparatus and the second wireless communication apparatus may communicate with each other using MIMO. The wireless communication system includes a controller. The controller performs control such that a first antenna wirelessly communicating with the second wireless communication apparatus among first antennas of a plurality of first wireless communication apparatuses or a second antenna wirelessly communicating with the first wireless communication apparatus among second antennas of a plurality of second wireless communication apparatuses is changed on the basis of a transmission capacity between the first antenna and the second antenna for each time that is calculated using movement schedule information representing a position of the first wireless communication apparatus for each time and a position of the second antenna. For example, the controller is any one of the controllers 242, 242*a*, 422, 422*a*, 442, and 442*a* according to the embodiment.

For example, the controller controls a certain combination of second antennas corresponding to a predetermined number among a plurality of second antennas to receive a wireless signal transmitted from the first antenna of the first wireless communication apparatus on the basis of the transmission capacity for each time.

In addition, for example, the controller controls the second antenna of the second wireless communication apparatus to receive a wireless signal transmitted from the first antenna of a certain first wireless communication apparatus among first antennas of a plurality of first wireless communication apparatuses on the basis of the transmission capacity for each time.

Furthermore, for example, the controller controls the first communicator of the first wireless communication apparatus to transmit a wireless signal at a time at which the first antenna of the first wireless communication apparatus is selected as a communication destination of the second wireless communication apparatus on the basis of the transmission capacity for each time.

As above, although the embodiments of the present invention have been described in detail with reference to the drawings, a specific configuration is not limited to these embodiments and includes a design and the like in a range not departing from the concept of the present invention.

REFERENCE SIGNS LIST

1, 1*a*, 1*b*, 1*c* Wireless communication system
2, 2*a*, 2*b*, 2*c*, 2*d* Mobile relay station
3 Terminal station
4, 4*a*, 4*b* Base station
5 Antenna quantity determining station
21 Antenna
22, 22*c* Terminal communicator
23 Data storage
24, 24*a*, 24*b*, 24*c*, 24*d* Base station communicator
25 Antenna
26 Mobile relay station communicator
31 Data storage
32 Transmitter
33 Antenna
41, 41-1 to 41-4 Antenna station
42, 42*a*, 42*b* Receiver
43 Base station signal reception processor
44 Transmitter
51 Storage
52 Controller
53 Transmitter
54 Antenna
221 Receiver
222, 222*c* Terminal signal reception processor
223 Data recorder
241, 241*a*, 241*b*, 241*c*, 241*d* Storage
242, 242*a*, 242*b*, 242*c*, 242*d* Controller
243 Transmission data modulator 244 Transmitter
245 Receiver
246 Reception processor
421, 421a, 421b Storage
422, 422a, 422b Controller
423 Adder
441, 441a, 441b Storage
442, 442a, 442b Controller
443 Transmission data modulator
444 Weight multiplicator

The invention claimed is:

1. A wireless communication system comprising:
a first wireless communication apparatus; and
a second wireless communication apparatus,
wherein the first wireless communication apparatus includes:
one or more first antennas; and
a first communicator configured to wirelessly communicate with the second wireless communication apparatus using the one or more first antennas,
wherein the second wireless communication apparatus includes:
one or more second antennas; and
a second communicator configured to wirelessly communicate with the first wireless communication apparatus using the one or more second antennas,
the wireless communication system further comprising:
a controller configured to perform control to change one or both of first antennas wirelessly communicating with the second wireless communication apparatus among a plurality of first antennas of the first wireless communication apparatus or second antennas wirelessly communicating with the first wireless communication apparatus among a plurality of second antennas of the second wireless communication apparatus for maximizing communication quality on the basis of the communication quality for each time between first antenna and second antenna calculated using a position of the one or more second antennas and movement schedule information representing a position of the first wireless communication apparatus for each time,
wherein the movement schedule information includes at least the position at each time point of the first wireless communication apparatus disposed on a flying object flying above the Earth.

2. The wireless communication system according to claim 1, wherein the controller controls combination of a predetermined number of second antennas for receiving among the plurality of second antennas a wireless signal transmitted from the one or more first antennas of the first wireless communication apparatus on the basis of the communication quality for each time.

3. The wireless communication system according to claim 1, wherein the controller controls whether a wireless signal transmitted from any of the first antennas of first wireless communication apparatus among the first antennas of the plurality of first wireless communication apparatuses is received by the second antennas of the second wireless communication apparatus on the basis of the communication quality for each time.

4. The wireless communication system according to claim 1, wherein the controller performs control of the first communicator of the first wireless communication apparatus to transmit a wireless signal at a time at which the one or more first antennas of the first wireless communication apparatus is selected to be a communication destination of the second wireless communication apparatus on the basis of the communication quality for each time.

5. The wireless communication system according to claim 1, wherein the controller selects a combination of the first antennas and the second antennas used for communication between the first wireless communication apparatus and the second wireless communication apparatus on the basis of a communication quality amount for each predetermined time between first antenna and second antenna.

6. The wireless communication system according to claim 5,
wherein the controller determines a combination of the first antennas and the second antennas used in a communication period in which the first antennas and the second antennas are able to communicate with each other in advance,
wherein the first wireless communication apparatus notifies the second wireless communication apparatus of information relating to the second antennas used in the communication period, and
wherein the first wireless communication apparatus and the second wireless communication apparatus perform communication using the determined combination of the first antennas and the second antennas in the communication period.

7. The wireless communication system according to claim 5,
wherein the controller determines a combination of the first antennas and the second antennas used in a communication period in which the first antennas and the second antennas are able to communicate with each other for each predetermined time during the communication period between the first wireless communication apparatus and the second wireless communication apparatus,
wherein, when information of the combination is notified from the controller, the first wireless communication apparatus notifies the second wireless communication apparatus of information of the second antennas used in the communication period, and
wherein the first wireless communication apparatus and the second wireless communication apparatus perform communication using the determined combination of the first antennas and the second antennas in the communication period.

8. The wireless communication system according to claim 1, further comprising a third wireless communication apparatus configured to select information of a combination of the first antennas of the first wireless communication apparatus and the second antennas of the second wireless communication apparatus,
wherein the first wireless communication apparatus notifies the second wireless communication apparatus of information relating to the second antennas included in the information of the combination transmitted from the third wireless communication apparatus, and
wherein the first wireless communication apparatus and the second wireless communication apparatus perform communication using the combination of the first antennas and the second antennas determined by the third wireless communication apparatus.

9. The wireless communication system according to claim 1, further comprising a plurality of the first wireless communication apparatuses,
wherein the plurality of the first wireless communication apparatuses share information of the combination of the first antennas and the second antennas by transmitting/ receiving the information of the combination of the first antennas and the second antennas to/from another first wireless communication apparatus.

10. The wireless communication system according to claim 1, wherein the first wireless communication apparatus and the second wireless communication apparatus communicate with each other using multiple input multiple output (MIMO).

11. The wireless communication system according to claim 1,
wherein the second wireless communication apparatus is installed on the Earth.

12. The wireless communication system according to claim 11, wherein the flying object is a low orbit satellite.

13. A wireless communication apparatus comprising:
one or more antennas;
a communicator configured to wirelessly communicate with a communication destination apparatus using the one or more antennas; and
a controller configured to perform control to change one or both of antennas wirelessly communicating with the wireless communication apparatus among antennas of the communication destination apparatus or antennas wirelessly communicating with the communication destination apparatus among a plurality of the antennas of the wireless communication apparatus for maximizing communication quality on the basis of the communication quality for each time between the one or more antennas and the antennas of the communication destination apparatus calculated using a position of the one or more antennas and movement schedule information representing a position of the communication destination apparatus for each time,
wherein the movement schedule information includes at least the position at each time point of the first wireless communication apparatus disposed on a flying object flying above the Earth.

14. A wireless communication method executed by a wireless communication system including a first wireless communication apparatus and a second wireless communication apparatus, the wireless communication method comprising:
wirelessly communicating with the second wireless communication apparatus using one or more first antennas by the first wireless communication apparatus;
wirelessly communicating with the first wireless communication apparatus using one or more second antennas by the second wireless communication apparatus; and
performing control to change one or both of first antennas wirelessly communicating with the second wireless communication apparatus among a plurality of first antennas of the first wireless communication apparatus or second antennas wirelessly communicating with the first wireless communication apparatus among a plurality of second antennas of the second wireless communication apparatus for maximizing communication quality on the basis of the communication quality for each time between first antenna and second antenna calculated using a position of the one or more second antennas and movement schedule information representing a position of the first wireless communication apparatus for each time by a controller,
wherein the movement schedule information includes at least the position at each time point of the first wireless communication apparatus disposed on a flying object flying above the Earth.

15. A wireless communication method executed by a wireless communication apparatus, the wireless communication method comprising:
wirelessly communicating with a communication destination apparatus using one or more antennas; and
performing control to change one or both of antennas wirelessly communicating with the wireless communication apparatus among antennas of the communication destination apparatus or antennas wirelessly communicating with the communication destination apparatus among a plurality of the antennas of the wireless communication apparatus for maximizing communication quality on the basis of the communication quality for each time between the one or more antennas and the antennas of the communication destination apparatus calculated using a position of the one or more antennas and movement schedule information representing a position of the communication destination apparatus for each time,
wherein the movement schedule information includes at least the position at each time point of the first wireless communication apparatus disposed on a flying object flying above the Earth.

* * * * *